United States Patent
Li et al.

(10) Patent No.: US 12,435,119 B2
(45) Date of Patent: *Oct. 7, 2025

(54) GENETICALLY ENGINEERED CELL AND APPLICATION THEREOF

(71) Applicant: CRAGE medical Co., Limited, Hong Kong (CN)

(72) Inventors: Zonghai Li, Shanghai (CN); Hong Luo, Shanghai (CN); Hua Jiang, Shanghai (CN); Huamao Wang, Shanghai (CN)

(73) Assignee: CRAGE Medical Co., Limited, Hong Kong (CN)

( * ) Notice: Subject to any disclaimer, the term of this patent is extended or adjusted under 35 U.S.C. 154(b) by 1239 days.

This patent is subject to a terminal disclaimer.

(21) Appl. No.: 17/055,470

(22) PCT Filed: May 15, 2019

(86) PCT No.: PCT/CN2019/087077
§ 371 (c)(1),
(2) Date: Nov. 13, 2020

(87) PCT Pub. No.: WO2019/219029
PCT Pub. Date: Nov. 21, 2019

(65) Prior Publication Data
US 2021/0213061 A1    Jul. 15, 2021

(30) Foreign Application Priority Data

| May 15, 2018 | (CN) | 201810463564.7 |
| Sep. 18, 2018 | (CN) | 201811088090.9 |
| Dec. 19, 2018 | (CN) | 201811552806.6 |
| Feb. 28, 2019 | (CN) | 201910151930.X |

(51) Int. Cl.
| C07K 14/705 | (2006.01) |
| A61K 40/11 | (2025.01) |
| A61K 40/31 | (2025.01) |
| A61K 40/42 | (2025.01) |
| A61P 35/00 | (2006.01) |
| C07K 14/52 | (2006.01) |
| C07K 14/54 | (2006.01) |
| C07K 14/725 | (2006.01) |
| C07K 16/28 | (2006.01) |
| C07K 16/30 | (2006.01) |
| C12N 5/0783 | (2010.01) |
| C12N 15/86 | (2006.01) |

(52) U.S. Cl.
CPC ........ *C07K 14/70517* (2013.01); *A61K 40/11* (2025.01); *A61K 40/31* (2025.01); *A61K 40/42* (2025.01); *A61P 35/00* (2018.01); *C07K 14/521* (2013.01); *C07K 14/5418* (2013.01); *C07K 14/7051* (2013.01); *C07K 14/70521* (2013.01); *C07K 14/70578* (2013.01); *C07K 16/28* (2013.01); *C07K 16/30* (2013.01); *C12N 5/0636* (2013.01); *C12N 5/0638* (2013.01); *C12N 15/86* (2013.01); *A61K 2239/28* (2023.05); *A61K 2239/38* (2023.05); *A61K 2239/49* (2023.05); *A61K 2239/53* (2023.05); *A61K 2239/54* (2023.05); *C07K 2317/622* (2013.01); *C07K 2319/03* (2013.01); *C07K 2319/33* (2013.01); *C12N 2830/002* (2013.01)

(58) Field of Classification Search
None
See application file for complete search history.

(56) References Cited

U.S. PATENT DOCUMENTS

| 2011/0027242 A1 | 2/2011 | Nukaya et al. |
| 2012/0142109 A1 | 6/2012 | Katayama et al. |
| 2017/0152297 A1 | 6/2017 | Jensen |
| 2018/0291089 A1 | 10/2018 | Epstein et al. |
| 2019/0099446 A1* | 4/2019 | Tamada .......... A61P 35/02 |

FOREIGN PATENT DOCUMENTS

| CN | 102046780 A | 5/2011 |
| CN | 102656263 A | 9/2012 |
| CN | 106535934 A | 3/2017 |
| CN | 107635569 A | 1/2018 |
| EP | 2267118 A1 | 12/2010 |
| EP | 2471901 A1 | 7/2012 |
| WO | 2015157384 A1 | 10/2015 |
| WO | 2016176639 A1 | 11/2016 |

OTHER PUBLICATIONS

Jiang, H., et al. 2019 JNCI J Natl Cancer Inst 111(4): 409-418, first published online Sep. 6, 2018. (Year: 2018).*
Adachi, Keishi et al., "IL-7 and CCL19 expression in CAR-T cells improves immune cell infiltration and CAR-T cell survival in the tumor", Nature Biotechnology, vol. 36, No. 4, Apr. 2018.
Luo, Hong et al., "Coexpression of IL7 and CCL21 Increases Efficacy of Car-T Cells in solid tumor without requiring preconditioned lymphodepletion", Clinical Cancer Research, vol. 26, No. 20, Oct. 15, 2020, pp. 5494-5505.
Kirk, Christopher et al., "T Cell-dependent antitumor immunity mediated by secondary lymphoid tissue chemokine: augmentation of dendritic cell-based immonotheraphy", Cancer Research, vol. 61, Mar. 2021, pp. 2062-2070.

(Continued)

*Primary Examiner* — Marsha Tsay

(57) ABSTRACT

Disclosed in the present invention is a genetically engineered cell, expressing an exogenous receptor that specifically binds to a target antigen and exogenous CCL21, and capable of further expressing an IL-7R binding protein or exogenous IL-7 that promotes cell proliferation. Also disclosed are an expression construct comprising an exogenous CCL21 expression cassette, and a vector containing same, a virus, and a pharmaceutical composition comprising said cell. Also disclosed is an application for the cell, the expression construct, the vector, and the virus in the preparation of drugs for inhibiting tumours or inhibiting pathogens.

38 Claims, 22 Drawing Sheets

Specification includes a Sequence Listing.

(56) References Cited

OTHER PUBLICATIONS

Sharma, Sherven et al., "Secondary Lymhoid Tissue Chemokine Mediates T Cell-Dependent Antitumor Response In Vivo", The Journal of Immunology, vol. 164, No. 9, May 2000, pp. 4558-4563.
English Translation of the International Search Report mailed Aug. 19, 2019 corresponding to PCT/CN2019/087077 filed May 15, 2019; 5 pages.
Comerford, I. et al., "A Myriad of Functions and Complex Regulation of The CCR7/CCL19/CCL21 Chemokine Axis in Adaptive Immune System," *Cytokine & Growth Factor Reviews* (Jun. 30, 2013) 24(3):269-283.

* cited by examiner

GENETICALLY ENGINEERED CELL AND APPLICATION THEREOF

RELATED APPLICATIONS

The present application is a U.S. national stage application under 35 U.S.C. § 371 of International Patent Application No. PCT/CN2019/087077, filed on May 15, 2019, which claims priorities of the Chinese patent application CN201810463564.7, the application date of which is May 15, 2018; the Chinese patent application CN201811088090.9, the application date of which is Sep. 18, 2018; the Chinese patent application CN201811552806.6, the application date of which is Dec. 19, 2018; and the Chinese patent application CN201910151930.X, the application date of which is Feb. 28, 2019. The full contents of the PCT and the Chinese patent applications as said above are incorporated herein.

REFERENCE TO SEQUENCE LISTING

The instant application contains a Substitute Sequence Listing, which has been filed electronically in ASCII format and is hereby incorporated by reference in its entirety. Said ASCII copy, created on May 15, 2018, is named P19401638C_Sequence_listing.txt and is 42,004 bytes in size.

TECHNICAL FIELD

The present invention belongs to the field of cell therapy, and relates to genetically engineered cells and applications thereof. In particular, the present invention relates to cells comprising an exogenous receptor specifically binding to a target antigen and exogenous CCL21.

BACKGROUND

CAR-T cells can specifically kill tumors in a MHC non-restrictive manner, and exhibit good application prospects in tumor immunotherapy, but there are still many limitations, such as poor efficacy on solid tumors, and a candidate drug showing excellent effects in vitro often fails to show corresponding effects in vivo.

Adachi et al. tried to use CAR-T cells expressing IL7 and CCL19 (IL-7 and CCL19 expression in CAR-T cells improves immune cell infiltration and CAR-T cell survival in the tumor. Nature Biotechnology, 2018, 36(4), 346-351), to improve the anti-tumor abilities of CAR-T cells.

SUMMARY OF THE INVENTION

The purpose of the present invention is to provide a genetically engineered cell.

In the first aspect of the present invention, a genetically engineered cell is provided, wherein the cell comprises an exogenous receptor specifically binding to a target antigen and exogenous CCL21.

In a specific embodiment, the cell expresses an exogenous receptor specifically binding to a target antigen, exogenous CCL21 and a protein promoting the proliferation of the cell. Preferably, the protein promoting the proliferation of the cell is an IL-7R-binding protein or exogenous IL-7.

In a specific embodiment, the IL-7R-binding protein is an exogenous IL-7R-binding protein, that is, the cell comprises an exogenous receptor specifically binding to a target antigen, exogenous CCL21 and exogenous IL-7R-binding protein.

In a specific embodiment, the exogenous IL-7R-binding protein can specifically bind to IL-7R and improve activities of IL-7R.

In a specific embodiment, the exogenous IL-7R-binding protein is selected from IL-7R antibodies. Preferably, the amino acid sequence of the exogenous IL-7R is shown in SEQ ID NO: 19.

In a specific embodiment, the exogenous CCL21 is natural CCL21, or a truncated fragment of natural CCL21, or a mutant of natural CCL21 having the same function as natural CCL21.

In a specific embodiment, the natural CCL21 has at least 80%, 85%, 90%, 95%, 98% or 99% sequence identity with the amino acid sequence as shown in SEQ ID NO: 21, or is a truncated fragment of the amino acid sequence as shown in SEQ ID NO: 21; or has at least 80%, 85%, 90%, 95%, 98% or 99% sequence identity with the amino acid sequence encoded by the nucleotide sequence as shown in SEQ ID NO: 14 or 15, or is a truncated fragment of an amino acid sequence encoded by the nucleotide sequence as shown in SEQ ID NO: 14 or 15. In a preferred embodiment, the natural CCL21 is human CCL21, the amino acid sequence of which is shown in SEQ ID NO: 21; or the amino acid sequence of which is encoded by the nucleotide sequence as shown in SEQ ID NO: 14 or 15.

In a specific embodiment, the exogenous CCL21 is constitutively expressed.

In a specific embodiment, the exogenous CCL21 is inducibly expressed. In a preferred embodiment, the inducible expression is initiated by an immune cell inducible promoter. In a preferred embodiment, the immune cell inducible promoter is NFAT promoter.

In a specific embodiment, the exogenous IL-7 is natural IL-7, or a truncated fragment of natural IL-7, or a mutant of natural IL-7 having the same function as natural IL-7.

In a specific embodiment, the amino acid sequence of the natural IL-7 has at least 90% sequence identity with the amino acid sequence as shown in SEQ ID NO: 18, or is a truncated fragment of the amino acid sequence as shown in SEQ ID NO: 18; or has at least 90% sequence identity with the amino acid sequence encoded by the nucleotide sequence as shown in SEQ ID NO: 13, or is a truncated fragment of an amino acid sequence encoded by the nucleotide sequence as shown in SEQ ID NO: 13.

In a specific embodiment, the exogenous IL-7R-binding protein or exogenous IL-7 is constitutively expressed.

In a preferred embodiment, the exogenous IL-7R-binding protein or exogenous IL-7 is inducibly expressed.

In a preferred embodiment, the inducible expression is initiated by an immune cell inducible promoter. In a preferred embodiment, the immune cell inducible promoter is NFAT promoter.

In a specific embodiment, the cell is an immune effector cell. In a specific embodiment, the immune effector cells are selected from T cells, B cells, natural killer (NK) cells, natural killer T (NKT) cells, mast cells or bone marrow-derived phagocytes or a combination thereof; preferably, the immune effector cells are selected from T cells or NK cells; and more preferably, the immune effector cells are T cells.

In a specific embodiment, the cells are derived from autologous cells; preferably, autologous T cells, autologous NK cells; more preferably, autologous T cells.

In a specific embodiment, the cells are derived from allogeneic cells; preferably, allogeneic T cells or allogeneic NK cells (also including a cell line of NK cells, such as NK92 cells).

In a specific embodiment, the target antigen is a tumor antigen or a pathogen antigen.

In a specific embodiment, the target antigen is a tumor antigen. In a preferred embodiment, the target antigen is selected from: Thyroid-stimulating hormone receptor (TSHR); CD171; CS-1; C-type lectin-like molecule-1; Ganglioside GD3; Tn antigen; CD19; CD20; CD 22; CD 30; CD 70; CD 123; CD 138; CD33; CD44; CD44v7/8; CD38; CD44v6; B7H3 (CD276), B7H6; KIT (CD117); Interleukin 13 receptor subunit α (IL-13Rα); Interleukin 11 receptor α (IL-11Rα); Prostate Stem Cell Antigen (PSCA); Prostate Specific Membrane Antigen (PSMA); Carcinoembryonic Antigen (CEA); NY-ESO-1; HIV-1 Gag; MART-1; gp100; Tyrosinase; Mesothelin; EpCAM; Protease serine 21 (PRSS21); Vascular endothelial growth factor receptor; Lewis (Y) antigen; CD24; Platelet-derived growth factor receptor β (PDGFR-β); Stage-specific embryonic antigen-4 (SSEA-4); Cell Surface-associated mucin 1 (MUC1), MUC6; epidermal growth factor 20 receptor family and mutants thereof (EGFR, EGFR2, ERBB3, ERBB4, EGFRvIII); nerve cell adhesion molecule (NCAM); carbonic anhydrase IX (CAIX); LMP2; Ephrin A receptor 2 (EphA2); Fucosyl GM1; Sialyl Lewis adhesion molecule (sLe); Ganglioside GM3; TGS5; High molecular weight melanoma associated antigen (HMWMAA); o-acetyl GD2 ganglioside (OAcGD2); folate receptor; tumor vascular endothelial marker 25 1 (TEM1/CD248); tumor vascular endothelial marker 7 related (TEM7R); Claudin 6, Claudin 18.2 (CLD18A2), Claudin18.1; ASGPR1; CDH16; 5T4; 8H9; αvβ6 integrin; B cell maturation antigen (BCMA); CA9; κ light chain (kappa light chain); CSPG4; EGP2, EGP40; FAP; FAR; FBP; embryonic type AchR; HLA-A1, HLA-A2; MAGEA1, MAGE3; KDR; MCSP; NKG2D ligand; PSC1; ROR1; Sp17; SURVIVIN; TAG72; TEM1; Fibronectin; Tenascin; Carcinoembryonic variant of tumor necrosis; G protein-coupled receptor class C group 5-member D (GPRC5D); X chromosome open reading frame 61 (CXORF61); CD97; CD179a; anaplastic lymphoma kinase (ALK); polysialic acid; placental specific 1 (PLAC1); hexose moiety of globoH glycoceramide (GloboH); breast differentiation antigen (NY-BR-1); uroplakin 2 (UPK2); hepatitis A virus cell receptor 1 (HAVCR1); adrenergic receptor 5 β3 (ADRB3); pannexin 3 (PANX3); G protein coupled receptor 20 (GPR20); lymphocyte antigen 6 complex locus K9 (LY6K); olfactory receptor 51E2 (OR51E2); TCRγ alternating reading frame protein (TARP); Wilms tumor protein (WT1); ETS translocation variant gene 6 (ETV6-AML); Sperm protein 17 (SPA17); X antigen family member 1A (XAGE1); Angiopoietin-binding cell surface receptor 2 (Tie2); melanoma testis antigen-1 (MAD-CT-1); melanoma testis antigen-2 (MAD-CT-2); Fos-related antigen 1; p53 mutant; human telomerase reverse transcriptase (hTERT); sarcoma translocation breakpoint; melanoma inhibitor of apoptosis (ML-IAP); ERG (transmembrane protease serine 2 (TMPRSS2) ETS fusion gene); N-acetylglucosaminyl transferase V (NA17); matching box protein Pax-3 (PAX3); androgen receptor; Cyclin B1; V-myc avian myeloidosis virus oncogene neuroblastoma-derived homolog (MYCN); Ras homolog family member C (RhoC); Cytochrome P450 1B1 (CYP1B1); CCCTC binding factor (zinc finger protein)-like (BORIS); squamous cell carcinoma antigen 3 (SART3) recognized by T cells; paired box protein Pax-5 (PAX5); proacrosin-binding protein sp32 (OYTES1); Lymphocyte specific protein tyrosine kinase; A kinase anchoring protein 4 (AKAP-4); Synovial sarcoma X breakpoint 2 (SSX2); CD79a; CD79b; CD72; Leukocyte-associated immunoglobulin-like receptor 1 (LAIR1); Fc fragment of IgA receptor (FCAR); Leukocyte immunoglobulin-like receptor subfamily member 2 (LILRA2); CD300 molecular-like family member f (CD300LF); C-type lectin domain family 12 member A (CLEC12A); bone marrow stroma Cell antigen 2 (BST2); Mucin-like hormone receptor-like 2 (EMR2) containing EGF-like module; Lymphocyte antigen 75 (LY75); Glypican-3 (GPC3); Fc receptor-like 5 (FCRL5); Immunoglobulin λ-like polypeptide 1 (IGLL1).

In a preferred embodiment, the target antigen is GPC3, EGFR, EGFRVIII or Claudin18.2.

In a specific embodiment, the target antigen is a pathogen antigen. In a preferred embodiment, the pathogen antigen is derived from viruses, bacteria, fungi, protozoa, or parasites. In a specific embodiment, the viral antigen is selected from: cytomegalovirus antigen, Epstein-Barr virus antigen, human immunodeficiency virus antigen or influenza virus antigen.

In a specific embodiment, the exogenous receptor is a chimeric receptor, and the chimeric receptor includes an antigen binding domain, a transmembrane domain and an intracellular domain.

In a specific embodiment, the exogenous receptor is a chimeric receptor selected from the group consisting of chimeric antigen receptor (CAR), modified T cell (antigen) receptor (TCR), T Cell fusion protein (TFP), T cell antigen coupler (TAC) or a combination thereof.

In a preferred embodiment, the exogenous receptor is a chimeric antigen receptor, and the antigen binding domain of the chimeric antigen receptor includes: antibody, antibody fragment, scFv, Fv, Fab, (Fab')2, single domain antibody (SDAB), VH or VL domain, or camelid VHH domain, or natural ligand of corresponding antigen, or a combination thereof.

In a preferred embodiment, the exogenous receptor is a chimeric antigen receptor, and the transmembrane domain of the chimeric antigen receptor includes a transmembrane domain of a protein selected from the group consisting of: a, B or ¿ chain of a T cell receptor, CD28, CD3ε, CD45, CD4, CD5, CD8, CD9, CD16, CD22, CD33, CD37, CD64, CD80, CD86, CD134, CD137, CD154, KIRDS2, OX40, CD2, CD27, LFA-1 (CD11a, CD18), ICOS (CD278), 4-1BB (CD137), GITR, CD40, BAFFR, HVEM (LIGHTR), SLAMF7, NKp80 (KLRF1), CD160, CD19, IL2Rβ, IL2Rγ, IL7Rα, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), SLAMF6 (NTB-A, Ly108), SLAM (SLAMF1, CD150, IPO-3), BLAME (SLAMF8), SELPLG (CD162), LTBR, PAG/Cbp, NKp44, NKp30, NKp46, NKG2D and NKG2C.

In a preferred embodiment, the exogenous receptor is a chimeric antigen receptor, and the intracellular domain of the chimeric antigen receptor includes: a primary signaling domain and/or costimulatory signaling domain, wherein: (1) the primary signaling domain comprises a functional signaling domain of a protein selected from: CD3ζ, CD3γ, CD3δ, CD3ε, common FcRγ (FCER1G), FcRβ (FcεR1b), CD79a, CD79b, FcγRIIa, DAP10, and DAP12, or a combination thereof; and/or (2) the costimulatory signal transduction domain comprises a functional signal transduction domain selected from the following proteins: CD27, CD28, 4-1BB (CD137), OX40, CD30, CD40, PD-1, ICOS, Lymphocyte function related antigen-1 (LFA-1), CD2, CD7, LIGHT, NKG2C, B7-H3, ligand specifically binding to CD83, CDS, ICAM-1, GITR, BAFFR, HVEM (LIGHTR), SLAMF7, NKp80 (KLRF1), CD160, CD19, CD4, CD8α, CD8β, IL2Rβ, IL2Rγ, IL7Rα, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, TRANCE/RANKL, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, NKp44, NKp30, NKp46 and NKG2D, or a combination thereof.

In a specific embodiment, the chimeric antigen receptor includes: (i) an antibody or a fragment thereof specifically binding to a target antigen, a transmembrane domain of CD28 or CD8, a costimulatory signal domain of CD28, and CD3ζ; or (ii) an antibody or a fragment thereof specifically binding to a target antigen, the transmembrane domain of CD28 or CD8, the costimulatory signal domain of 4-1BB, and CD3ζ; or (iii) an antibody or a fragment thereof specifically binding to the target antigen, the transmembrane domain of CD28 or CD8, the costimulatory signal domain of CD28, the costimulatory signal domain of 4-1BB and CD3ζ.

In a specific embodiment, the amino acid sequence of the antigen binding domain of the exogenous receptor has at least 90% identity with the sequence as shown in SEQ ID NO: 2.

In a specific embodiment, the amino acid sequence of the exogenous receptor has at least 90% identity with the sequence as shown in SEQ ID NO: 26, 27 or 35.

In a specific embodiment, the exogenous receptor, and/or exogenous IL-7R binding protein, and/or exogenous CCL21 are expressed by using a viral vector. Preferably, the viral vectors include: lentiviral vectors, retroviral vectors or adenovirus vectors.

In the second aspect of the present invention, an expression construct is provided. The expression construct comprises sequentially connected: an expression cassette 1 for an exogenous receptor specifically binding to a target antigen, an expression cassette 2 for exogenous IL-7R binding protein or exogenous IL-7, and an expression cassette 3 exogenous for CCL21. Preferably, the expression cassettes are connected by tandem fragments, selected from F2A, PA2, T2A, and/or E2A, among which, nucleic acid sequences of F2A and P2A are shown in SEQ ID NO: 11 and SEQ ID NO: 16, respectively.

In the third aspect of the present invention, an expression vector is provided, comprising the expression construct of the second of the present invention.

In the fourth aspect of the present invention, a virus is provided, comprising the expression vector of the third aspect of the present invention.

In the fifth aspect of the present invention, a method for improving the viability of immune response cells is provided, comprising co-expressing in the immune response cells: the chimeric antigen receptor specifically binding to a target antigen of the first aspect of the present invention, exogenous IL-7R binding protein or exogenous IL-7, exogenous CCL21.

In the sixth aspect of the present invention, a use of the cell of the first aspect of the present invention, or the expression construct of the second aspect of the present invention, or the expression vector of the third aspect of the present invention, or the virus of the fourth aspect of the invention is provided for preparing a drug for inhibiting tumors, inhibiting pathogens, or enhancing the immune tolerance of a subject. In a specific embodiment, the use is to prepare a drug for inhibiting tumors. In a preferred embodiment, the prepared drug for inhibiting tumors is used in combination with a chemotherapeutic drug.

In a specific embodiment, the tumor is a hematological tumor.

In a specific embodiment, the tumor is a solid tumor.

In a specific embodiment, the tumor is selected from: colon cancer, rectal cancer, renal cell carcinoma, liver cancer, non-small cell lung cancer, small bowel cancer, esophageal cancer, melanoma, bone cancer, pancreatic cancer, skin cancer, head and neck cancer, skin or intraocular malignant melanoma, uterine cancer, ovarian cancer, rectal cancer, anal cancer, stomach cancer, testicular cancer, uterine cancer, fallopian tube cancer, endometrial cancer, cervical cancer, vagina cancer, vulva cancer, Hodgkin's disease, non-Hodgkin's lymphoma, endocrine system cancer, thyroid cancer, parathyroid cancer, adrenal cancer, soft tissue sarcoma, urethral cancer, penile cancer, childhood solid tumors, bladder cancer, renal or ureteral cancer, renal pelvis cancer, central nervous system (CNS) tumors, primary CNS lymphoma, tumor angiogenesis, spinal tumor, brainstem glioma, pituitary adenoma, Kaposi's sarcoma, epidermoid carcinoma, squamous cell carcinoma, T-cell lymphoma, environmentally induced cancer, a combination thereof and the metastatic foci of the cancer.

In a preferred embodiment, the solid tumor is selected from: colon cancer, rectal cancer, renal cell carcinoma, liver cancer, non-small cell lung cancer, small intestine cancer, esophageal cancer, melanoma, bone cancer, pancreatic cancer, skin cancer, head and neck cancer, skin or intraocular melanoma, uterine cancer, ovarian cancer, rectal cancer, anal cancer, stomach cancer, testicular cancer, uterine cancer, fallopian tube cancer, endometrial cancer, cervical cancer, vaginal cancer, vulva cancer, endocrine system cancer, thyroid cancer, parathyroid cancer, adrenal cancer, Soft tissue sarcoma, urethral cancer, penile cancer, bladder cancer, renal or ureteral cancer, renal pelvis cancer, central nervous system (CNS) tumor, primary CNS lymphoma, tumor angiogenesis, spine tumor, brain stem glioma, Pituitary adenoma, Kaposi's sarcoma, epidermoid cancer, squamous cell carcinoma.

Preferably, the solid tumor is selected from: colon cancer, rectal cancer, liver cancer, non-small cell lung cancer, small intestine cancer, esophagus cancer, pancreatic cancer, head and neck cancer, skin or intraocular melanoma, uterine cancer, ovarian cancer, rectal cancer, anal cancer, gastric cancer. More preferably, the solid tumor is gastric cancer, pancreatic cancer, or esophageal cancer.

In the seventh aspect of the present invention, a pharmaceutical composition is provided, comprising the cell of the first aspect of the present invention and a pharmaceutically acceptable carrier or excipient.

In the eighth aspect of the present invention, a kit is provided, comprising kit A and kit B. The kit A comprises genetically engineered cells, and the cells comprises the exogenous receptor specifically binding to the target antigen of the first aspect of the present invention. The kit B comprises CCL21, and/or a protein that promotes the proliferation of the cells. Preferably, the protein that promotes the proliferation of the cells includes the IL-7R binding protein or IL-7 of the first aspect of the present invention. More preferably, the kit A and the kit B can be administered in any order.

In a preferred embodiment, the kit A comprises immune effector cells modified by chimeric receptors. Preferably, the chimeric receptor is a chimeric antigen receptor.

In a preferred example, the immune effector cells are T cells, NK cells or NKT cells.

In the ninth aspect of the present invention, a method for suppressing tumors or suppressing pathogens or enhancing the immune tolerance of a subject is provided, comprising administering the cells of the first aspect of the present invention, or the pharmaceutical composition of the seventh aspect of the present invention or the kit of the eighth aspect of the present invention. Preferably, the method also includes the administration of a chemotherapy drugs.

Beneficial Advantages of the Invention

1. The cells provided by the invention can improve cell survival and capacity due to the co-expression of an exogenous receptor specifically binding to the target antigen, exogenous IL-7R binding protein or exogenous IL-7, and exogenous CCL21.
2. The immune effector cells prepared by the technical solution of the present invention have excellent tumor cell killing abilities.
3. During the treatment of cancer, the cells prepared by the technical solution of the present invention can resist the immunosuppression in the cancer micro-environment, thereby significantly enhancing effects on solid tumors. It also has good effects on refractory and progressive cancers.

DESCRIPTION OF THE DRAWINGS

FIG. 1B is a plasmid map of MSCV-hu8E5 (2I)-m28Z-F2A-mIL-7-P2A-mCCL21a;
FIG. 1E is a plasmid map of MSCV-hu8E5 (2I)-mBBZ-F2A-mIL-7-P2A-mCCL21a.

MODES FOR CARRYING OUT THE INVENTION

Figure 1A:
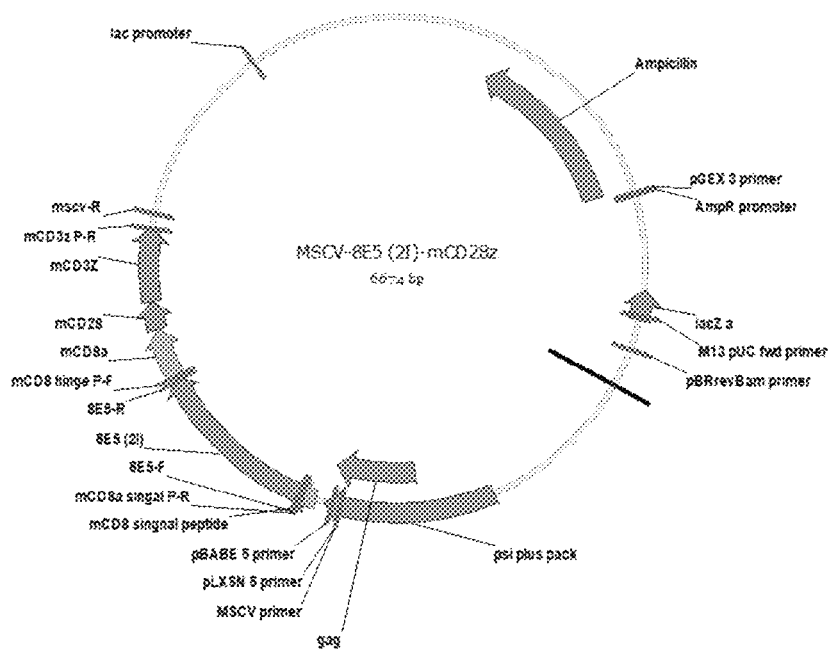
FIG. 1A is a plasmid map of MSCV-hu8E5 (2I)-m28Z.

In the present invention, it was found that immune effector cells expressing an exogenous receptor targeting a tumor antigen and CCL21 can not only have more excellent killing effects on tumors, but also improve the survival of the immune effector cells in tumor tissues, and show better anti-tumor abilities even for the refractory solid tumors.

Based on the present disclosure, a skilled person should appreciate that many changes or modifications can be made in the disclosed specific embodiments while still obtain the same or similar results without departing from the spirit and scope described herein. The scope of the present invention is not limited to the specific embodiments described herein (which are only intended to exemplify various aspects described herein), and it should be appreciated that functionally equivalent methods and components are still included herein within the stated range.

Unless specifically defined herein, all of the technical and scientific terms used herein have the same meaning as commonly understood by ae skilled person in the fields of gene therapy, biochemistry, genetics, and molecular biology. All methods and materials similar or equivalent to those described herein can be used in the practice of or testing the present invention. Unless otherwise stated, traditional techniques of cell biology, cell culture, molecular biology, transgenic biology, microbiology, recombinant DNA, and immunology will be adopted in the practice of the present invention, all of which belong to the technical scope of the field. Such techniques are explained in detail in the literature. See, for example, Current Protocols in Molecular Biology (Frederick M. AUSUBEL, 2000, Wiley and son Inc, Library of Congress, USA); Molecular Cloning: A Laboratory Manual, Third Edition, (Sambrook et al, 2001, Cold Spring Harbor, New York: Cold Spring Harbor Laboratory Press); Oligonucleotide Synthesis (M. J. Gait ed., 1984); Mullis et al. U.S. Pat. No. 4,683,195; Nucleic Acid Hybridization (B. D. Harries & S. J. Higgins eds. 1984); Transcription And Translation (B. D. Hames & S. J. Higgins eds. 1984); Culture Of Animal Cells (R. I. Freshney, Alan R. Liss, Inc., 1987); Immobilized Cells And Enzymes (IRL Press, 1986); B. Perbal, A Practical Guide To Molecular Cloning (1984); the series, Methods In ENZYMOLOGY (J. Abelson 和 M. Simon, eds.-in-chief, Academic Press, Inc., New York), especially Vols. 154和 155 (Wu et al. eds.) and Vol. 185, "Gene Expression Technology" (D. Goeddel, ed.); Gene Transfer Vectors For Mammalian Cells (J. H. Miller 和 M. P. Caloseds., 1987, Cold Spring Harbor Laboratory); Immunochemical Methods In Cell And Molecular Biology (Mayer和 Walker, eds., Academic Press, London, 1987); Hand book Of Experimental Immunology, Vol I-IV (D. M. Weir和 C. C. Blackwell, eds., 1986); and Manipulating the Mouse Embryo (Cold Spring Harbor Laboratory Press, Cold Spring Harbor, N.Y., 1986).

All of publications, patent applications, patents and other references mentioned herein are incorporated by reference in their entirety. In case of conflict, the present specification, including definitions, will control. In addition, the materials, methods, and examples are illustrative only and are not intended to be limiting, unless otherwise specified.

The term as used herein "engineered" and other grammatical forms thereof may refer to one or more changes of nucleic acids, such as nucleic acids within the genome of an organism. The term "engineered" may refer to a change, addition and/or deletion of a gene. Engineered cells can also refer to cells that contain added, deleted, and/or changed genes.

The term "genetically engineered cell" as used herein refers to a cell modified by means of genetic engineering. In some embodiments, the cell is an immune effector cell. In some embodiments, the cell is a T cell. In some embodiments, the genetically engineered cell described herein refers to a cell expressing an exogenous receptor that specifically binds to a target antigen. In some embodiments, the genetically engineered cell described herein refers to a cell that expresses an exogenous receptor specifically binding to a target antigen and expresses an exogenous CLL21. In some embodiments, the genetically engineered cell described herein may also be a T cell co-expressing a chimeric antigen receptor specifically binding to a tumor antigen, CLL21 and a T cell proliferation-promoting protein. In some embodiments, the genetically engineered cell described herein may also be a T cell co-expressing a chimeric antigen receptor specifically binding to a tumor antigen, CLL21 and IL-7R-binding protein or an exogenous IL-7.

The term "immune effector cell" refers to a cell participating in an immune response and producing immune effects, such as a T cell, B cell, natural killer (NK) cells natural killer T (NKT) cell, mast cell, and bone marrow-derived phagocyte. In some embodiments, the immune effector cell is a T cell, NK cell, NKT cell. In some embodiments, the T cell can be an autologous T cell, xenogeneic T cell, or allogeneic T cell. In some specific embodiments, the NK cell may be an allogeneic NK cell.

The terms "peptide", "polypeptide" and "protein" can be used interchangeably and refer to a compound composed of amino acid residues covalently linked by peptide bonds. The protein or peptide must contain at least two amino acids, and there is no limit to the maximum number of amino acids that can be included in the sequence of a protein or peptide. Polypeptides include any peptide or protein containing two or more amino acids linked to each other by peptide bonds. As used herein, the term refers to short chains (which are also commonly referred to in the art as peptides, oligopeptides, and oligomers, for example) and longer chains (which are also commonly referred to as proteins in the art often with various types). "Polypeptide" includes, for example, biologically active fragments, substantially homologous polypeptides, oligopeptides, homodimers, heterodimers, polypeptide variants, modified polypeptides, derivatives, analogs, fusion proteins, and the like. Polypeptides include natural peptides, recombinant peptides or a combination thereof.

The term "IL-7 (Interleukin7 or IL7)" refers to a protein (preferably from a mammal, such as murine or human) that can interact with (e.g., bind to) IL-7R (preferably from a mammal, such as murine or human IL-7R), and have one of the following characteristics: (i) an amino acid sequence of naturally occurring mammalian IL-7 or a fragment thereof, such as the amino acid sequence as shown in SEQ ID NO: 18 (human) or a fragment thereof; (ii) an amino acid sequence substantially having, for example at least 85%, 90%, 95%, 96%, 97%, 98%, 99% homology to the sequence as shown in SEQ ID NO: 18 (human) or a fragment thereof; (iii) an amino acid sequence encoded by a nucleotide sequence of a naturally occurring mammalian IL-7 or a fragment thereof (for example, SEQ ID NO: 17 (human) or a fragment thereof); (iv) an amino acid sequence encoded by a nucleotide sequence having, for example, at least 85%, 90% %, 95%, 96%, 97%, 98%, 99% homology to the nucleotide sequence as shown in SEQ ID NO: 17 (human) or a fragment thereof; (v) an amino acid sequence encoded by a degenerate nucleotide sequence from a naturally occurring IL-7 nucleotide sequence or a fragment thereof (for example, SEQ ID NO: 17 (human) or a fragment thereof); or (vi) a nucleotide sequence that hybridizes to one of the aforementioned nucleotide sequences under stringent conditions.

"Exogenous IL-7R-binding protein" refers to all proteins that can specifically bind to IL-7R and enhance the activity of IL-7R. "Enhancing IL-7R activity" should be understood to mean that IL-7R-binding protein can enhance any one or more activities of naturally occurring IL-7R, including but not limited to stimulating the proliferation, cytotoxicity or maturation of NK cells; stimulating the proliferation or differentiation of B cells and T cells; stimulating the production and affinity maturation of antibodies in B cells; stimulating the cytotoxicity of CD8+ T cells; stimulating the production of interferon γ in T cells and NK cells; inhibiting the activation and maturation of dendritic cells (DC); inhibiting the release of inflammatory mediators from mast cells; enhancing the phagocytosis of macrophages; inhibiting the production or survival of TReg cells; and stimulating the proliferation of bone marrow progenitor cells.

"CCL21 (Chemokine (CC motif) ligand 21)" is one of the main immunochemokines, expressed in the T cell area of the secondary lymphatic tissues of the spleen and lymph nodes, and is responsible for the recruitment of antigen-activated (mature) dendritic cells (DC), immature DC and naive T cells. In the present invention, CCKL21 has one of the following characteristics: (i) an amino acid sequence of naturally occurring mammalian CCL21 or a fragment thereof, such as the amino acid sequence as shown in SEQ ID NO: 21 (human) or a fragment thereof; (ii) an amino acid sequence substantially having, for example at least 85%, 90%, 95%, 96%, 97%, 98%, 99% homology to the sequence as shown in SEQ ID NO: 21 (human) or a fragment thereof; (iii) an amino acid sequence encoded by a nucleotide sequence of a naturally occurring mammalian CCL21 or a fragment thereof (for example, SEQ ID NO: 20 (human) or a fragment thereof); (iv) an amino acid sequence encoded by a nucleotide sequence having, for example, at least 85%, 90% %, 95%, 96%, 97%, 98%, 99% homology to the nucleotide sequence as shown in SEQ ID NO: 20 (human) or a fragment thereof; (v) an amino acid sequence encoded by a degenerate nucleotide sequence from a naturally occurring CCL21 nucleotide sequence or a fragment thereof (for example, SEQ ID NO: 20 (human) or a fragment thereof); or (vi) a nucleotide sequence that hybridizes to one of the aforementioned nucleotide sequences under stringent conditions.

The term "amino acid modification" includes amino acid substitutions, additions and/or deletions, and "amino acid substitution" means that an amino acid at a specific position in the parent polypeptide sequence is replaced with another amino acid. "Amino acid insertion" as used herein means that an amino acid is added at a specific position in the parent polypeptide sequence. As used herein, "amino acid deletion" or "deletion" means that an amino acid at a specific position in the parent polypeptide sequence is deleted. As used herein, the term "conservative modification" refers to an amino acid modification that does not significantly affect or change the binding characteristics of an antibody comprising the amino acid sequence. Such conservative modifications include amino acid substitutions, insertions and deletions. Modifications can be introduced into the antibody of the invention by standard techniques known in the art, such as site-directed mutagenesis and PCR-mediated mutagenesis. Conservative amino acid substitutions are substitutions of amino acid residues with amino acid residues having similar side chains. Families of amino acid residues with similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, serine, threonine, tyrosine, cysteine, tryptophan), non-polar side chains (eg, alanine, valine, leucine, isole Amino acid, proline, phenylalanine, methionine), β branched side chains (e.g., threonine, valine, isoleucine) and aromatic side chains (e.g., tyrosine, phenylalanine, tryptophan, histidine).

When referring to a protein and DNA, the terms "wild type", "parent", and "natural" as used herein have the same meaning. The term "mutation", "variant" or "mutant" has the same or better biological activities as the natural protein or natural DNA, in which there is one or more substitutions, additions, or deletions of amino acids in the amino acid sequence of the natural protein; or one or more substitutions, additions or deletions of nucleotides in the nucleic acid sequence of natural DNA. In a specific embodiment, the sequence of the mutant herein has at least about 80%, preferably at least about 90%, more preferably at least about 95%, and more preferably at least about 97%, preferably at least about 98%, most preferably at least about 99% identity to the amino acid sequence of a natural protein or nucleic acid sequence of natural DNA. For example, a "variant of IL-7" generally refers to a polypeptide having similar or better biological activities to IL-7 obtained by amino acid modification of wild-type IL-7. The term "truncated fragment" refers to a non-full-length form of a natural protein or natural DNA, in which there are consecutive or non-contiguous deletions of multiple amino acid residues or nucleotides in the natural amino acid sequence or nucleic acid sequence, and such deletions occur in any position of the sequence, such as head, middle, tail or a combination thereof. In the present invention, the truncated fragment of a protein still retains the same function as the natural protein from which it is derived.

"Constitutive expression", also known as continuous expression, refers to the continuous expression of genes in cells under almost all physiological conditions. The term "inducible expression" refers to the expression under certain conditions, such as when T cells bind to an antigen.

The terms "effective amount" are used interchangeably herein and refer to the amount of a compound, preparation, substance, or composition which is effective to achieve specific biological results, such as but not limited to an amount or dosage sufficient to promote T cell responses. When indicating "immunologically effective amount", "anti-tumor effective amount", "tumor-inhibiting effective amount" or "therapeutically effective amount", the precise administration dose of the immune effector cells or therapeutic agents described herein can be determined by a physician in consideration of the individual's age, weight, tumor size, degree of metastasis, and the condition of the patient (subject). An effective amount of immune effector cells refers to, but is not limited to, the number of immune effector cells which can increase, enhance or prolong the anti-tumor activity of the immune effector cells; increase the number of anti-tumor immune effector cells or activated immune effector cells; and promote IFN-γ secretion, tumor regression, tumor shrinkage and tumor necrosis.

The term "promoter" as used herein is a DNA sequence recognized by a synthetic mechanism of a cell or an introduced synthetic mechanism required to initiate the specific transcription of a polynucleotide sequence.

A typical eukaryotic promoter consists of a minimal promoter and other cis elements. The minimal promoter is essentially a TATA box region, where RNA polymerase II (polII), TATA binding protein (TBP) and TBP-related factor (TAF) can be combined to initiate transcription. It has been found that such sequence elements (e.g., enhancers) increase the overall expression level of adjacent genes, generally in a location and/or orientation-independent manner.

NFAT (Nuclear factor of activated T cells) is a nuclear factor of activated T cells. In some specific embodiments, NFAT plays an important role in the transcription and expression of cytokines during T cell activation. In some embodiments, CCL 21 and IL-7 is inducibly expressed using an inducible promoter. In some embodiments, the inducible promoter is NFAT promoter. In some embodiments, the encoding sequence of CCL 21 and IL-7 is placed under the regulation of the minimal promoter containing NFAT binding motif. In some specific embodiments, the IL2 minimal promoter containing 6 NFAT binding motifs is a promoter composed of 6 NFAT binding sites and IL2 minimal promoter in tandem.

In some embodiments, the antigen-binding receptor described herein refers to a chimeric receptor. "Chimeric receptor" as used herein refers to a fusion molecule formed by linking DNA fragments or cDNAs corresponding to proteins from different sources using gene recombination technology. A chimeric receptor generally includes an extracellular domain, transmembrane domain, and intracellular domain. The chimeric receptor that can be used in the present invention includes but not limited to: chimeric antigen receptor (CAR), modified T cell (antigen) receptor (TCR), T cell fusion protein (TFP), T cell antigen coupler (TAC).

The term "Open Reading Frame (ORF)" is the normal nucleotide sequence of a structural gene. The reading frame from the start codon to the stop codon can encode a complete polypeptide chain without a stop codon which can interrupt the translation.

As used herein, "chimeric antigen receptor" or "CAR" refers to a group of polypeptides that, when present in immune effector cells, render the cells with specificity against target cells (usually cancer cells) and generate intracellular signals. CAR usually includes at least one extracellular antigen binding domain (also named as extracellular region), transmembrane domain (also named as transmembrane region), and cytoplasmic signaling domain (also named herein as "intracellular signaling domain" or "intracellular region") which includes functional signaling domains derived from stimulatory molecules and/or costimulatory molecules as defined below. In certain aspects, groups of polypeptides are bound to each other. The group of polypeptides includes a dimerization switch that can couple polypeptides to each other in the presence of a dimerization molecule, for example, for coupling an antigen-binding domain to an intracellular signal transduction domain. In one aspect, the stimulatory molecule is the chain binding to T cell receptor complex. In one aspect, the cytoplasmic signaling domain further comprises one or more functional signaling domains derived from at least one costimulatory molecule as defined below. In one aspect, the costimulatory molecule is selected from the costimulatory molecules described herein, such as 4-1BB (i.e., CD137), CD27 and/or CD28. In one aspect, the CAR comprises a chimeric fusion protein comprising an extracellular antigen binding domain, transmembrane domain and intracellular signaling domain comprising a functional signaling domain derived from a stimulatory molecule. In one aspect, the CAR comprises a chimeric fusion protein comprising an extracellular antigen-binding domain, transmembrane domain and a functional signaling domain derived from a co-stimulatory molecule and an intracellular signaling domain derived from a functional signaling domain of a stimulatory molecule. In one aspect, the CAR comprises a chimeric fusion protein comprising an extracellular antigen-binding domain, transmembrane domain, and comprises two functional signaling domains derived from one or more costimulatory molecules.

In one aspect, modifications of the amino acid sequence of a starting antibody or a fragment (e.g., scFv) that can produce a functionally equivalent molecule is contemplated in the present invention. For example, the VH or VL of the antigen-binding domain of the cancer-associated antigen described herein, such as the scFv contained in a CAR, can be modified to retain at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity with the initial VH or VL framework region (e.g. scFv) of the antigen-binding domain of the cancer-associated antigen described herein. Modifications of the entire CAR construct, such as modifications of one or more amino acid sequences of multiple domains of the CAR construct is envisaged in the present invention to produce functionally equivalent molecules. The CAR construct can be modified to retain at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity with the initial CAR construct.

"Transmembrane domain" (also called as membrane-spanning region) as used herein may include one or more additional amino acids adjacent to the transmembrane region, for example, one or more amino acids associated with the extracellular region of the protein, from which the transmembrane region is derived (for example, 1, 2, 3, 4, 5, 6, 7, 8, 9, 10 up to 15 amino acids in the extracellular region) and/or one or more additional amino acids associated with the extracellular region of the protein, from which the transmembrane protein is derived (e.g., 1, 2, 3, 4, 5, 6, 7, 8, 9, 10 up to 15 amino acids in the intracellular region). In one aspect, the transmembrane domain is a domain related to one of the other domains of the chimeric receptor. For example, in one embodiment, the transmembrane domain may be derived from the same protein, from which the signaling domain, co-stimulatory domain or hinge domain is derived. In some cases, the transmembrane domain can be selected or modified by amino acid substitutions to prevent such domains from binding to transmembrane domains of the same or different surface membrane proteins, for example, to minimize the interaction with other members of the receptor complex. In one aspect, the transmembrane domain is capable of being subjected to homodimerization with another chimeric receptor on the surface of the cell expressing the chimeric receptor. In a different aspect, the amino acid sequence of the transmembrane domain can be modified or substituted in order to minimize interaction with the binding domain of the natural binding partner present in cells expressing the same chimeric receptor. The transmembrane domain can be derived from natural or recombinant sources. When the source is natural source, the domain can be derived from any membrane-bound protein or transmembrane protein. In one aspect, the transmembrane domain is capable of transmitting a signal to the intracellular domain whenever the chimeric receptor binds to the target antigen. The transmembrane domain, which can be specifically used in the present invention, may include at least the following transmembrane domains: for example, α, β or ζ chains of T cell receptors, CD28, CD27, CD3ε, CD45, CD4, CD5, CD8, CD9, CD16, CD22, CD33, CD37, CD64, CD80, CD86, CD134, CD137, CD154. In some embodiments, the transmembrane domain may include at least the following transmembrane regions: for example, KIRDS2, OX40, CD2, CD27, LFA-1 (CD11a, CD18), ICOS (CD278), 4-1BB (CD137), GITR, CD40, BAFFR, HVEM (LIGHTR), SLAMF7, NKp80 (KLRF1), NKp44, NKp30, NKp46, CD160, CD19, IL2Rβ, IL2Rγ, IL7Rα, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), SLAMF6 (NTB-A, Ly108), SLAM (SLAMF1, CD150, IPO-3), BLAME (SLAMF8), SELPLG (CD162), LTBR, PAG/Cbp, NKG2D, NKG2C.

In some cases, the transmembrane domain can be connected to the extracellular region of a CAR, such as the antigen binding domain of the CAR via a hinge (for example, a hinge from a human protein). For example, in one embodiment, the hinge may be a hinge of a human Ig (immunoglobulin) (e.g., IgG4 hinge, IgD hinge), GS linker (e.g., GS linker described herein), KIR2DS2 hinge, or CD8a hinge. In one aspect, the transmembrane domain can be a recombinant transmembrane domain, in which case it will mainly contain hydrophobic residues, such as leucine and valine. In one aspect, a triplet of phenylalanine, tryptophan and valine can be found at each end of the recombinant transmembrane domain. Optionally, short oligopeptide or polypeptide linkers between 2 and 10 amino acids in length can form a bond between the transmembrane domain of the CAR and the cytoplasmic region. Glycine-serine dimer provides a particularly suitable linker.

As used herein, "intracellular domain" (also named as intracellular region) includes intracellular signaling domain. The intracellular signaling domain is generally responsible for the activation of at least one of normal effector functions of an immune cell into which the chimeric receptor has been introduced. The term "effector function" refers to the specialization function of a cell. The effector functions of a T cell can be, for example, cytolytic activity or auxiliary activity, including secretion of cytokines. Therefore, the term "intracellular signaling domain" refers to a part of a protein that transduces effector function signals and guides cells to perform specific functions. The entire intracellular signaling domain can usually be used, however, in many cases, it is not necessary to use the entire chain. When the truncated part of the intracellular signaling domain is used, such a truncated part can be used instead of the complete chain, as long as it transduces the immune effector function signal. Therefore, the term intracellular signaling domain means that a truncated portion of the intracellular signaling domain sufficient to transduce effector function signals is included.

It is well known that the signal generated by TCR alone is not sufficient to fully activate T cells, and secondary and/or costimulatory signals are also required. Therefore, T cell activation can be considered as being mediated by two different kinds of cytoplasmic signaling sequences: those that trigger antigen-dependent primary activation by TCR (primary intracellular signaling domains) and those that act in an antigen-independent manner to provide secondary or costimulatory signals (secondary cytoplasmic domains, such as costimulatory domains).

The term "stimulation" refers to the binding of a stimulatory molecule (e.g., TCR/CD3 complex or CAR) to its cognate ligand (or a tumor antigen in the case of CAR), thereby mediating the initial response induced by a signal transduction event (for example, but not limited to signal transduction via TCR/CD3 complex or signal transduction via a suitable NK receptor or the signal transduction domain of CAR). Stimulation can mediate the altered expression of certain molecules.

The term "stimulatory molecule" refers to a molecule expressed by immune cells (e.g., T cells, NK cells, B cells) to provide cytoplasmic signal transduction sequences that modulate the activation of immune cells used in at least some aspects of immune cell signaling pathways in a stimulating manner. In one aspect, the signal is a primary signal initiated by, for example, the binding of TCR/CD3 complex and MHC antigen peptide complex, and mediates T cell responses, including, but not limited to, proliferation, activation, differentiation, and the like. The primary cytoplasmic signaling sequence (also named as "primary signaling domain") that acts in a stimulating manner may contain signaling motif which is named as immunoreceptor tyrosine-based activation motif (ITAM). In particular, examples of ITAM-containing cytoplasmic signaling sequences used herein include, but are not limited to, those derived from CD3ζ, common FcRγ (FCER1G), FcγRIIa, FcRβ (FcEpsilon R1b), CD3γ, CD3δ, CD3ε, CD79a, CD79b, DAP10 and DAP12. In the specific CARs of the present invention, the intracellular signaling domain in any one or more CARs described herein includes intracellular signaling sequences, such as the primary signaling sequence of CD3-ζ. In the specific CARs of the present invention, the primary signaling sequence of CD3-ζ is equivalent residues from human or non-human species, such as mouse, rodent, monkey, ape, etc.

The term "costimulatory molecule" refers to a homologous binding partner on T cells, which specifically binds a costimulatory ligand, thereby mediating the costimulatory response of T cells, such as but not limited to proliferation. Co-stimulatory molecules are cell surface molecules other than antigen receptors or ligands thereof, which promote an effective immune response. Co-stimulatory molecules include but are not limited to MHC class I molecules, BTLA and Toll ligand receptors, and OX40, CD27, CD28, CDS, ICAM-1, LFA-1 (CD11a/CD18), ICOS (CD278) and 4-1BB (CD137). Further examples of such costimulatory molecules include CDS, ICAM-1, GITR, BAFFR, HVEM (LIGHTR), SLAMF7, NKp80 (KLRF1), NKp44, NKp30, NKp46, CD160, CD19, CD4, CD8α, CD8β, IL2Rβ, IL2Rγ, IL7Rα, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, NKG2D, NKG2C, TNFR2, TRANCE/RANKL, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, CD19a, and a ligand specifically binding to CD83.

The costimulatory intracellular signaling domain can be the intracellular part of a costimulatory molecule. The costimulatory molecules can be represented by the following proteins: TNF receptor protein, immunoglobulin-like protein, cytokine receptor, integrin, signaling lymphocyte activation molecule (SLAM protein), and NK cell receptor. Examples of such molecules include CD27, CD28, 4-1BB (CD137), OX40, GITR, CD30, CD40, ICOS, BAFFR, HVEM, ICAM-1, antigen-1 (LFA-1) associated with lymphocyte function, CD2, CDS, CD7, CD287, LIGHT, NKG2C, NKG2D, SLAMF7, NKp80, NKp30, NKp44, NKp46, CD160, B7-H3 and ligands specifically binding to CD83, etc.

The intracellular signaling domain may include all intracellular part or all of the natural intracellular signaling domain of the molecule, or a functional fragment or derivative thereof.

The term "4-1BB" refers to a member of TNFR superfamily with the amino acid sequence provided in GenBank Accession No. AAA62478.2, or equivalent residues from non-human species, such as mice, rodents, monkeys, apes, etc.; and "4-1BB costimulatory domain" is defined as the amino acid residues 214~255 of GenBank Accession No.

AAA62478.2, or the equivalent residues from non-human species, such as mouse, rodent, monkey, ape, etc. In one aspect, the "4-1BB costimulatory domain" is equivalent residues from humans or from non-human species, such as mice, rodents, monkeys, apes, and the like.

The term "T cell receptor (TCR)" is a characteristic mark on the surface of all T cells, which binds to CD3 by non-covalent bonds to form a TCR-CD3 complex. TCR is responsible for recognizing antigens bound to major histocompatibility complex molecules. TCR is a heterodimer composed of two different peptide chains, α and β chains, each of which can be divided into several parts, variable region (V region), constant region (C region), transmembrane region and cytoplasmic region, characterized in that the cytoplasmic region is very short. TCR molecules belong to the immunoglobulin superfamily, and their antigen specificity exists in the V region; each of V regions (Vα, Vβ) has three hypervariable regions CDR1, CDR2, and CDR3, with CDR3 having the largest variation, which directly determines the antigen-binding specificity of TCR. When TCR recognizes the MHC-antigen peptide complex, CDR1 and CDR2 recognize and bind to the side wall of the antigen binding groove of the MHC molecule, and CDR3 directly binds to the antigen peptide. TCR is divided into two categories: TCR1 and TCR2; TCR1 is composed of two chains, γ and δ, and TCR2 is composed of two chains, α and β.

The term "T cell fusion protein (TFP)" includes recombinant polypeptides derived from various polypeptides that constitute TCR, which can bind to the surface antigens of target cells, interact with other polypeptides of the complete TCR complex and usually co-localized on the surface of T cells. TFP consists of a TCR subunit and an antigen binding domain consisting of a human or humanized antibody domain, wherein the TCR subunit includes at least part of the TCR extracellular domain, transmembrane domain, and the stimulation domain of the internal signal domain of the TCR intracellular domain; the TCR subunit and the antibody domain are effectively connected, wherein the extracellular, transmembrane and intracellular signal domains of the TCR subunit are derived from CD3ε or CD3γ, and the TFP integrates into the TCR expressed on T cells.

The term "T cell antigen coupler (TAC)" includes three functional domains: 1. tumor-targeting domain, including single-chain antibodies, designed ankyrin repeat protein (DARPin) or other targeting groups; 2. extracellular domain, a single-chain antibody binding to CD3, so that TAC receptor and TCR receptor are close; 3. transmembrane region and intracellular region of CD4 co-receptor, wherein the intracellular region is connected to the protein kinase LCK to catalyze the phosphorylation of immunoreceptor tyrosine activation motifs (ITAM) of the TCR complex as the initial step of T cell activation.

The term "antibody" refers to a protein or polypeptide sequence derived from an immunoglobulin molecule specifically binding to an antigen. Antibodies can be of polyclonal or monoclonal, multi-chain or single-chain, or whole immunoglobulins, and can be derived from natural sources or recombinant sources. The antibody may be a tetramer of immunoglobulin molecules.

The term "antibody fragment" refers to at least a portion of an antibody that retains the ability to specifically interact with an epitope of an antigen (e.g., through binding, steric hindrance, stabilization/destabilization, spatial distribution). Examples of antibody fragments include, but are not limited to, Fab, Fab', F(ab')$_2$, Fv fragments, scFv, disulfide-linked Fv (sdFv), Fd fragments composed of VH and CHl domains, linear antibodies, single domain antibodies (such as sdAb), multispecific antibodies formed by antibody fragments (such as bivalent fragments including two Fab fragments connected by disulfide bonds in the hinge region) and isolated CDRs or other epitope binding fragments of antibodies.

The term "scFv" refers to a fusion protein comprising at least one antibody fragment comprising light chain variable region and at least one antibody fragment comprising heavy chain variable region, wherein the light chain and heavy chain variable regions are contiguous (for example, via a synthetic linker, such as a short flexible polypeptide linker), and can be expressed as a single-chain polypeptide, and wherein the scFv retains the specificity of the intact antibody from which it is derived. Unless specified, as used herein, scFv may have the VL and VH variable regions in any order (for example, relative to the N-terminus and C-terminus of the polypeptide), and the scFv may include VL-linker-VH or may include VH-linker-VL.

The term "antibody heavy chain" refers to the larger of the two polypeptide chains which is present in the antibody molecule in its naturally occurring configuration and usually determines the type of antibody.

The term "antibody light chain" refers to the smaller of the two polypeptide chains which is present in the antibody molecule in its naturally occurring configuration. κ(k) and λ(l) light chains refer to the two main isotypes of antibody light chains.

The term "recombinant antibody" refers to an antibody produced using recombinant DNA technology, such as an antibody expressed by a phage or yeast expression system. The term should also be interpreted as referring to antibodies that have been produced by synthesizing a DNA molecule encoding the antibody (and wherein the DNA molecule expresses the antibody protein) or the amino acid sequence of the specified antibody, wherein the DNA or amino acid sequence has been obtained by recombinant DNA or amino acid sequence technology which is available and well-known in the art.

The term "antigen" refers to a molecule that causes an immune response. The immune response may involve the production of antibodies or the activation of cells with specific immunity or both. A skilled person should understand that any macromolecule including virtually all proteins or peptides can serve as an antigen. In addition, the antigen can be derived from recombinant or genomic DNA. When the term is used herein, a skilled person should understand that it includes a protein or peptide encoded by any DNA including a nucleotide sequence or part of the nucleotide sequence encoding a protein that causes an immune response. In addition, a skilled person should understand that the antigen need not be encoded only by the full-length nucleotide sequence of the gene. It is obvious that the present invention includes but is not limited to the use of partial nucleotide sequences of more than one gene, and these nucleotide sequences are arranged in different combinations to encode polypeptides that elicit a desired immune response. Moreover, a skilled person should understand that antigens need not be encoded by "genes" at all. It is obvious that the antigen can be synthetically produced, or it can be derived from a biological sample, or it can be a macromolecule other than a polypeptide. Such biological samples may include, but are not limited to tissue samples, tumor samples, cells or fluids containing other biological components.

"Tumor antigen" refers to an antigen that is newly emerged or overexpressed during the occurrence and development of hyperproliferative diseases. In certain aspects, the hyperproliferative disorders described herein refer to tumors.

The tumor antigens described herein can be solid tumor antigens or hematoma antigens.

The tumor antigens described herein include but are not limited to: Thyroid Stimulating Hormone Receptor (TSHR); CD171; CS-1; C-type lectin-like molecule-1; Ganglioside GD3; Tn antigen; CD19; CD20; CD 22; CD30; CD70; CD123; CD138; CD33; CD44; CD44v7/8; CD38; CD44v6; B7H3 (CD276), B7H6; KIT (CD117); Interleukin 13 receptor subunit α (IL-13Rα); Interleukin 11 receptor α (IL-11Rα); Prostate Stem Cell Antigen (PSCA); Prostate Specific Membrane Antigen (PSMA); Carcinoembryonic Antigen (CEA); NY-ESO-1; HIV-1 Gag; MART-1; gp100; Tyrosine Enzyme; Mesothelin; EpCAM; Protease Serine 21 (PRSS21); Vascular Endothelial Growth Factor Receptor, Vascular Endothelial Growth Factor Receptor 2 (VEGFR2); Lewis (Y) Antigen; CD24; Platelet Derived Growth Factor Receptor β (PDGFR)-β); stage-specific embryonic antigen-4 (SSEA-4); cell surface-associated mucin 1 (MUC1), MUC6; epidermal growth factor receptor family and its mutants (EGFR, EGFR2, ERBB3, ERBB4, EGFRvIII)); Neural cell adhesion molecule (NCAM); Carbonic anhydrase IX (CAIX); LMP2; Ephrin A receptor 2 (EphA2); Fucosyl GM1; Sialyl Lewis adhesion molecule (sLe); Ganglioside GM3Galp(1-4)bDGlcp(1-1)Cer; TGS5; high molecular weight melanoma-associated antigen (HMW-MAA); o-acetyl GD2 ganglioside (OAcGD2); folate receptor; tumor vascular endothelium Marker 1 (TEM1/CD248); Tumor vascular endothelial marker 7 related (TEM7R); Claudin 6, Claudin 18.2, Claudin 18.1; ASGPR1; CDH16; 5T4; 8H9; αvβ6 integrin; B cell maturation antigen (BCMA); CA9; kappa light chain; CSPG4; EGP2, EGP40; FAP; FAR; FBP; embryonic AchR; HLA-A1, HLA-A2; MAGEA1, MAGE3; KDR; MCSP; NKG2D ligand; PSC1; ROR1; Sp17; SURVIVIN; TAG72; TEM1; Fibronectin; Tenascin; Carcinoembryonic variant of tumor necrosis zone; G protein-coupled receptor class C group 5-member D (GPRC5D); X chromosome open reading frame 61 (CXORF61); CD97; CD179a; Anaplastic Lymphoma Kinase (ALK); Polysialic acid; Placenta specific 1 (PLAC1); the hexose part of globoH glycoceramide (GloboH); breast differentiation antigen (NY-BR-1); uroplakin 2 (UPK2); hepatitis A virus cell receptor 1 (HAVCR1); adrenergic receptor β3 (ADRB3); pannexin 3 (PANX3); G protein coupled receptor 20 (GPR20); lymphocyte antigen 6 complex locus K9 (LY6K); olfactory receptor 51E2 (OR51E2); TCRγ alternating reading frame protein (TARP); Wilms tumor protein (WT1); ETS translocation variant gene 6 (ETV6-AML); Sperm protein 17 (SPA17); X antigen family member 1A (XAGE1); Angiopoietin binds to cell surface receptor 2 (Tie2); Melanoma cancer testis antigen-1 (MAD-CT-1); Melanoma cancer testis antigen-2 (MAD-CT-2); Fos-related antigen 1; p53 mutant; human telomerase reverse transcriptase (hTERT); sarcoma translocation breakpoint; melanoma inhibitor of apoptosis (ML-IAP); ERG (transmembrane protease serine 2 (TMPRSS2) ETS fusion gene); N-acetylglucosaminyl transferase V (NA17); Pairing box protein Pax-3 (PAX3); Androgen receptor; Cyclin B1; V-myc avian myeloidosis virus oncogene neuroblastoma-derived homolog (MYCN); Ras homolog Family member C (RhoC); Cytochrome P450 1B1 (CYP1B1); CCCTC binding factor (zinc finger protein)-like (BORIS); Squamous cell carcinoma antigen 3 (SART3) recognized by T cells; Paired box protein Pax-5 (PAX5); proacrosin binding protein sp32 (OYTES1); lymphocyte-specific protein tyrosine kinase (LCK); A kinase anchoring protein 4 (AKAP-4); synovial sarcoma X breakpoint 2 (SSX2); CD79a; CD79b; CD72; Leukocyte-associated immunoglobulin-like receptor 1 (LAIR1); IgA receptor Fc fragment (FCAR); Leukocyte immunoglobulin-like receptor subfamily member 2 (LILRA2); CD300 molecular-like family member f (CD300LF); C-type lectin domain family 12 member A (CLEC12A); bone marrow stromal cell antigen 2 (BST2); mucin-like hormone receptor-like 2 (EMR2) containing EGF-like module; lymphocyte antigen 75 (LY75); phosphatidyl Inositol proteoglycan-3 (GPC3); Fc receptor-like 5 (FCRL5); immunoglobulin lambda-like polypeptide 1 (IGLL1).

The pathogen antigen is selected from: virus, bacteria, fungus, protozoa, or parasite antigen; and virus antigen is selected from: cytomegalovirus antigen, Epstein-Barr virus antigen, human immunodeficiency virus antigen, or influenza virus antigen.

The term "tumor" refers to a broad category of disorders in which hyperproliferative cell growth occurs in vitro (e.g., transformed cells) or in vivo. Conditions that can be treated or prevented by the methods described herein include, for example, various neoplasms, including benign or malignant tumors, various hyperplasias, etc. Specific examples of cancer include but are not limited to: breast cancer, prostate cancer, leukemia, lymphoma, nasopharyngeal cancer, glioma, colon cancer, rectal cancer, renal cell carcinoma, liver cancer, non-small cell lung cancer, small bowel cancer, esophageal cancer, melanoma, bone cancer, pancreas Cancer, skin cancer, head and neck cancer, uterine cancer, ovarian cancer, stomach cancer, testicular cancer, fallopian tube cancer, endometrial cancer, cervical cancer, vaginal cancer, thyroid cancer, parathyroid cancer, adrenal cancer, soft tissue sarcoma, urethral cancer, Penile cancer, bladder cancer, ureteral cancer, renal pelvis cancer, central nervous system (CNS) tumor, hemangioma, spine tumor, glioma, astrocytoma, pituitary adenoma, a combination and metastatic foci thereof.

The term "transfected" or "transformed" or "transduced" refers to a process by which exogenous nucleic acid is transferred or introduced into a host cell. A "transfected" or "transformed" or "transduced" cell is a cell that has been transfected, transformed, or transduced with exogenous nucleic acid. The cell includes the cell of the primary subject and a progeny thereof.

The term "specifically binds" refers to an antibody or ligand binding to a binding partner (e.g., tumor antigen) present in a sample, while not substantially recognizing or binding to other molecules in the sample.

As used herein, the term "refractory" refers to a disease, such as a tumor, which does not respond to a treatment. In embodiments, the refractory tumor may be resistant to a treatment before or at the beginning of the treatment. In other embodiments, a refractory tumor can become resistant during treatment. In the present invention, a refractory tumor includes, but are not limited to, a cancer which is not sensitive to radiotherapy, relapses after radiotherapy, not sensitive to chemotherapy, relapses after chemotherapy, not sensitive to CAR-T treatment, or relapses after CAR-T treatment. The treatment regimens described herein can be used for the refractory or recurrent malignancies.

As used herein, "relapsed" means that signs and symptoms before the effective treatment re-appear in a patient after a period of improvement, for example, after an effective tumor treatment.

The terms "individual" and "subject" have the same meaning herein, and can be humans and animals from other species.

The term "enhancement" means that the response of a subject or tumor cells to the treatment disclosed herein is improved. For example, an enhanced response may include 5%, 10%, 15%, 20%, 25%, 30%, 35%, 40%, 45%, 50%, 55%, 60%, 65%, 70%, 75%, 80%, 85%, 90%, 95% or 98% or higher of improvement in response. As used herein, "enhancement" can also refer to increase in the number of subjects responding to treatments such as immune effector cell therapy. For example, an enhanced response can refer to the total percentage of subjects responding to treatment, where the percentages are 5%, 10%, 15%, 20%, 25%, 30%, 35%, 40%, 45%, 50%, 55%, 60%, 65%, 70%, 75%, 80%, 85%, 90%, 95% or 98% more.

In one aspect, the treatment is determined based on clinical results; the increase, enhancement or extension of the anti-tumor activity of T cells; compared with the number before treatment, the increase in the number of anti-tumor T cells or activated T cells, the promotion of IFN-γ secretion, or a combination thereof. In another aspect, the clinical results are tumor regression; tumor shrinkage; tumor necrosis; anti-tumor response through the immune system; tumor enlargement, recurrence or spread, or a combination thereof. In another aspect, the therapeutic effect is predicted by the presence of T cells, the presence of genetic markers indicative of T cell inflammation, promotion of IFN-γ secretion, or a combination thereof.

The immune effector cells as disclosed herein can be administered to an individual via various routes, including, for example, orally or parenterally, such as intravenous, intramuscular, subcutaneous, intraorbital, intrasaccular, intraperitoneal, intrarectal, intracisternal, intratumoral, intravasal, intradermal route, or passive or promoted absorption through the skin using, for example, skin patches or transdermal iontophoresis, respectively.

When practicing the methods described herein, the total amount of agent to be administered can be administered to the subject as a single dose as a bolus injection or by infusion over a relatively short period of time, or can be administered using a graded treatment regimen, wherein multiple doses are administered over an extended time of period. A skilled person will know that the amount of the composition for treating pathological conditions in a subject depends on many factors, including the age and general health of the subject, as well as the route of administration and the number of treatments to be administered. Taking these factors into account, a technician will adjust the specific dosage as needed. In general, phase I and phase II clinical trials are initially used to determine the formulation of the composition and the route and frequency of administration.

Range: throughout the disclosure, various aspects of the present invention can exist in a range format. It should be understood that the description in range format is only for convenience and brevity, and should not be regarded as an unchangeable limitation on the scope described herein. Therefore, the description of a range should be considered as specifically disclosing all possible subranges and individual values within the range. For example, the description of a range, such as from 1 to 6, should be considered as specifically disclosing subranges, such as 1 to 3, 1 to 4, 1 to 5, 2 to 4, 2 to 6, 3 to 6, etc., and individual values within the range, such as 1, 2, 2.7, 3, 4, 5, 5.3, and 6. For another example, a range, such as 95-99% identity, includes a range with 95%, 96%, 97%, 98%, or 99% identity, and includes a sub-range, such as 96-99%, 96-98%, 96-97%, 97-99%, 97-98% and 98-99% identity. This applies regardless of the width of the range.

Based on the present disclosure, a skilled person should understand that many changes or modifications can be made in the disclosed specific embodiments and the same or similar results can still be obtained without departing from the spirit and scope described herein. The scope of the present invention is not limited to the specific embodiments described herein (which are only intended to exemplify various aspects described herein), and functionally equivalent methods and components are still included within the stated range described herein. In fact, various modifications of the present invention as well as those shown and described herein will become apparent to a skilled person based on the foregoing description.

When CAR-T cells co-expressing IL17 and CCL21 are used in a subject, the corresponding species can be selected. For example, when used in mice, mouse-derived IL17 and CCL21 is used, and elements for constructing a CAR, such as transmembrane domain and intracelluar domain can also be of murine origin. When the subject is a human, human-derived IL17 and CCL21 as well as human-derived CAR elements are preferred. In some embodiments, the sequence of a CAR used may be as shown in SEQ ID NO: 26, 27 or 35.

In some embodiments, when used for treating a tumor, the cells of the present invention can be used in combination with a chemotherapeutics.

The term "CLD18 (claudin 18)" refers to claudin-18 and includes any variant, conformational variant, isoforms and species homologs of CLD18 (including CLD18A1 (claudin 18.1) and CLD18A2 (claudin 18.2)) that are naturally expressed by cells or expressed by cells transfected with the CLD18 gene. Preferably, "CLD18" refers to human CLD18, particularly CLD18A2 (SEQ ID NO: 22) and/or CLD18A1 (SEQ ID NO: 23), more preferably CLD18A2.

The term "CLD18A1" includes any post-translational modified variants, isoforms and species homologs of human CLD18A1 that are naturally expressed by cells or expressed by cells transfected with the CLD18A1 gene.

The term "CLD18A2" includes any post-translational modified variants, isoforms and species homologs of human CLD18A2 that are naturally expressed by cells or expressed by cells transfected with the CLD18A2 gene.

The term "CLD18 variant" shall includes (i) CLD18 splice variant, (ii) CLD18 post-translational modified variants, especially including variants with different N glycosylation, (iii) CLD18 conformational variants, especially including CLD18-conformation-1, CLD18-conformation-2 and CLD18-conformation-3, (iv) free CLD18 and homo/allo-associated variants at tight junctions between cells, (v) CLD18 cancer-related variants and CLD18 non cancer-related variants.

The chimeric antigen receptor polypeptides described herein can be sequentially linked as follows:
  extracellular antigen binding region-CD8 transmembrane region-4-1BB-CD3ζ,
  extracellular antigen binding region-CD8 transmembrane region-CD28b-CD3ζ,
  extracellular antigen binding region-CD28a-CD28b-CD3ζ,
  extracellular antigen binding region-CD28a-CD28b-4-1BB-CD3ζ,
  and combinations thereof, where CD28a in the relevant chimeric antigen receptor protein represents the transmembrane region of CD28 molecule, and CD28b represents the intracellular signal region of CD28 molecule. The present invention also includes a nucleic acid encoding the chimeric antigen receptor. The present invention also relates to variants of the aforementioned polynucleotides, which encode polypeptides having the same amino acid sequence as the present invention or polypeptide fragments, analogs and derivatives.

The present invention also provides a vector containing the nucleic acid of the chimeric antigen receptor. The invention also includes viruses comprising the vectors described above. The viruses of the invention include packaged infectious viruses as well as viruses to be packaged that contain the necessary components for packaging into infectious viruses. Other viruses known in the art that can be used to transduce exogenous genes into immune effector cells and their corresponding plasmid vectors are also useful in the present invention.

The present invention further includes a chimeric antigen-modified immune effector cell, which is transduced with a nucleic acid encoding the chimeric antigen receptor or transduced with the recombinant plasmid containing the above-mentioned nucleic acid or a viral system containing the plasmid. Conventional nucleic acid transduction methods in the art, including non-viral and viral transduction methods, can be used in the present invention. Non-viral transduction methods include electroporation and transposon methods. Recently, nucleofector nuclear transfection instrument developed by Amaxa can directly introduce foreign genes into nucleus to achieve highly efficient transduction of target genes. In addition, compared with conventional electroporation, the transduction efficiency of transposon system based on Sleeping Beauty system or PiggyBac transposon was significantly improved. The combination of nucleofector transfection instrument and SB Sleeping Beauty transposon system has been reported [Davies J K., et al. Combining CD19 redirection and alloanergization to generate tumor-specific human T cells for allogeneic cell therapy of B-cell malignancies. Cancer Res, 2010, 70(10): OF1-10.], and high transduction efficiency and site-directed integration of target genes can be achieved by this method. In one embodiment of the invention, the transduction method of a T lymphocyte modified by a chimeric antigen receptor gene is a transduction method based on a virus such as a retrovirus or a lentivirus. The method has the advantages of high transduction efficiency and stable expression of exogenous gene, and the time for in vitro culturing T lymphocytes to clinical level can be shorten. The transduced nucleic acid is expressed on the surface of the transgenic T lymphocytes by transcription, translation. In vitro cytotoxicity assay performed on various cultured tumor cells demonstrated that the immune effector cells of the present invention have highly specific tumor cell killing effects (also known as cytotoxicity). Therefore, the nucleic acid encoding a chimeric antigen receptor protein of the present invention, a plasmid comprising the nucleic acid, a virus comprising the plasmid, and a transgenic immune effector cells transfected with the nucleic acid, plasmid or virus described above can be effectively used in tumor immunotherapy.

In addition to the chimeric receptor described above, the chimeric antigen-modified immune effector cells of the present invention may also express another chimeric receptor, which does not contain CD3ζ, but contains intracellular signaling domain of CD28 and intracellular signal domain of CD137, or a combination of both.

The immune cells modified by the chimeric antigen of the present invention can be used in the preparation of a pharmaceutical composition or diagnostic reagent. In addition to an effective amount of the antibody, immunological conjugate, or immune cell, the composition may further comprise a pharmaceutically acceptable carrier. The term "pharmaceutically acceptable" means that when the molecular entities and compositions are properly administered to animals or humans, they do not cause adverse, allergic or other untoward reactions.

Specific examples of some of the substances which may be used as pharmaceutically acceptable carriers or components thereof are sugars, such as lactose, dextrose and sucrose; starches, such as corn starch and potato starch; cellulose and its derivatives, such as carboxymethylcellulose sodium, ethylcellulose and methylcellulose; gum tragacanth; malt; gelatin; talc; solid lubricants such as stearic acid and magnesium stearate; calcium sulfate; vegetable oils, such as peanut oil, cottonseed oil, sesame oil, olive oil, corn oil and cocoa butter;

polyhydric alcohols such as propylene glycol, glycerin, sorbitol, mannitol and polyethylene glycol; alginic acid; emulsifiers such as Tween®; wetting agents such as sodium lauryl sulfate; coloring agents; flavoring agents; tablets, stabilizers; antioxidants; preservatives; pyrogen-free water; isotonic saline solutions; and phosphate buffers and the like.

The composition of the present invention can be prepared into various dosage forms as needed, and the dosage to be administered to a patient can be determined by a physician according to factors, such as type, age, body weight, and general disease condition of a patient, mode of administration, and the like. For example, injection or other treatment may be used.

Advantages of the Invention

1. The immune effector cells provided herein can effectively increase the proliferation, survival and function of the immune effector cells in tumors; reduce the expression of inhibitory immune checkpoints, thereby alleviating the exhaustion of T cells;
2. The immune effector cells provided herein have better killing effects on solid tumor cells and in vitro expansion performance.

The present invention will be further described below in conjunction with specific embodiments. It should be understood that these examples are only used to illustrate the present invention and not to limit the scope of the present invention. The experimental methods that do not indicate specific conditions in the following examples are generally performed under conditions described in J. Sambrook et al., Molecular Cloning Experiment Guide, Third Edition, Science Press, 2002, or according to conditions recommended by the manufacturer.

Exemplary antigen receptors of the present invention, including CAR, and methods for engineering and introducing receptors into cells, may refer to, for example, those disclosed in CN107058354A, CN107460201A, CN105194661A, CN105315375A, CN105713881A, CN106146666A, CN106519037A, CN106554414A, CN105331585A, CN106397593A, CN106467573A, CN104140974A, WO2017186121A1, WO2018006882A1, WO2015172339 A8 and WO2018/018958A1.

Example 1. Construction of T Cells Expressing Chimeric Antigen Receptors

In this example, Claudin 18.2 was selected as the target of CAR-T cells. In order to more accurately verify anti-tumor effects in mice, mouse-derived signal peptide, transmembrane region, intracellular region, and the like were selected. The preparation method was operated in accordance with the conventional CAR-T cell preparation method in the art.

1. Construction of Plasmid

Conventional molecular biology methods in the art were used, and the scFv used in this example was an antibody targeting human Claudin 18.2. The nucleic acid sequence was shown in SEQ ID NO: 1, and the used chimeric antigen receptor was the second-generation of chimeric antigen receptor, which has the transmembrane domain of mCD8, intracellular domain of mCD28 and/or intracellular domain of m4-1BB, and mCD3ζ.

1. MSCV.pBABE 5 (purchased from addgene) was used as a vector to construct a retroviral plasmid MSCV-hu8E5 (2I)-28Z expressing the second-generation of chimeric antigen receptor. The nucleic acid sequence of hu8E5(2I)-28Z comprises the signal peptide of CD8α (SEQ ID NO: 3), scFv (SEQ ID NO: 1), hinge region and transmembrane region of mCD8 (SEQ ID NO: 5) and intracellular signal transduction domain of mCD28 (SEQ ID NO: 7) and intracellular segment mCD3ζ of mCD3 (SEQ ID NO: 9). The plasmid map of hu8E5(2I)-28Z is shown in FIG. 1A.

Figure 1B:
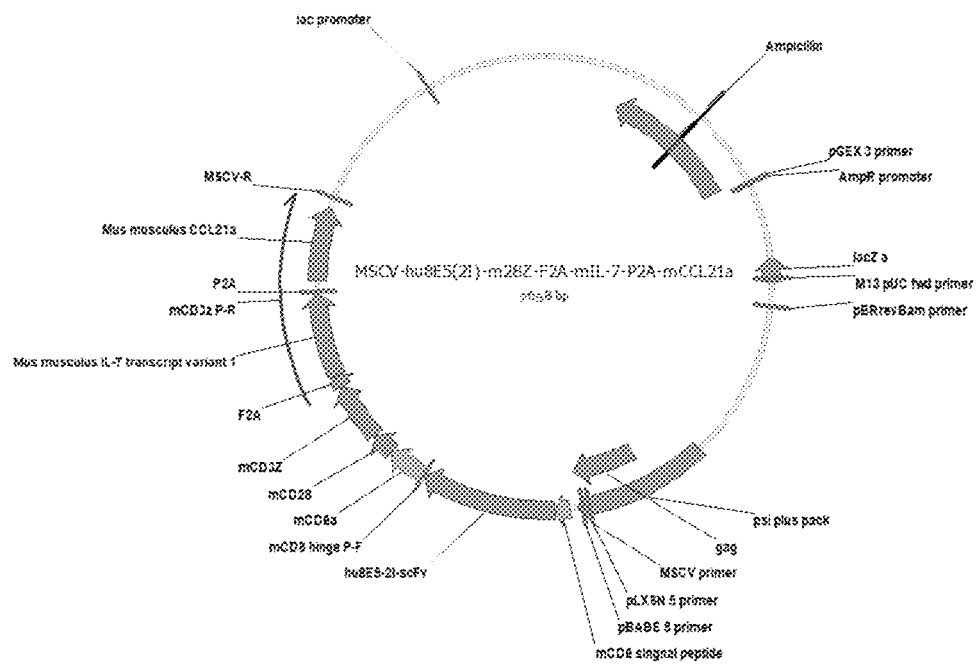
Figure 1C:
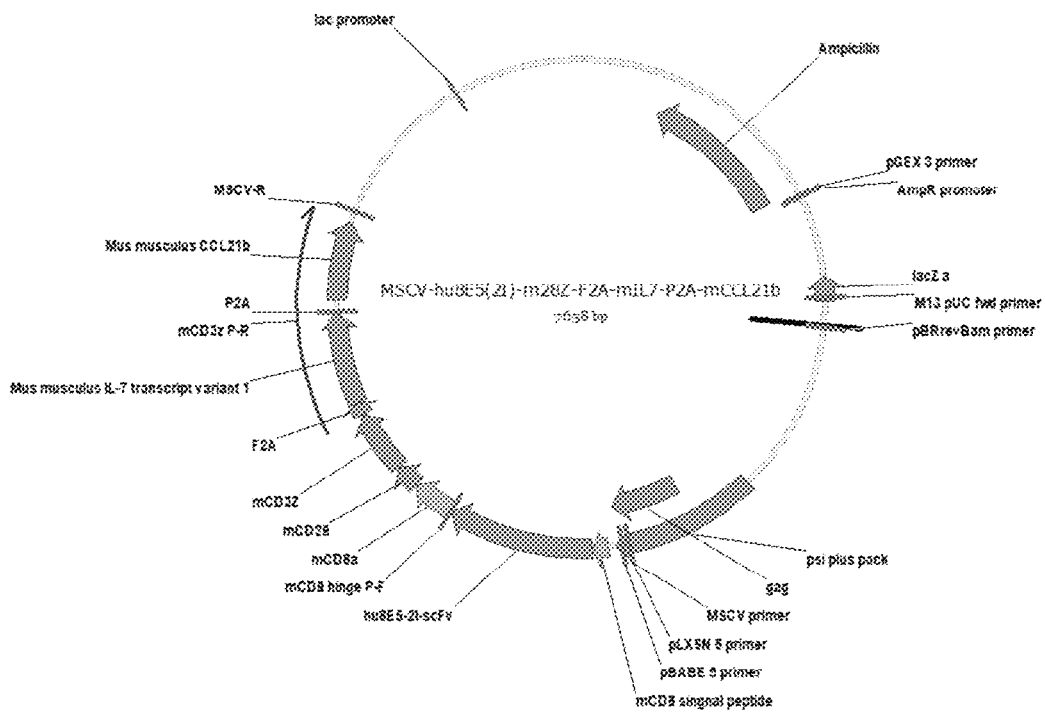
FIG. 1C is a plasmid map of MSCV-hu8E5 (2I)-m28Z-F2A-mIL7-P2A-mCCL21b.

The gene of F2A-mIL7-P2A-mCCL21a or F2A-mIL7-P2A-mCCL21b was inserted into the MSCV-hu8E5(2I)-m28Z plasmid to construct the retroviral plasmid MSCV-hu8E5(2I)-m28Z-F2A-mIL7-P2A-mCCL21a (plasmid map shown in FIG. 1B) and MSCV-hu8E5(2I)-m28Z-F2A-mIL7-P2A-mCCL21b (plasmid map shown in FIG. 1C) expressing CAR, IL7 and CCL21.

F2A-mIL7-P2A-mCCL21a consists of F2A (SEQ ID NO: 11), mouse IL7 (SEQ ID NO: 13), P2A (SEQ ID NO: 16), mouse CCL21a (SEQ ID NO: 14); F2A-mIL7-P2A-mCCL21b consists of F2A (SEQ ID NO: 11), mouse IL7 (SEQ ID NO: 13), P2A (SEQ ID NO: 16), mouse CCL21b (SEQ ID NO: 15).

Figure 1D:
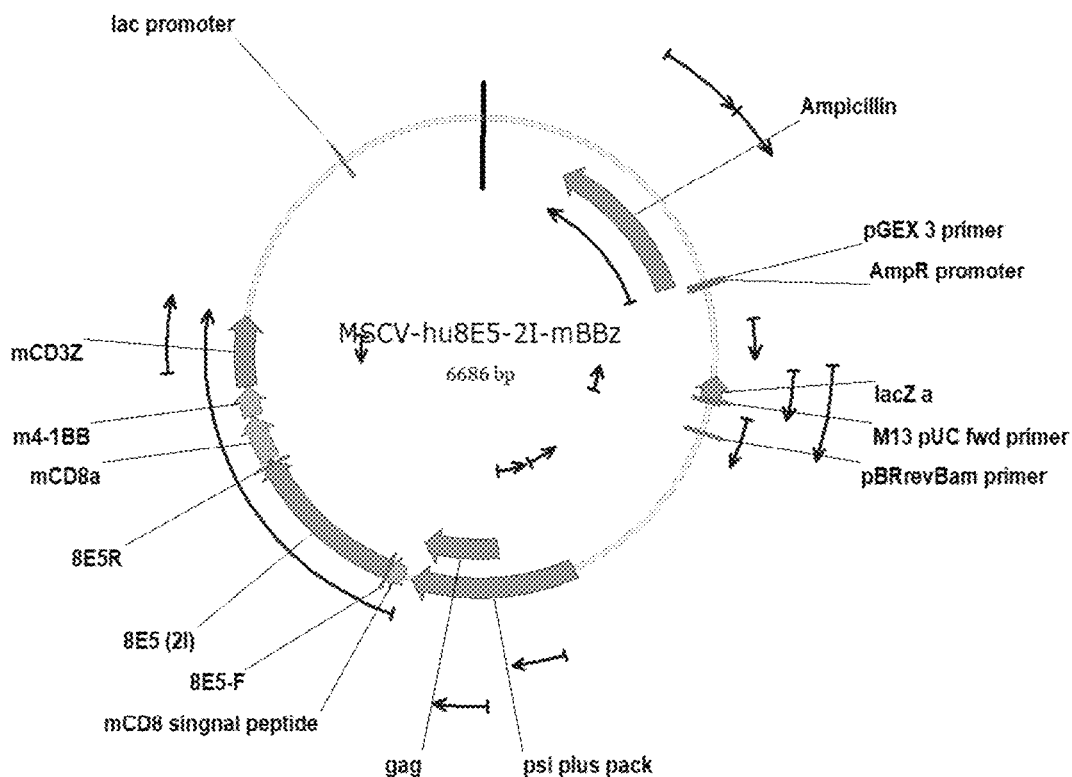
FIG. 1D is a plasmid map of MSCV-hu8E5 (2I)-mBBZ.

MSCV.pBABE 5 was used as a vector to construct a retroviral plasmid MSCV-hu8E5(2I)-mBBZ expressing the second-generation of chimeric antigen receptor. The hu8E5(2I)-mBBZ sequence consists of the signal peptide of CD8α (SEQ ID NO: 3), scFv (SEQ ID NO: 1), hinge and transmembrane region of mCD8 (SEQ ID NO: 5), intracellular signal transduction domain (SEQ ID NO: 24) and intracellular segment CD35 of mCD3ζ (SEQ ID NO: 9). The plasmid map is shown in FIG. 1D.

Figure 1E:
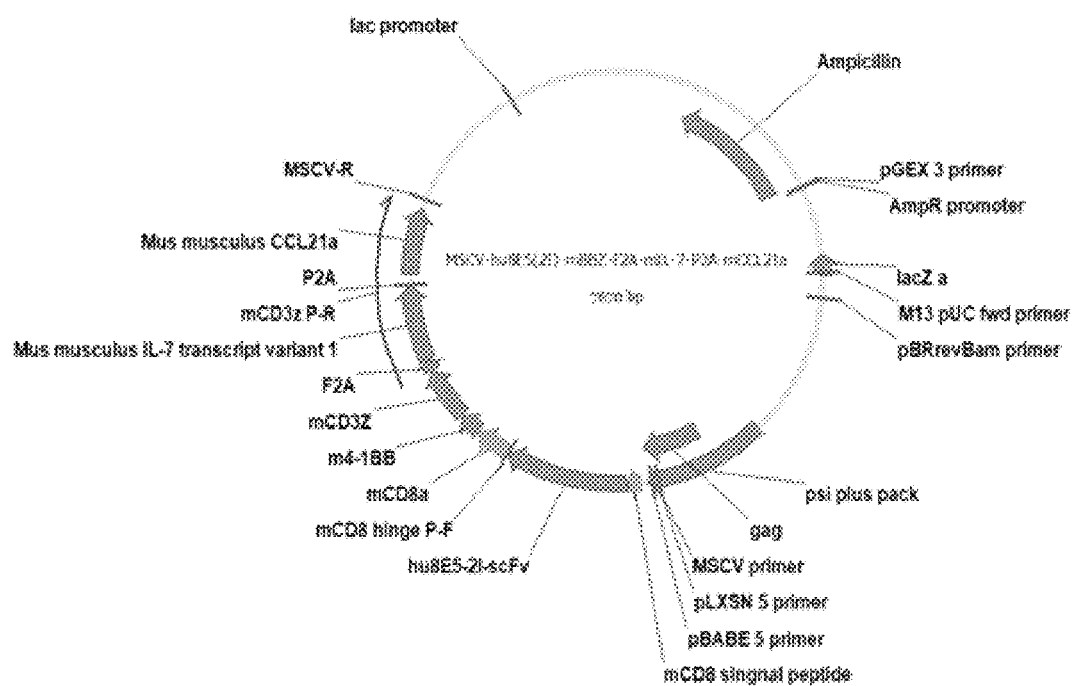
Figure 1F:
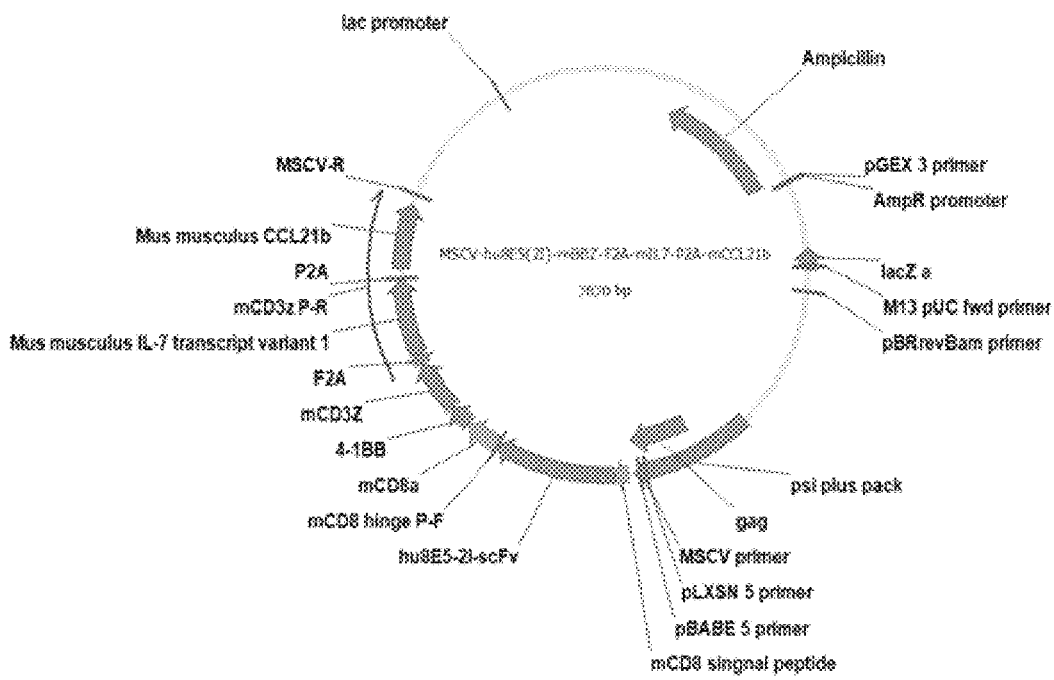
FIG. 1F is a plasmid map of MSCV-hu8E5 (2I)-m28Z-F2A-mIL7-P2A-mCCL21b.

F2A-mIL-7-P2A-mCCL21a and F2A-mIL7-P2A-mCCL21b were inserted into the MSCV-hu8E5(2I)-mBBZ plasmid, respectively, so as to construct the retroviral plasmid MSCV-hu8E5(2I)-mBBZ-F2A-mIL-7-P2A-mCCL21a (plasmid map shown in FIG. 1E) and MSCV-hu8E5(2I)-mBBZ-F2A-mIL7-P2A-mCCL21b (plasmid map shown in FIG. 1F) expressing CAR, IL7 and CCL21.

2. MSCV-hu8E5(2I)-m28Z, MSCV-hu8E5(2I)-m28Z-F2A-mIL-7-P2A-mCCL21a, MSCV-hu8E5(2I)-m28Z-F2A-mIL7-P2A-mCCL21b, MSCV-hu8E5(2I)-mBBZ, MSCV-hu8E5(2I)-mBBZ-F2A-mIL-7-P2A-mCCL21a, MSCV-hu8E5(2I)-mBBZ-F2A-mIL7-P2A-mCCL21b were transfected into 293T cells, respectively, so as to obtain retroviruses hu8E5(2I)-28Z, IL7-CCL21a-28Z, IL7-CCL21b-28Z, hu8E5(2I)-BBZ, IL7-CCL21a-BBZ, IL7-CCL21b-BBZ.

3. Extraction and activation of mouse T cells: the spleen of C57BL/6 mouse was removed to extract mouse T cells. T cells were cultured and activated, and then infected by the retroviruses hu8E5(2I)-28Z, IL7-CCL21a-28Z, IL7-CCL21b-28Z, hu8E5(2I)-BBZ, IL7-CCL21a-BBZ, IL7-CCL21b-BBZ, respectively, so as to obtain m28Z CAR-T cells, m28Z-7*21A CAR-T cells, m28Z-7*21B CAR-T Cells, mBBZ CAR-T cells, mBBZ-7*21A CAR-T cells, and mBBZ-7*21B CAR-T cells.

Example 2. In Vitro Detection of Cytokines

Firstly, mouse pancreatic cancer cells PANC02 (negative expression of claudin18.2, purchased from ATCC) and PANC02-A2 (positive expression of claudin18.2) were pretreated by using mitomycin C (40 μg/ml, 37° C., 2-3 h).

Figure 2:
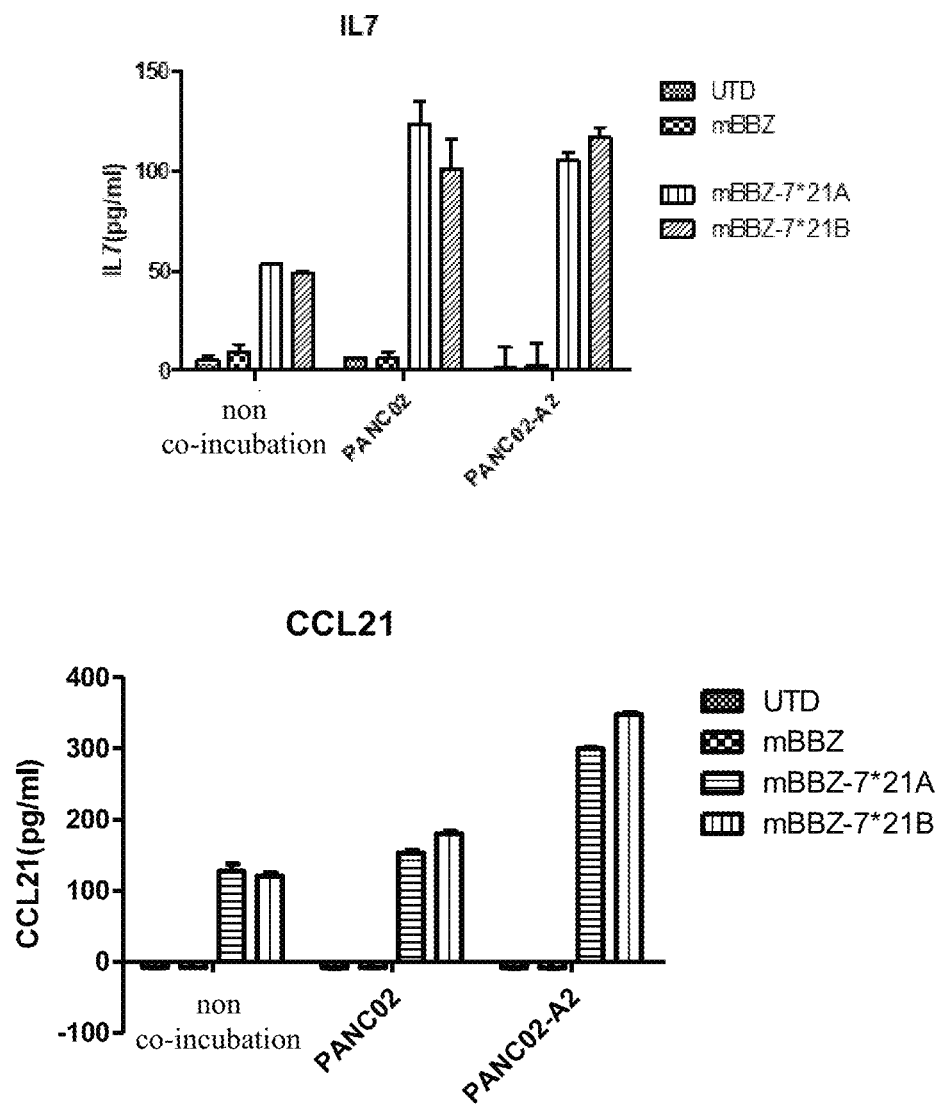
FIG. 2 shows the results of in vitro cytokine IL7 and CCL21 detection.

Cells were inoculated into a 24-well plate at $2 \times 10^5$ cells/400 ul, and untransduced T cells (UTD), mBBZ CAR-T cells, mBBZ-7*21A CAR-T cells, mBBZ-7*21B CAR-T cells were inoculated into a 24-well plate, respectively. A control group without target cells was set, and the cell supernatant was collected on day 3. The secretion of each cytokine, IL7 and CCL21 was detected by an ELISA kit. The results are shown in FIG. 2.

PANC02-A2 cells were constructed by infecting PANC02 cells with pwpt-mclaudin18.2 lentivirus. The pWPT-mclaudin18.2 plasmid was constructed as follows: murine claudin18.2 gene (GeneBank reference sequence number: NM_001194921) was synthesized in vitro, and inserted into a lentiviral expression vector pWPT by restriction digestion and ligation, so as to construct the pwpt-mclaudin18.2 plasmid.

Example 3. In Vitro Detection of CAR-T Cell Phenotype

UTD, mBBZ CAR-T cells, mBBZ-7*21A CAR-T cells, mBBZ-7*21B CAR-T cells were taken and detected for cell surface immune checkpoints: PD-1, LAG-3, TIM-3. Firstly, different CAR-T cells were collected in EP tubes. Each cell is divided into 3 tubes, and washed twice with a pre-cooled flow washing solution (1% NCS+PBS). BV421-labeled anti-PD-1 antibody, APC-labeled anti-LAG-3 antibody, and APC-labeled anti-TIM-3 antibody were added into different detection tubes, respectively at a ratio of 50:50, incubated on ice for 45 minutes, washed for 3 times, and detected in flow tube. The results are shown in FIGS. 3A~3F.

Figure 3A:
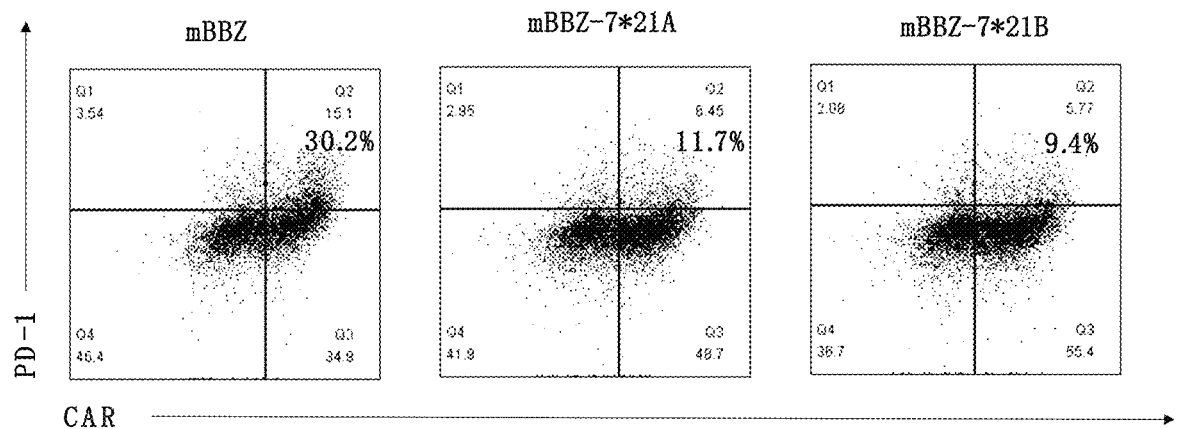
FIGS. 3A and 3B show the secretion of PD-1 by cells in different groups.
Figure 3B:
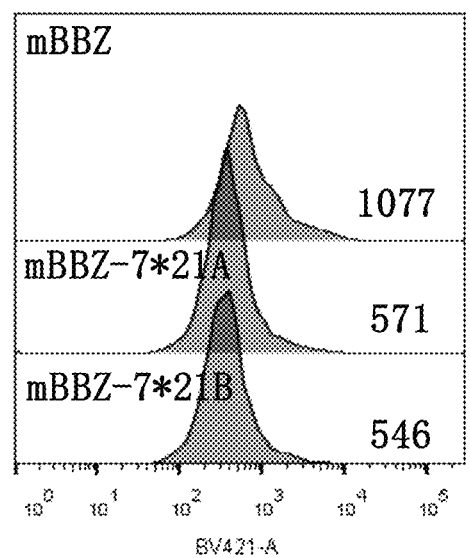

FIG. 3A shows the expression of PD-1 in different groups of cells. The results showed that the secretion of PD-1 in the mBBZ group reached 30.2%, the secretion of PD-1 in the mBBZ-7*21A group was only 11.7%, and the secretion of PD-1 in mBBZ-7*21B group was only 9.4%. FIG. 3B shows the expression intensity of PD-1. From FIG. 3B, the expression of PD-1 in the mBBZ group was higher than that in the mBBZ-7*21A group and the mBBZ-7*21B group.

Figure 3C:
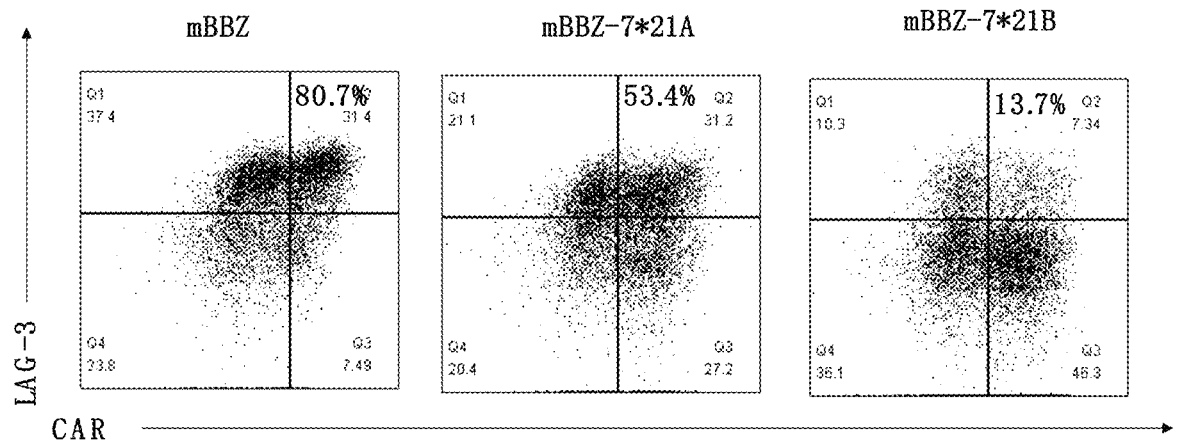
FIGS. 3C and 3D show the secretion of LAG-3 by cells in different groups.
Figure 3D:
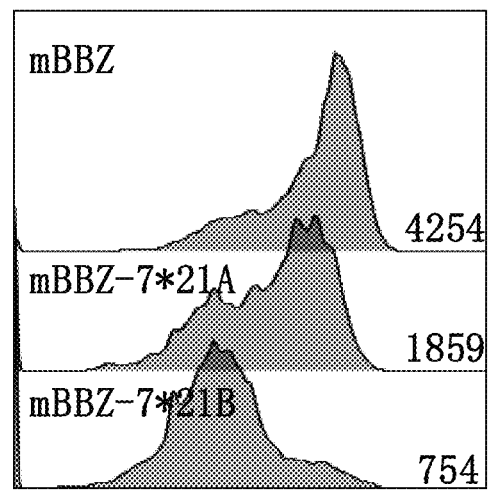

FIG. 3C shows the expression of LAG-3 in different groups of cells. The results showed that the secretion of LAG-3 in the mBBZ group reached 80.7%, the secretion of LAG-3 in the mBBZ-7*21A group was 53.4%, and the secretion of mBBZ-7*21B was 13.7%. FIG. 3D shows the expression intensity of LAG-3. From FIG. 3D, the expression of LAG-3 in the mBBZ group was higher than that in the mBBZ-7*21A group and the mBBZ-7*21B group.

Figure 3E:
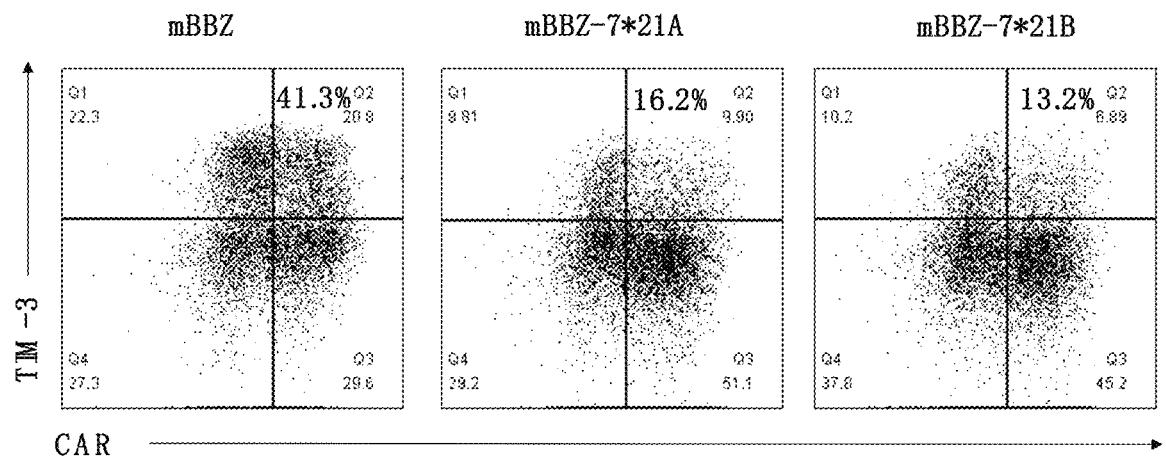
FIGS. 3E and 3F show the secretion of TIM-3 by cells in different groups.
Figure 3F:
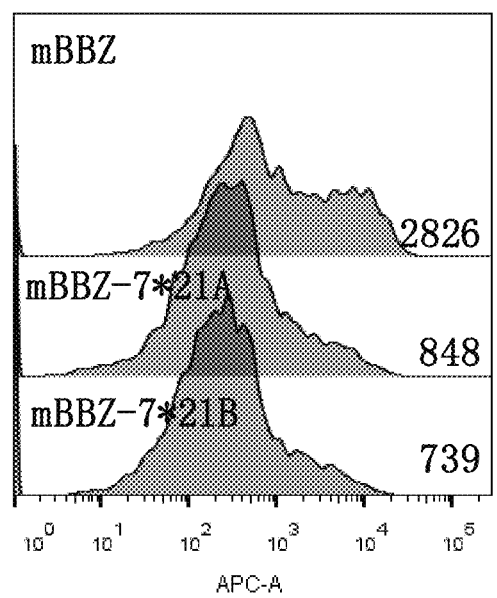

FIG. 3E shows the expression of TIM-3 in different groups of cells. The results showed that the secretion of TIM-3 in the mBBZ group reached 41.3%, the secretion of TIM-3 in the mBBZ-7*21A group was 16.2%, and the secretion of TIM-3 in the mBBZ-7*21B group was 13.2%. FIG. 3F shows the expression intensity of TIM-3. From FIG. 3F, the expression of TIM-3 in the mBBZ group was higher than that in the mBBZ-7*21A group and mBBZ-7*21B.

In summary, the expressions of PD-1, LAG-3 and TIM-3 in mBBZ-7*21A CAR-T cells and mBBZ-7*21B CAR-T cells are lower than those in mBBZ-CAR-T cells, indicating that the over-expression of cytokines IL7 and CCL21 can reduce the expression of these inhibitory immune checkpoints, thereby alleviating the depletion of T cells.

Example 4. In Vitro Detection of Killing Toxicity

CytoTox 96 non-radioactive cytotoxicity detection kit (Promega) was used. The specific method may refer to the instructions of CytoTox 96 non-radioactive cytotoxicity detection kit.

Effector cells: UTD cells, m28Z CAR-T cells, m28Z-7*21A CAR-T cells, m28Z-7*21B CAR-T cells, mBBZ CAR-T cells, mBBZ-7*21A CAR-T cells, mBBZ-7*21B CAR-T cells were inoculated into a 96-well plate at an effector target ratio of 3:1, 1:1 or 1:3, respectively.

Target cells: 50 μL of $2\times10^5$/mL mouse pancreatic cancer cell lines PANC02-A2 and PANC02 cells were inoculated into the corresponding 96-well plates, respectively.

5 replicate wells were set for each group. The plates were placed in a cell incubator for 18 hours.

Each experimental group and each control group were set as follows: experimental group: each target cell+different CAR-T cell; control group 1: maximum release LDH from target cell; control group 2: spontaneous release of LDH from target cell; control group 3: spontaneous release of LDH from effector cell. The calculation formula is: % cytotoxicity= [(experimental group−spontaneous effector cell group−spontaneous target cell group)/(maximum target cell−spontaneous target cell)]*100. The experimental results are shown in FIGS. 4A and 4B.

Figure 4A:
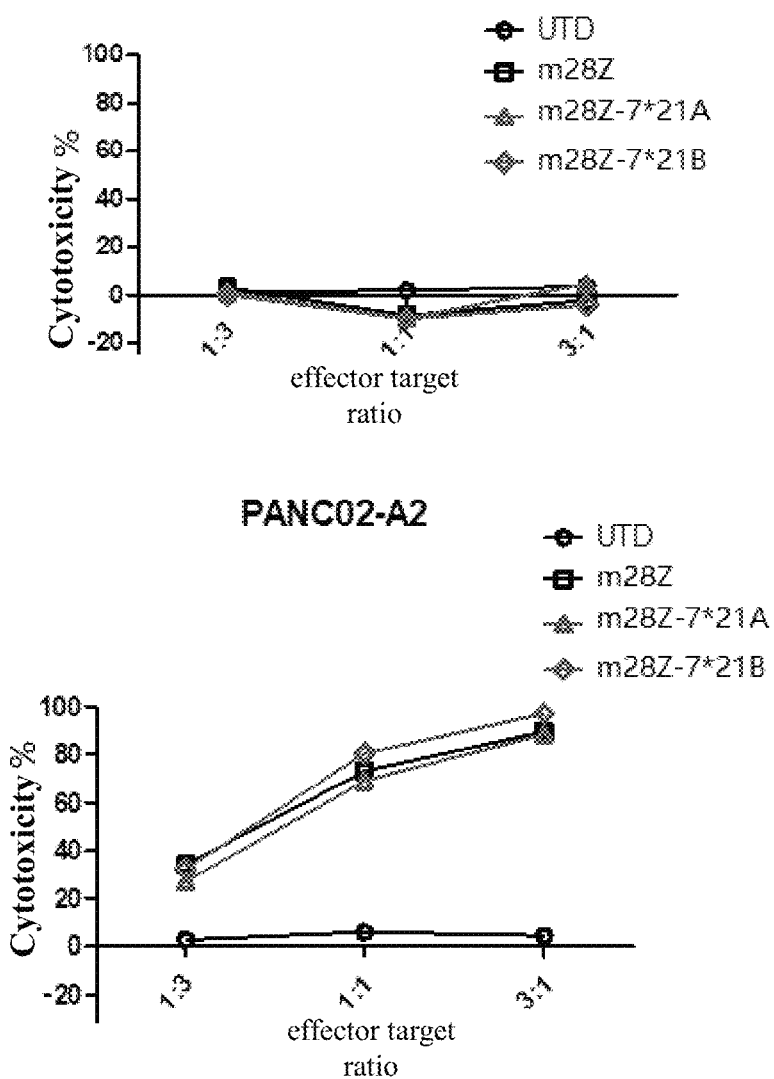
FIG. 4A shows the in vitro killing results of 28Z; and 4B shows the in vitro killing results of BBZ.

FIG. 4A shows that, compared with the control group UTD, m28Z CAR-T cells, m28Z-7*21A CAR-T cells, or m28Z-7*21B CAR-T cells exhibited significant toxic killing effects on PANC02-A2 at both of effector target ratios of 3:1 and 1:1, while no killing effects on PANC02 cells.

Figure 4B:
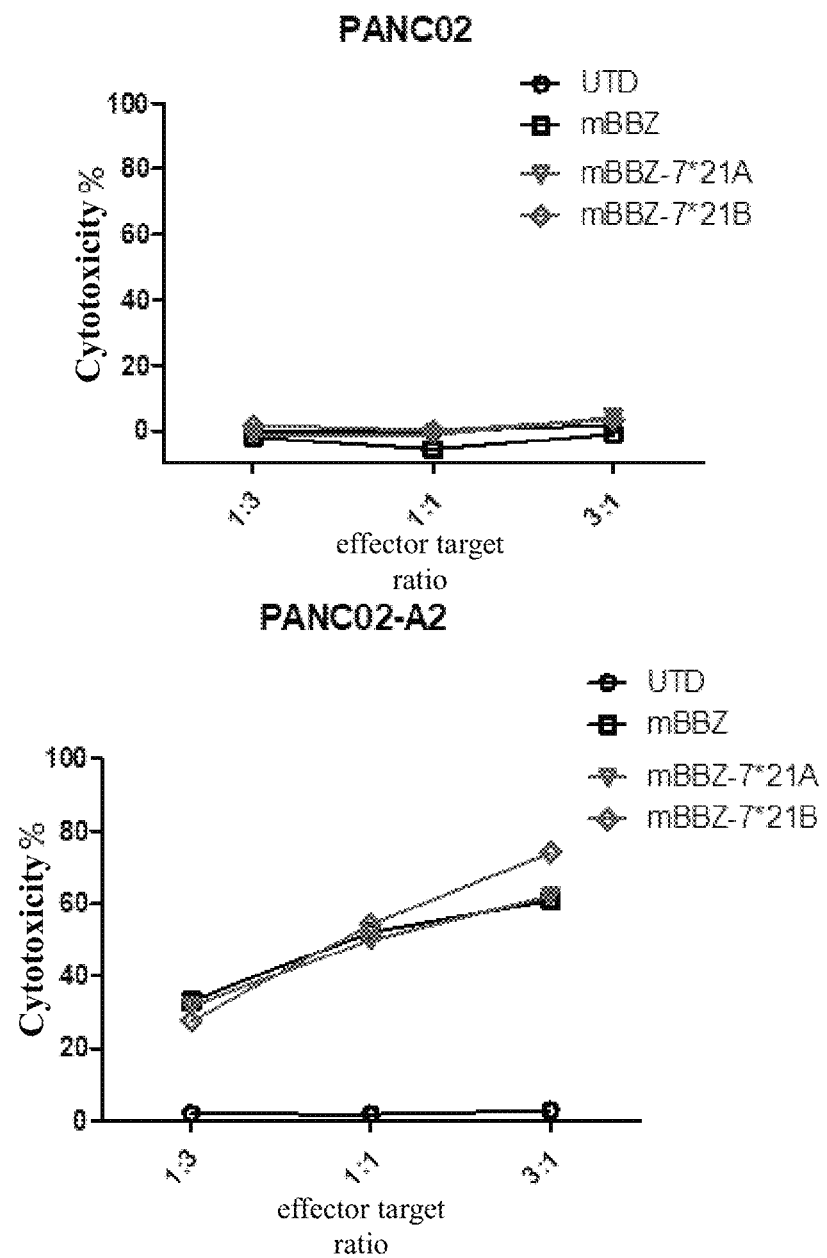

FIG. 4B shows that, compared with the control group UTD, mBBZ CAR-T cells, mBBZ-7*21A CAR-T cells, or mBBZ-7*21B CAR-T cells exhibited significant toxic killing effects on PANC02-A2 at both of effector target ratios of 3:1 and 1:1, while no killing effects on PANC02 cells.

Example 5. Detection of In Vitro Proliferation

The target cells, PANC02-A2 cells were treated by using Mitomycin C (40 μg/ml, 37° C., 2-3h), and the effector cells, UTD cells, mBBZ CAR-T cells, mBBZ-7*21A CAR-T cells, mBBZ-7*21B CAR-T cells were stained with CFSE, and then incubated for 2 days at a effector target ratio ($1\times10^6$ cells/ml) of 1:1.

Figure 5:
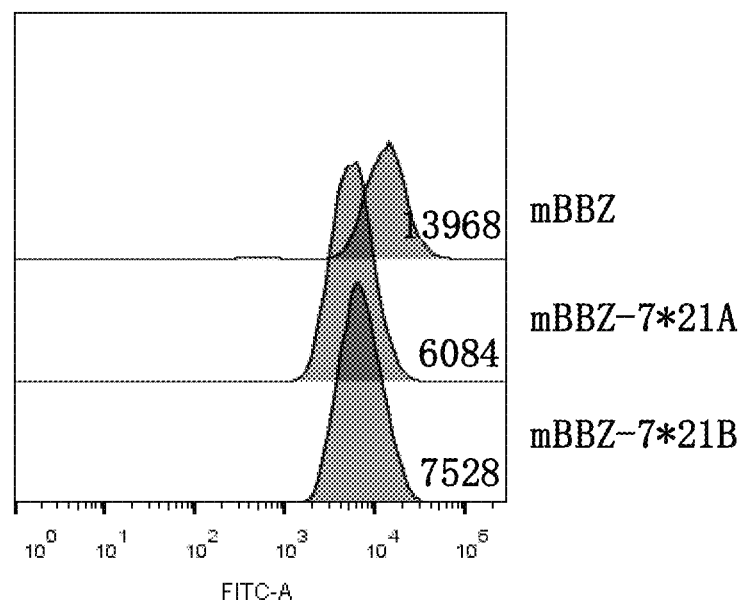
FIG. 5 shows the results of in vitro proliferation test.

Proliferation of CAR-T cells was detected by flow cytometry. The results are shown in FIG. 5. mBBZ-7*21A CAR-T cells and mBBZ-7*21B CAR-T cells can proliferate faster than mBBZ CAR-T cells.

Example 6. Tumor Treatment of PANC02-A2 Pancreatic Cancer Subcutaneous Xenograft Tumor Model 1) Experimental groups: C57BL/6 mice at 6-8 weeks old (purchased from Shanghai Xipuer-Bikai Experimental Animal Co., Ltd.) were randomly grouped (n=5-6), that is, UTD cells, mBBZ CAR-T cells, mBBZ-7*21A CAR-T cell, mBBZ-7*21B CAR-T cell treatment groups, respectively.

2) Inoculation of subcutaneous xenograft tumor: PANC02-A2 cells in logarithmic growth phase and good growth state were collected by trypsin digestion method. After washed once with PBS, the cell density was adjusted to $6\times10^6$/mL. 200 μL of cell suspension was subcutaneously injected into the right abdomen of C57BL/6 mice, that is, each mouse was inoculated with $1.2\times10^6$ tumor cells, and the inoculation day was recorded as day 0.

3) Reinfusion of CAR-T cells: On day 11 after subcutaneous inoculation of tumor cells, the average tumor volume was about 60 mm$^3$. Untreated T cells or CAR-T cells were injected with an injection dose of $2.5\times10^6$/animal.

Figure 6:
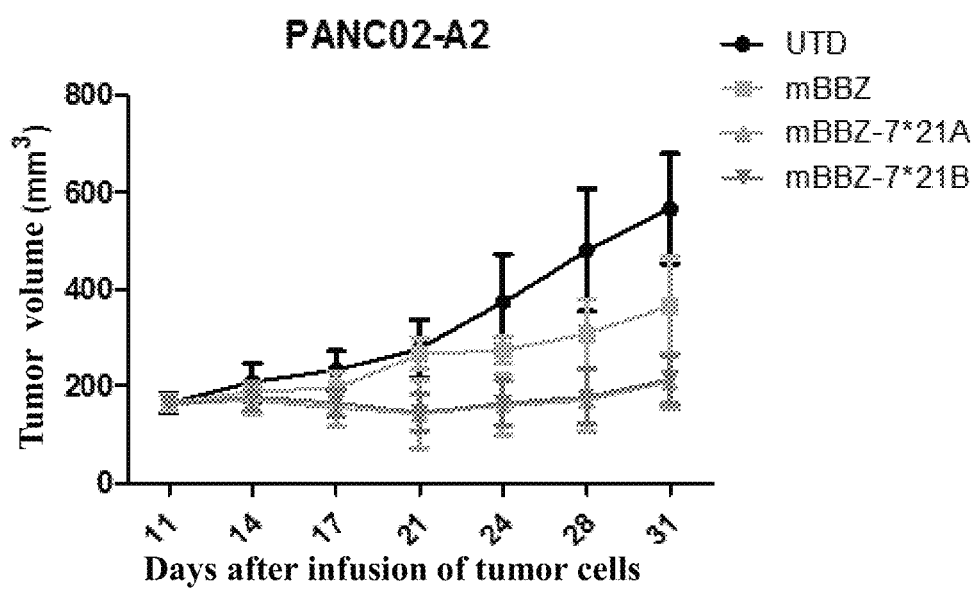
FIG. 6 shows the results of tumor treatment experiments in mice in vivo.

The results are shown in FIG. 6. On day 20 after CAR-T injection, the tumor inhibition rates were as follows: mBBZ CAR-T group: 35.5%, mBBZ-7*21A CAR-T group: 63%, mBBZ-7*21B CAR-T group: 62.4%, indicating that the anti-tumor effects of mBBZ-7*21A CAR-T cells and mBBZ-7*21B CAR-T cell treatment groups are better than mBBZ CAR-T cells (P<0.05).

Example 7. Comparison of Tumor Killings by Expressing Different Chemokines

Figure 7:
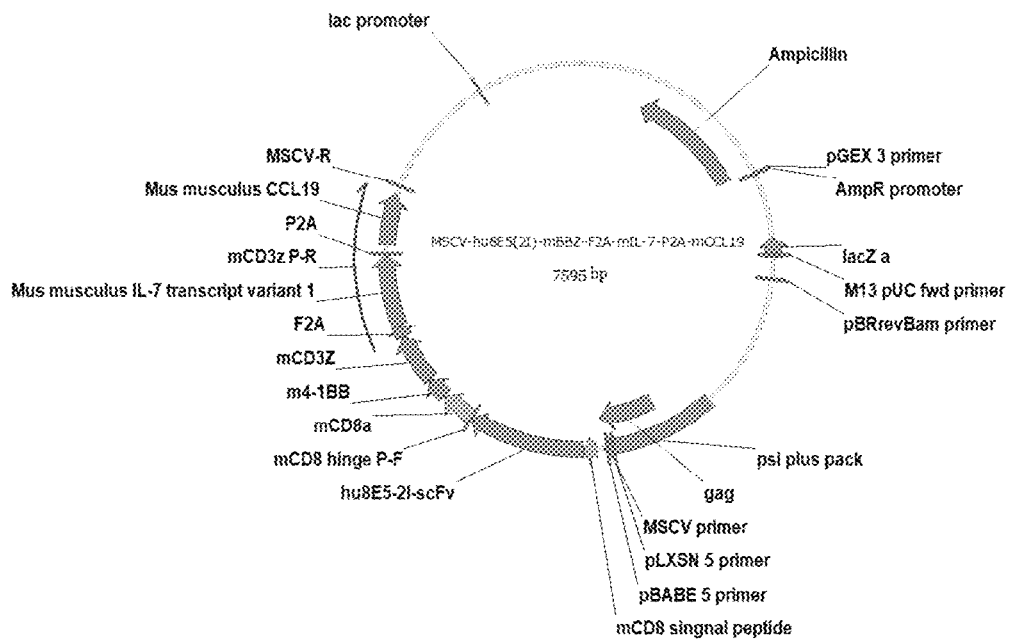
FIG. 7 is a plasmid map of mBBZ-7*19.

In this example, CAR-T cells (mBBZ-7*19 CAR-T cells) expressing IL7 and CCL19 were selected as controls. mBBZ-7*19 CAR-T cells were prepared in accordance with Example 1. F2A-mIL7-P2A-mCCL19 was inserted into the MSCV-hu8E5(2I)-mBBZ plasmid, so as to construct the retroviral plasmid expressing CAR, IL7 and CCL19. The plasmid map is shown in FIG. 7, and the nucleic acid sequence of mCCL19 is shown in SEQ ID NO: 34. Mouse T cells were infected by the plasmid to obtain mBBZ-7*19 CAR-T cells.

1) Mouse pancreatic cancer subcutaneous xenograft tumor model was prepared according to Example.

Figure 8A:
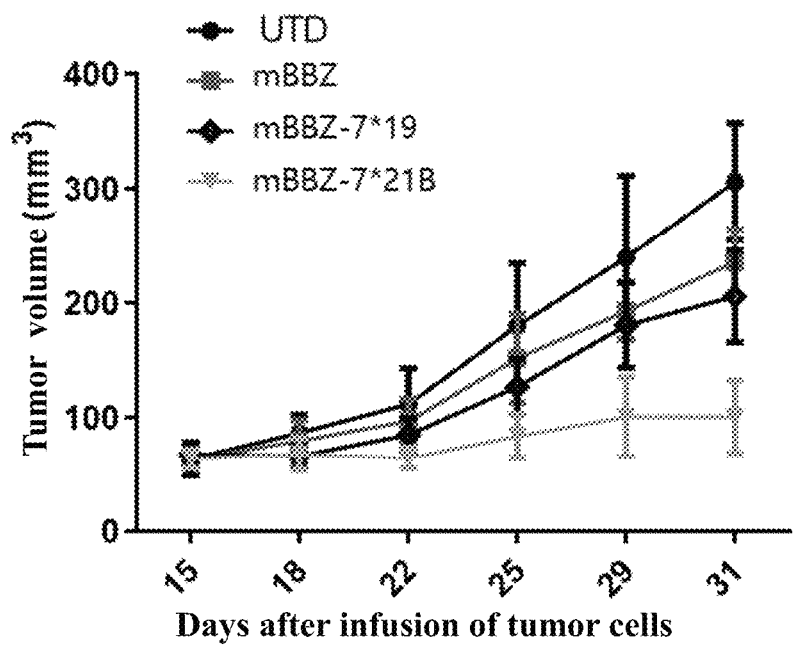
FIG. 8A shows the comparison results of in vivo killing effects of CAR-T cells expressing IL7 and CCL21 and CAR-T cells expressing IL7 and CCL19.

When the average tumor volume was about 65 mm$^3$, mBBZ CAR-T cells, mBBZ-7*19 CAR-T cells, mBBZ-7*21B CAR-T cell were injected in therapy groups, respectively, with an injection dose: $2.5\times10^6$ cells/mouse. The tumor killing results are shown in FIG. 8A, the tumor inhibition rates are: mBBZ CAR-T group: 22.8%, mBBZ-7*19 CAR-T group: 32.7%, mBBZ-7*21B CAR-T group: 76.6%. mBBZ-7*21B CAR-T cell treatment group exhibited better anti-tumor effects than mBBZ CAR-T cell and mBBZ-7*19 CAR-T cell group.

Figure 8B:
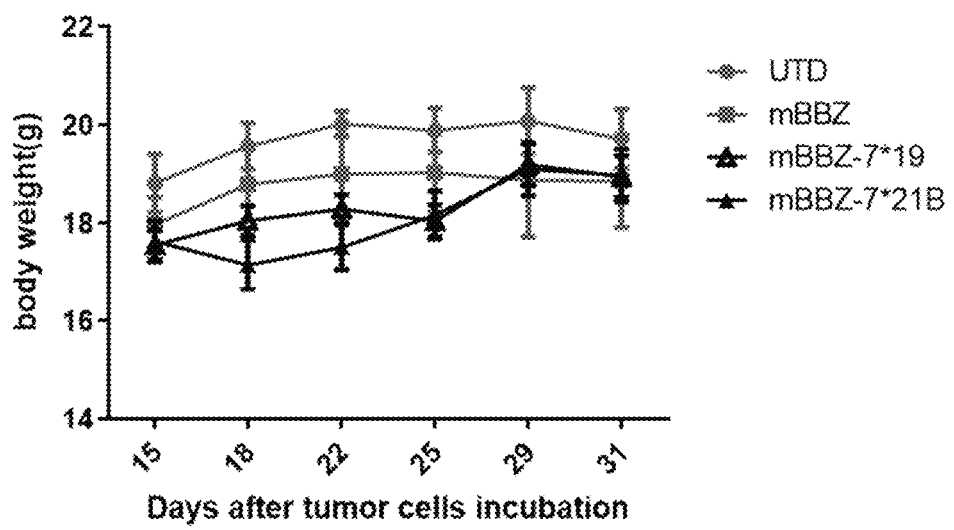
FIG. 8B shows the changes in the body weight of mice.

At the same time, the changes in body weight of mice in each group were detected (as shown in FIG. 8B), and the results showed that there was no significant difference in body weight between mice in each group (ns), indicating that the secretion of cytokines had no toxic effects on mice.

Figure 8C:
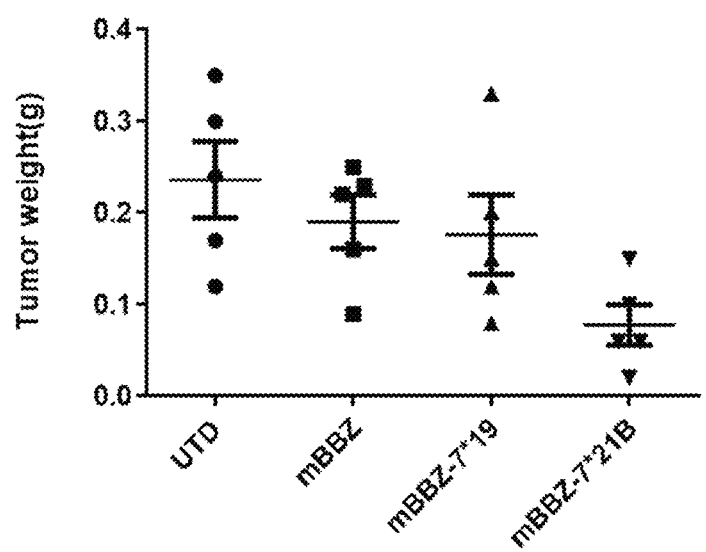
FIG. 8C shows the comparison results of tumor weight.

2) On day 31 after tumor inoculation, the mice were euthanized, and the tumors of the mice were removed and weighed. The statistical results are shown in FIG. 8C. The results showed that the tumor weight in the mBBZ-7*21B CAR-T treatment group was significantly smaller than that in the mBBZ group (P<0.05), indicating that the chimeric antigen receptor-modified T cells co-expressing IL7 and CCL21 can significantly enhance the inhibition on tumors in vivo by T cells.

3) After the CAR-T cells were re-infused, the tumor tissue was removed at the end of the experiment on day 31, and the number of copies of CAR-T cells in the tumor tissue was detected.

1 mg of tumor tissue block was taken and mechanically ground, and then QIAamp® genomic DNA kits was used to extract DNA from the tumor, and the concentration of each sample was measured separately. Real-time quantitative PCR (qPCR) was used to detect the number of copies of CARs. A standard curve was prepared according to the template plasmid, and finally, the number of copies of CARs in each sample was calculated.

Figure 8D:
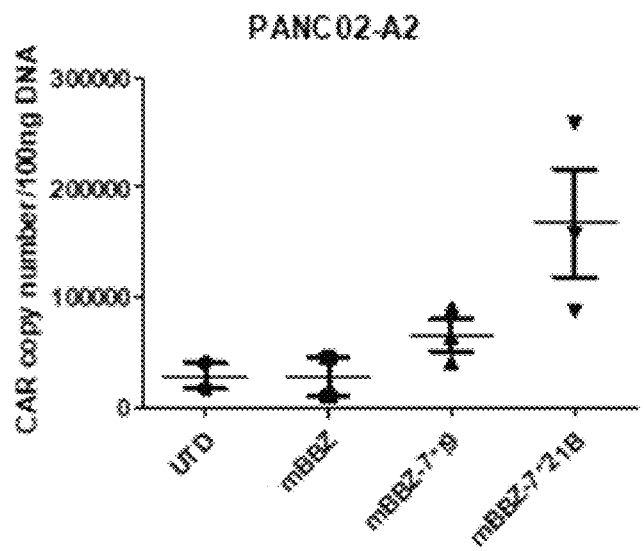
FIG. 8D shows the number of copies of CAR-T cells after treating PANC02-A2 pancreatic cancer in mice.

The results are shown in FIG. 8D, which shows that the number of copies of CAR-T cells in the mBBZ-7*21B CAR-T is higher.

4) Immunohistochemistry detection of tumor infiltration of CD8+ cells

The tumor tissue of the mouse euthanized in step 2) was taken, and prepared into paraffin tissue sections. After routine deparaffinization, the specimen was hydrate. After the hydration is completed, the sections were placed on a shaker and washed with PBS for 3 times. Citric acid buffer was boiled, and then the tissue sections were put into the citric acid buffer for hot-repair of antigen. After the repair was completed, the sections were blocked by using 1% BSA.

The corresponding CD8a antibody (anti-mouse CD8α antibody, purchased from: Cell Signaling) or blank control reagent were added to the blocked sections, incubated overnight at 4° C., washed with 0.5% PBST buffer; and then washed with PBS buffer.

The secondary antibody goat anti-rabbit-HRP was added to the washed sections, and incubated at 37° C. for 1 h. The sections were washed twice with 0.5% PBST buffer and once with PBS buffer. DAB (Dako REAL™ EnVision™ Detection System, Peroxidase/DAB+, 1:50 dilution) was used for development.

Hematoxylin was used for counter-stain until the nuclei were stained to deep red, and the counter-stained tissue sections were placed in the differentiation solution of 1% hydrochloric acid ethanol for 3 to 5 seconds; rinsed in tap water for 20 mins, dehydrated to transparent; soaked in 90% ethanol for 1 min; soaked in 100% ethanol I for 1 min; soaked in 100% ethanol II for 1 min; soaked in xylene for 3 min; mounted with neutral gum and air-dried.

Figure 8E:
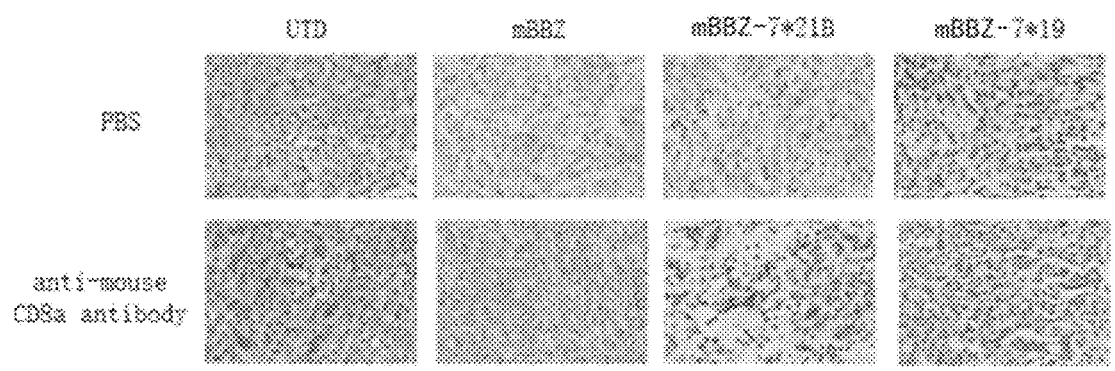
FIG. 8E shows the immunohistochemical detection results of CD8+ cells in pancreatic cancer in mice.

The sections were observed under a microscope, the results are shown in FIG. 8E. The mBBZ-7*19 group and mBBZ-7*21B group exhibited obvious CD8+ T cell infiltration, however, there was more CD8+ T cell infiltration in the mBBZ-7*21B CAR-T group.

Example 8. Orthotopic Xenograft Tumor Model of Breast Cancer in Mice

A mouse model of breast cancer subcutaneous xenograft tumor was prepared, and E0771-A2 cells in logarithmic growth phase and good growth state were collected by trypsinization method (preparation method: pwpt-mclaudin18.2 plasmid packaging lentivirus was used to infect E0771 cells). The cells were washed with PBS once, and the cell density was adjusted to $2 \times 10^7$/mL, and 50 μL of cell suspension was subcutaneously injected into the fourth pair of breasts on the right abdomen of C57BL/6 mice, that is, each mouse was inoculated with $1 \times 10^6$ E0771-A2 cells, and the vaccination day was day 0.

Reinfusion of CAR-T: On day 12 after subcutaneous inoculation of tumor cells, the average tumor volume was about 150 mm³. Untreated T cells or CAR-T cells were injected with an injection dose: $2.5 \times 10^6$/animal.

Figure 9A:
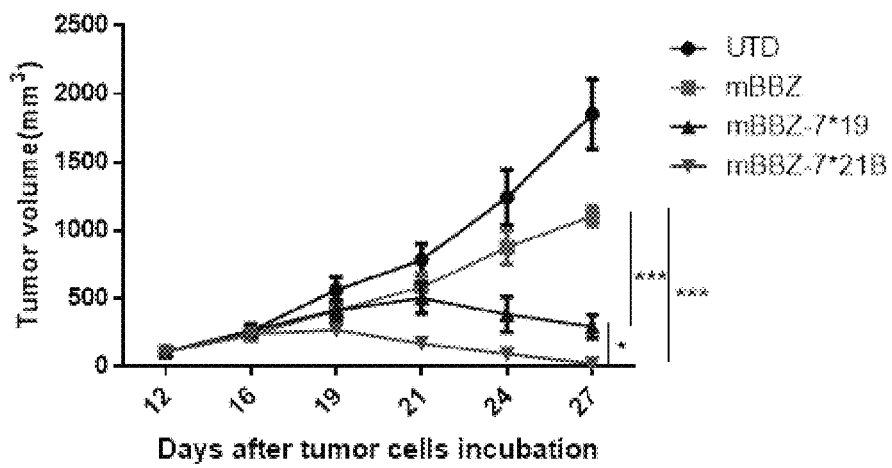
FIG. 9A shows changes in the tumor volume after treating breast cancer E0771-A2 orthotopic xenograft tumor in mice by using CAR-T cells.

The volume of E0771-A2 xenograft tumor was measured every 3-4 days, changes in the tumor volume in each group of mice were recorded, and the results are shown in FIG. 9A. Compared with mBBZ-7*19 CAR-T group, the tumor-killing ability in mBBZ-7*21B CAR T treatment group was significantly enhanced.

Figure 9B:
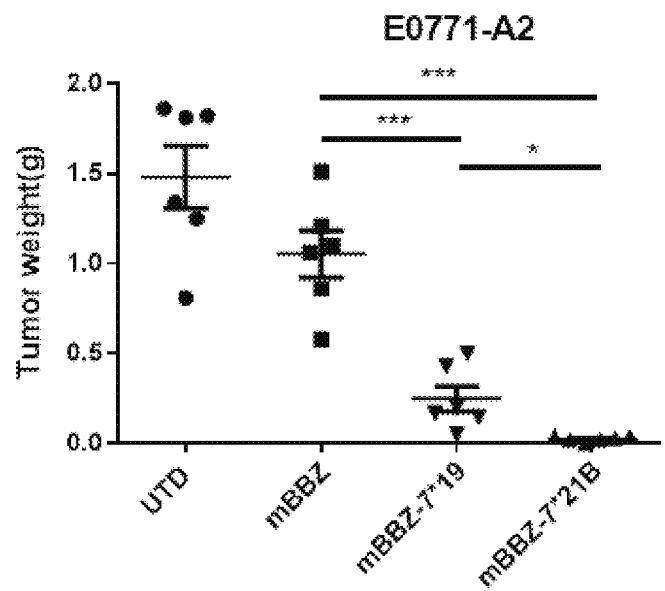
FIG. 9B shows the tumor weight after treating breast cancer E0771-A2 orthotopic xenograft tumor in mice.

On day 31 after tumor inoculation, the mice were euthanized. The tumors of the mice were removed and weighed. The statistical results are shown in FIG. 9B. The results showed that the tumor weight in the mBBZ-7*21B CAR-T treatment group was significantly smaller than that in the mBBZ-7*19 CAR-T group (P<0.05) and mBBZ CAR-T group (P<0.001), indicating that the chimeric antigen receptor-modified T cells co-expressing IL7 and CCL21 can significantly enhance the inhibition on tumors in vivo by T cells.

Figure 9C:
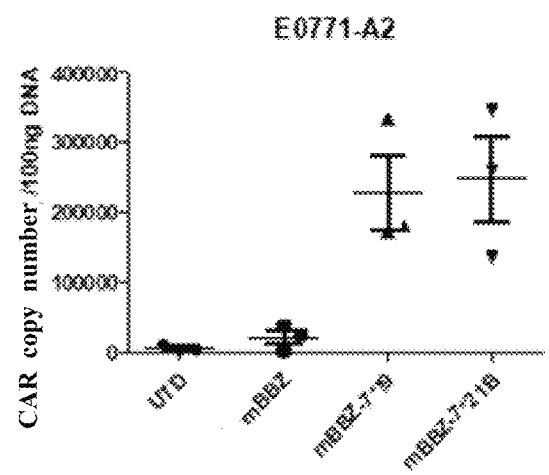
FIG. 9C shows the number of copies of CAR-T cells after treating breast cancer in mice.

According to step 3) of Example 7, the number of copies of the CAR-T cells in the breast cancer subcutaneous xenograft model was detected. The results are shown in FIG. 9C, which showed that the numbers of copies of the CAR-T in mBBZ-7*19 CAR-T and mBBZ-7*21B CAR-T groups are higher than those in the UTD and BBZ groups.

Figure 9D:
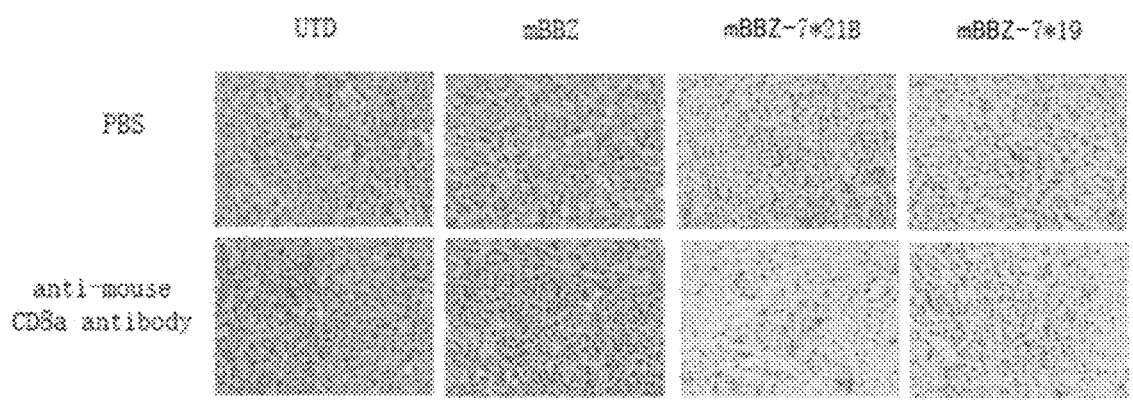
FIG. 9D shows the results of immunohistochemical detection of mouse breast cancer CD8+ cells.

According to step 4) of Example 7, the tumor infiltration of CD8+ cells was detected. The results are shown in FIG. 9D. There are obvious tumor infiltration of CD8 T cells in the tumor tissues in the mBBZ-7*19 CAR-T group and mBBZ-7*21B CAR-T group, and there were more infiltration of CD8+ T cells in mBBZ-7*21B CAR-T group.

Example 9. Subcutaneous Xenograft Tumor Model of Liver Cancer in Mice

A mouse model of liver cancer xenograft tumor was prepared, and Hepa1-6-A2 cells in logarithmic growth phase and good growth state were collected by trypsinization method (pwpt-mclaudin18.2 plasmid packaging lentivirus was used to infect Hepa1-6 cells). The cells were washed with PBS once, and the cell density was adjusted to $5 \times 10^7$/mL, and 200 μL of cell suspension was subcutaneously injected into the right abdomen of C57BL/6 mice, that is, each mouse was inoculated with $1 \times 10^7$ Hepa11-6-A2 liver cancer cells, and the vaccination day was day 0.

Reinfusion of CAR-T cells: On day 7 after subcutaneous inoculation of tumor cells, the average tumor volume was about 300 mm³. Untreated T cells or CAR-T cells were injected with an injection dose: $1 \times 10^6$/animal.

Figure 10A:
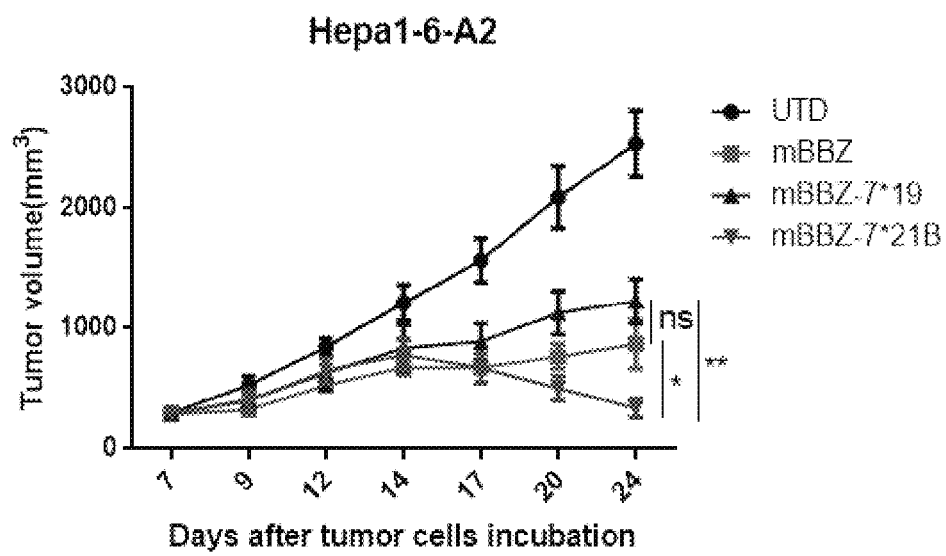
FIG. 10A shows changes in the tumor volume after treating Hepa1-6-A2 xenograft tumor of liver cancer in mice.

The volume of Hepa11-6-A2 xenograft tumor was measured every 3-4 days, changes in the tumor volume in each group of mice were recorded, and the results are shown in FIG. 10A. Compared with mBBZ-7*19 CAR-T group, the tumor-killing ability in mBBZ-7*21B CAR T treatment group was significantly enhanced.

Figure 10B:
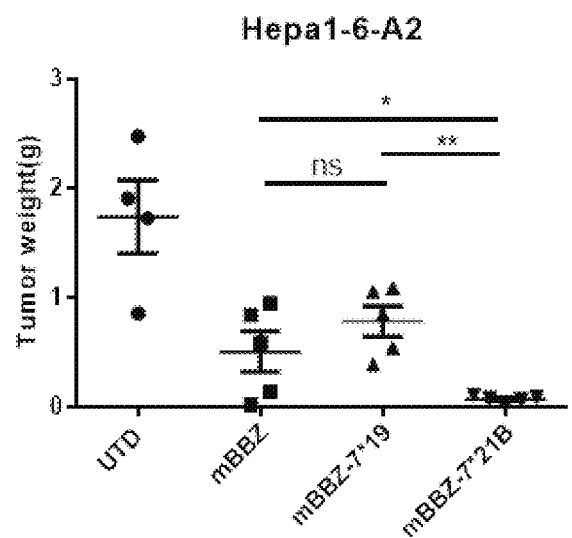
FIG. 10B shows the tumor weight after treating the xenograft tumor of Hepa1-6-A2 liver cancer in mice.

On day 31 after tumor inoculation, the mice were euthanized. The tumors of the mice were removed and weighed. The statistical results are shown in FIG. 10B. The results showed that the tumor weight in the mBBZ-7*21B CAR-T treatment group was significantly smaller than that in the mBBZ-7*19 CAR-T group (P<0.01) and 8E5-2I-mBBZ CAR-T group (P<0.05), indicating that the chimeric antigen receptor-modified T cells co-expressing IL7 and CCL21 can significantly enhance the inhibition on tumors in vivo by T cells.

Figure 10C:
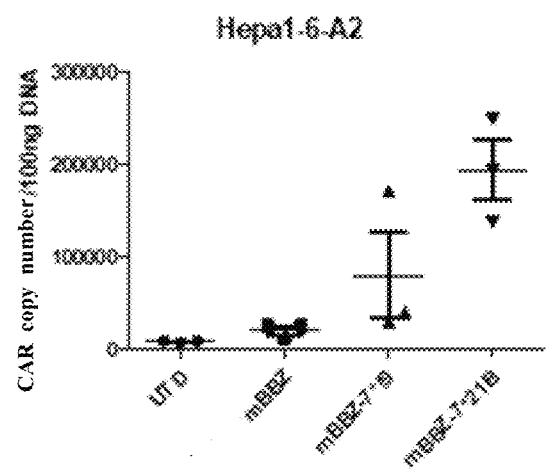
FIG. 10C shows the number of copies of CAR-T cells after treating liver cancer in mice.

According to step 3) of Example 7, the number of copies of the CAR-T cells was detected. The results are shown in FIG. 10C, which showed that the numbers of copies of the CAR-T in mBBZ-7*21B CAR-T group are higher.

Figure 10D:
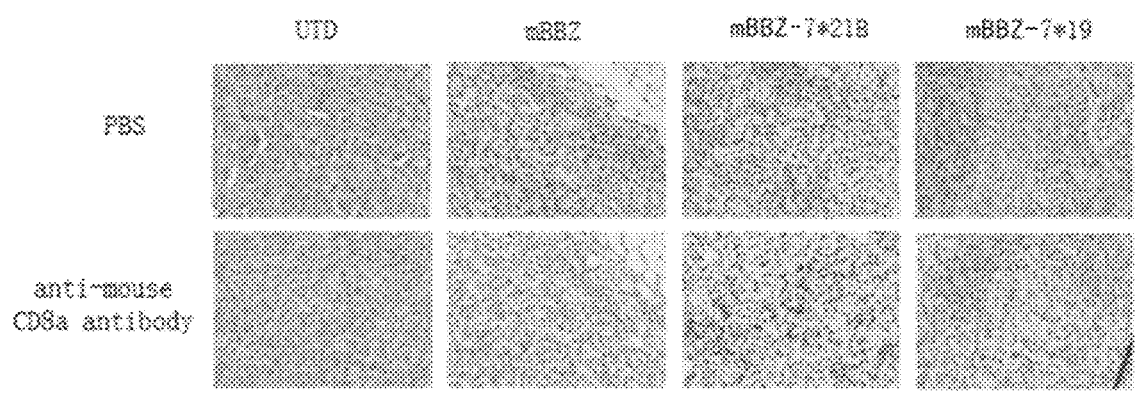
FIG. 10D shows the results of immunohistochemical detection of mouse liver cancer CD8+ cells.

According to step 4) of Example 7, the tumor infiltration of CD8+ cells was detected. The results are shown in FIG. 10D. There are obvious tumor infiltration of CD8+ T cells in the tumor tissues in the mBBZ-7*19 CAR-T group and mBBZ-7*21B CAR-T group, and there were more infiltration of CD8+ T cells in mBBZ-7*21B CAR-T group.

Example 10. In Vitro Detection of IFN-γ

UTD, 8E5-21-mBBZ-CAR, mBBZ-7*21B CAR-T, and mBBZ-7*19 CAR-T were incubated with the target cells PANC02-A2 at a ratio of 1:1 for 24 hours, respectively, then the supernatant was collected, and the secretion level of IFN-γ in the supernatant was detected by ELISA. The used ELISA kit is mouse IFN-γ detection kit (LinkTech).

Figure 11:
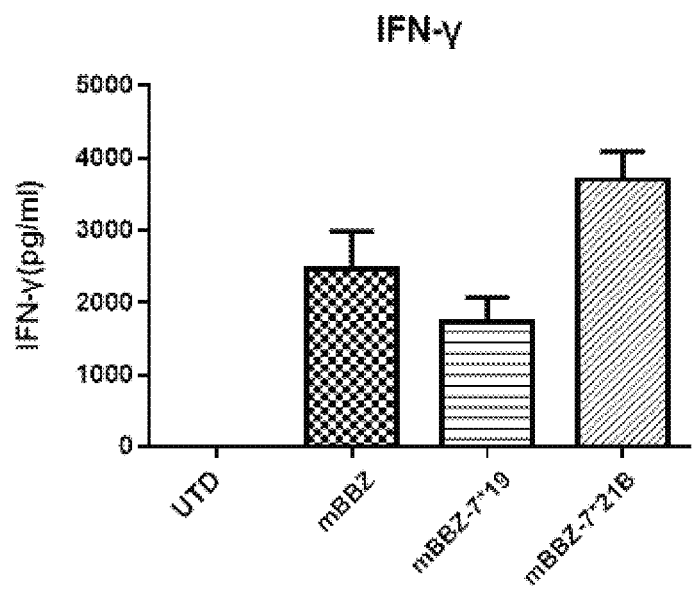
FIG. 11 shows the results of IFN-γ detection in vitro.

The results are shown in FIG. 11, which showed that, after mBBZ-7*21B CAR-T cells were incubated with claudin18.2-positive tumor cells, there was more IFN-γ secretion.

Example 11. Treatment of Mouse PANC02-A2 Pancreatic Cancer Subcutaneous Tumor Lymphocyte-Clearing Model According to Example 6, a PANC02-A2 subcutaneous xenograft tumor model of C57BL/6 mouse was prepared, and the vaccination day was day 0. On day 14 after the tumor inoculation, the average tumor volume was about 60 mm$^3$. Cyclophosphamide was injected into the tail vein at 100 mg/kg. On day 15 after tumor inoculation, untreated T cells or CAR-T cells were injected with an injection dose: 2.5× 10$^6$/animal.

Figure 12A:
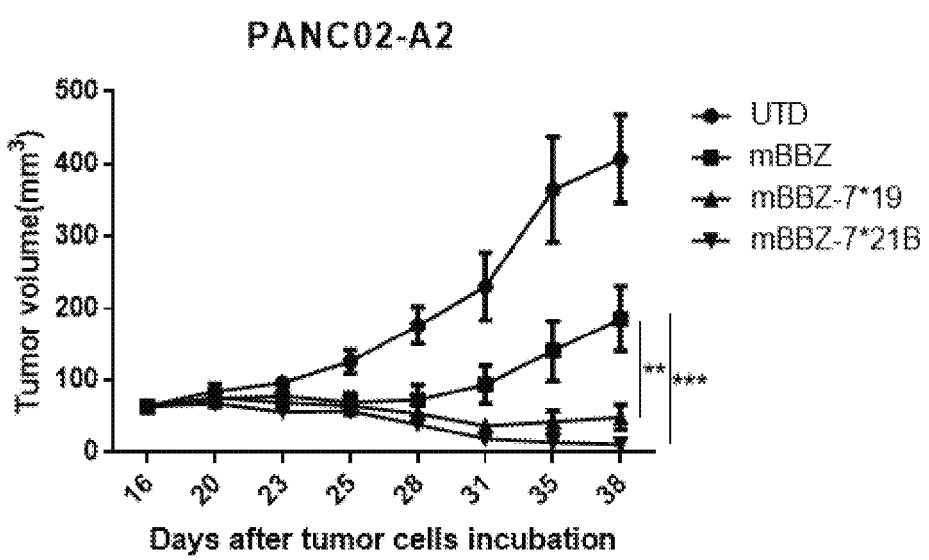
FIG. 12A shows changes in the tumor volume of the mouse pancreatic cancer subcutaneous tumor lymphocyte-clearing model after CAR-T cell treatment.
Figure 12B:
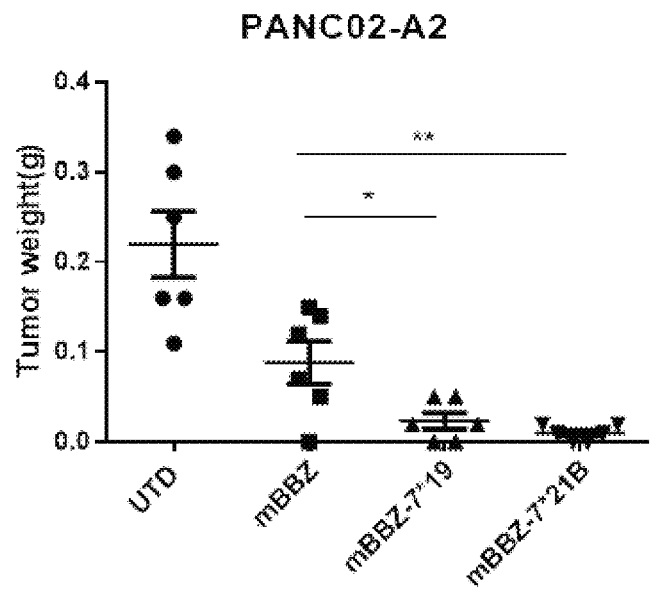
FIG. 12B shows the tumor weight after treating the mouse pancreatic cancer subcutaneous tumor lymphocyte-clearing model.

The volume of PANC02-A2 xenograft tumor was measured every 3-4 days, changes in the tumor volume in each group of mice were recorded, and the results are shown in FIG. 12A. On day 38 after tumor inoculation, the mice were euthanized. The tumors of the mice were removed and weighed. The statistical results are shown in FIG. 12B.

Figure 12C:
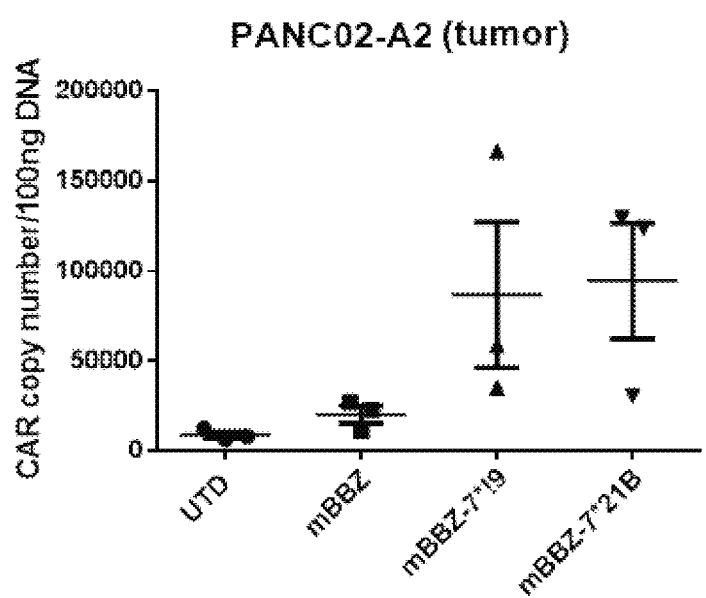
FIG. 12C shows the number of copies of CAR-T cells after treating the mouse pancreatic cancer subcutaneous tumor lymphocyte-clearing model.

According to step 3) of Example 7, the number of copies of the CAR-T cells was detected. The results are shown in FIG. 12C, which showed that the numbers of copies of the CAR-T in mBBZ-7*19 CAR-T and mBBZ-7*21B CAR-T groups are higher that those in UTD and BBZ group.

Figure 12D:
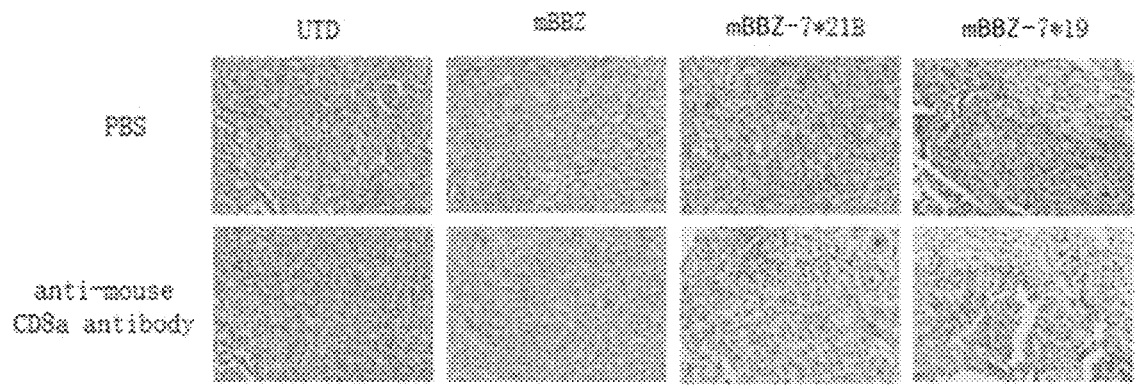
FIG. 12D shows the results of immunohistochemical detection on CD8+ cells in the mouse pancreatic cancer subcutaneous tumor lymphocyte-clearing model.

According to step 4) of Example 7, the tumor infiltration of CD8$^+$ cells was detected. The results are shown in FIG. 12D. There are obvious tumor infiltration of CD8$^+$ T cells in the tumor tissues in the mBBZ-7*19 CAR-T group and mBBZ-7*21B CAR-T group, and there were more infiltration of CD8 T cells in mBBZ-7*21B CAR-T group.

Example 12. Detection and Analysis of CAR-T Cells in Mouse PANC02-A2 Pancreatic Cancer Subcutaneous Tumor Model According to Example 6, a pancreatic cancer subcutaneous xenograft tumor model of mouse was prepared. 2×10$^6$ PANC02-A2 pancreatic cancer cells were subcutaneously injected into the right abdomen of C57BL/6 mice. On day 14 after the subcutaneous inoculation of tumor cells, the average tumor volume was about 60 mm$^3$. Untreated T cells or CAR-T cells (mBBZ CAR-T cells, mBBZ-7*21A CAR-T cells, and mBBZ-7*19 CAR-T cells) were injected with an injection dose: 4×10$^6$/animal.

1. The spleen and bone marrow of mice on day 10 (d10) and day 20 (d20) after CAR-T cell treatment were extracted to detect the content of Tcm (central memory T cells) (2 mice in each treatment group). The experimental method is as follows:

1) Extraction of spleen cells: the mice were sacrificed by cervical dislocation. The spleen was taken, placed in a clean 2 mL EP tube, and washed with PBS to remove blood stains. The spleen cells were ground with a 40 μm filter membrane. The spleen cell mixture was centrifuged at 400 g for 5 min to remove the supernatant. 400 μL of mouse red blood cell lysate (1×) was added and stood for 5 min. 1.5 mL of PBS was added to neutralize the reaction, centrifuged, resuspended in PBS, and separated into different tubes for incubation with antibody. Antibodies were marked as CD8 (PerCP), CD44 (BV510), CD62L (APC).

2) Extraction of bone marrow cells: the mice were sacrificed by cervical dislocation. The femurs and tibias of the mouse were taken with the muscles being removed, placed in a clean 2 mL EP tube, and washed with PBS to remove blood stains. 2 mL of PBS was aspirated by a 2 mL syringe. The needle was punctured along one end of the femur or tibia, and fixed with a tweezers. The piston was squeezed to wash and take the bone marrow cells. The cell mixture was centrifuged at 400 g for 5 min to remove the supernatant. 400 μL of mouse red blood cell lysate (1×) was added, and stood for 5 min. 400 μL of mouse red blood cell lysate (1×) was added, and stood for 5 min. 1.5 mL of PBS was added to neutralize the reaction, centrifuged, resuspended in PBS, and separated into different tubes for incubation with antibody. The antibody was marked as CD8 (PerCP), CD44 (BV510), CD62L (APC).

Figure 13A:
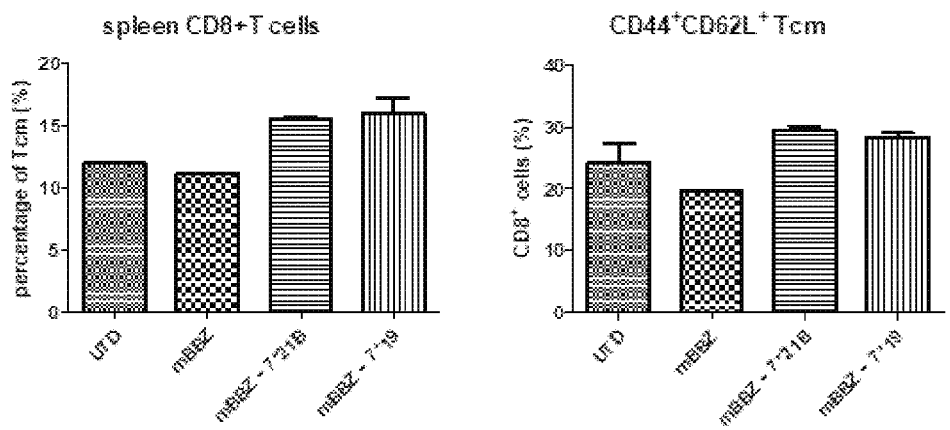
FIG. 13A shows the detection of Tem in the spleen on day 10 during the CAR-T treatment of mouse pancreatic cancer PANC02-A2 subcutaneous tumor model.
Figure 13B:
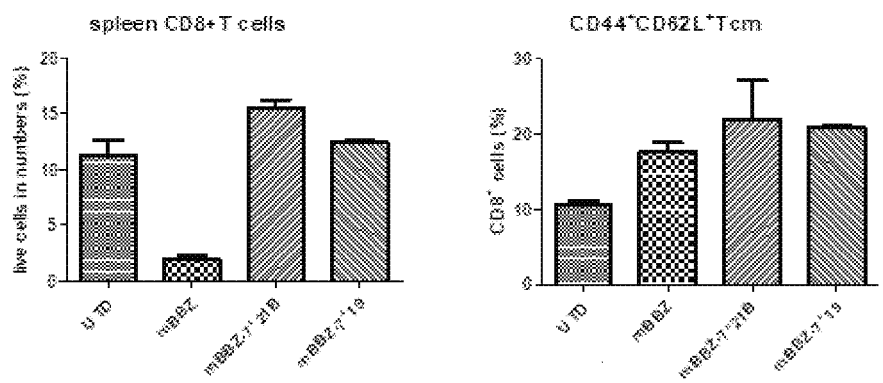
FIG. 13B shows the detection of Tcm in the spleen on day 20.

The detection of Tcm in the spleen on day 10 is shown in FIG. 13A, and the detection of Tcm in the spleen on day 20 is shown in FIG. 13B. Compared with the conventional CAR-T, the content of Tcm in mBBZ-CAR-T cell group expressing IL7 and CCL21 was significantly increased.

Figure 14A:
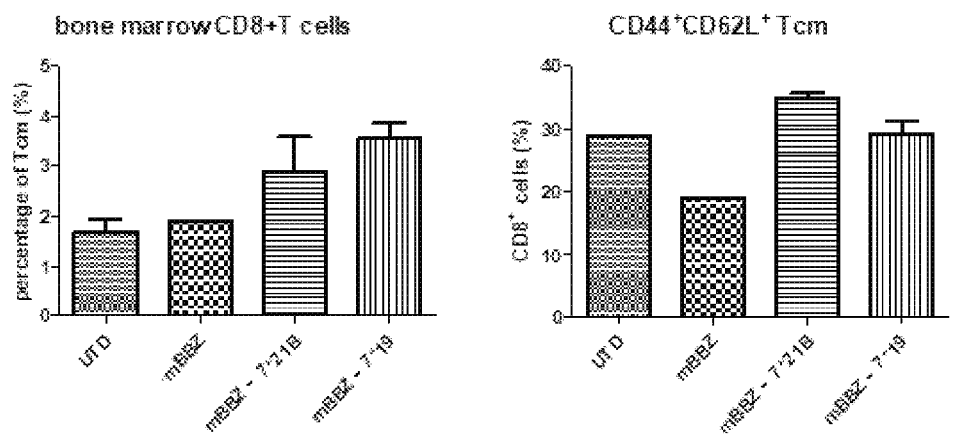
FIG. 14A shows the content of Tcm in the bone marrow on day 10 during the CAR-T treatment of mouse pancreatic cancer PANC02-A2 subcutaneous tumor model.
Figure 14B:
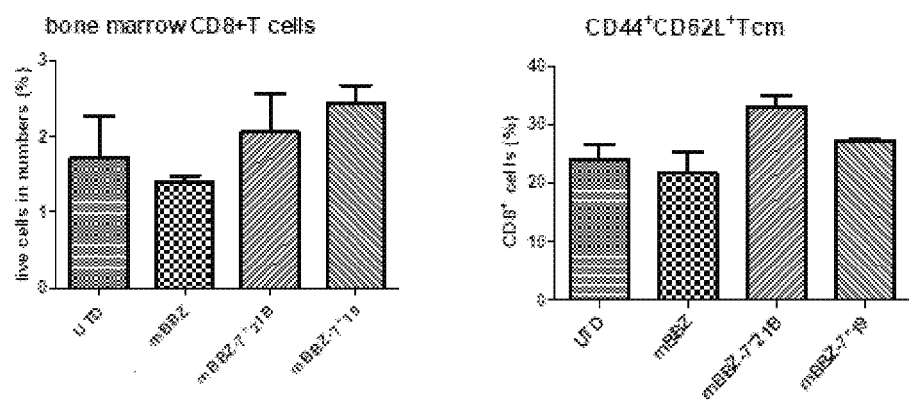
FIG. 14B shows the detection of Tcm in the bone marrow on day 20.

The content of Tcm in the bone marrow on day 10 is shown in FIG. 14A, and the detection of Tcm in the bone marrow on day 20 is shown in FIG. 14B. Compared with the conventional CAR-T, after mBBZ-7*21BCAR-T treatment, the content of Tcm in the bone marrow was significantly increased.

2. Detection of DC Infiltration

Figure 15:
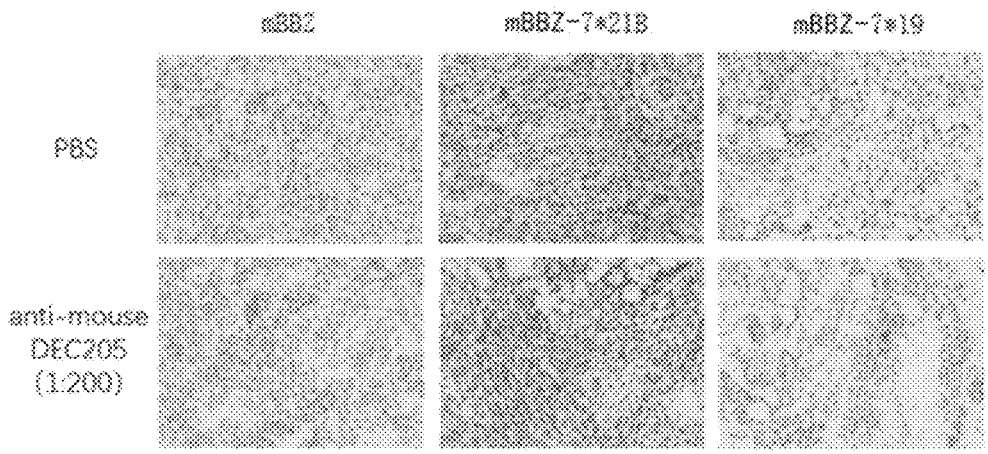
FIG. 15 shows that more DC cell infiltration in the mouse tumor tissue on day 10 during the CAR-T treatment of mouse pancreatic cancer PANC02-A2 subcutaneous tumor model.

On day 10 (d10) after CAR-T cell treatment, the tumor tissues of mice were frozen and sectioned to detect the infiltration of DC. The results are shown in FIG. 15. Compared with the mBBZ cell group, there was more DC cell infiltration in the tumor tissue of mouse in the mBBZ-7*21B cell group.

3. Detection of content of MDSC (inhibiting cells derived from bone marrow)

Figure 16:
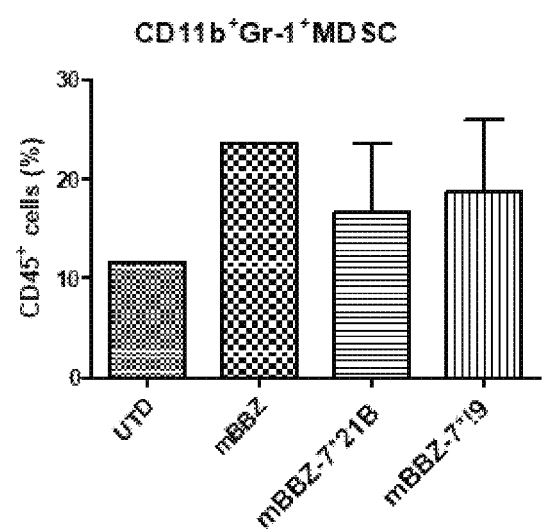
FIG. 16 shows the content of MDSC in the mouse tumor tissue on day 10 during the CAR-T treatment of mouse pancreatic cancer PANC02-A2 subcutaneous tumor model.

The tumor tissues of mice in the UTD group, mBBZ group, mBBZ-7*21B group, and mBBZ-7*19 CAR-T group were extracted on day 10 (d10) after CAR-T cell treatment, respectively, and the fat, blood vessels, envelopes and internal necrotic tissues on the tumor surface were removed. The tumor were rinsed with PBS, transferred to a 5 mL of centrifuge tube and 2 mL of culture medium was added. The tumor was cut into about 1×1 mm, and the culture medium was added to 4.7 mL. Digestive enzyme (digestive enzymes used in the separation of tissue: collagenase type I (0.05 mg/ml), collagenase type IV (0.05 mg/ml), hyaluronidase (0.025 mg/ml), DNase I (0.01 mg/ml)) was added in proportion, and placed in a shaker at 37° C. for about 30 minutes (during which the sample was taken out to observe the digestion). After digestion, the suspension was passed through a 70 μm cell sieve to a 50 mL tube (operating on ice), a syringe piston was used to gently push the undigested tissue, and a large amount (up to 20 mL) of culture medium was used to wash the sieve and collect cells. The digestion was quenched, the suspension was centrifuged at 400 g for 8 min at 4° C. to remove the supernatant. The obtained pellet was washed with PBS, separated into different tubes and incubated with an antibody to detect the contents of CD45$^+$, CD11b$^+$ (FITC) and Gr-1$^+$ (PE) cells, that is, the content of MDSC. The results are shown in FIG. 16: after mBBZ-7*21B CAR-T treatment, the content of MDSC in the tumor tissue was less than that in the mBBZ group.

As an example, CAR-T cells targeting CLD18A2 were selected in the above examples. It should be understood that CAR-T cells acting on other targets, such as GPC3, EGFR, EGFRVIII, CD19, BCMA, and the like will also have the same effect. The used antibodies can be mouse antibodies or humanized, and the used transmembrane domain and intracellular domain can also be of different species according to different purposes, such as human.

As an example, CAR-T cells were used in the above examples, however, the T cells can also express other cytokines that can enhance the function of CAR-T cells, such as CAR-T cells co-expressing CAR and type I interferon, CAR-T cells co-expressing CAR and PD-1, etc. As an example, CAR-T cells were used in the above examples, however, other immune cells, such as NK cells, NK-T cells, can be selected, and specific subtypes of immune cells, such as γ/δ T cells, and the like can also be selected.

The sequences used in the present invention are summarized in the following table:

| SEQ ID NO. | Name | Sequence |
|---|---|---|
| 1 | Hu8E5-2I scFv nucleic acid sequence | caggtgcagctgcaggagagcggccccggcctgatcaagcccagccaga ccctgagcctgacctgcaccgtgagcggcggcagcatcagcagcggctac aactggcactggatccggcagcccccccggcaagggcctggagtggatcg gctacatccactacaccggcagcaccaactacaaccccgccctgcggagc cgggtgaccatcagcgtggacaccagcaagaaccagttcagcctgaagct gagcagcgtgaccgccgccgacaccgccatctactactgcgcccggatct acaacggcaacagcttcccctactggggccagggcaccaccgtgaccgtg agcagcggtggaggcggttcaggcggaggtggttctggcggtggcggat cggacatcgtgatgacccagagccccgacagcctggccgtgagcctggg cgagcgggccaccatcaactgcaagagcagccagagcctgttcaacagc ggcaaccagaagaactacctgacctggtaccagcagaagcccggccagc cccccaagctgctgatctactgggcagcacccgggagagcggcgtgccc gaccggttcagcggcagcggcagcggcaccgacttcaccctgaccatcag cagcctgcaggccgaggacgtggccgtgtactactgccagaacgcctaca gcttcccctacaccttcggggggcaccaagctggagatcaagcgg |
| 2 | Hu8E5-2I scFv amino acid sequence | qvqlqesgpglikpsqtlsltctvsggsissgynwhwirqppgkglewig yihytgstnynpalrsrvtisvdtsknqfslklssvtaadtaiyycariyngn sfpywgqgttvtvssggggsggggsggggsdivmtqspdslavslgera tinckssqslfnsgnqknyltwyqqkpgqppkllywastresgvpdrfs gsgsgtdftltisslqaedvavyycqnaysfpytfgggtkleikr |
| 3 | mouse CD8α signal peptide nucleic acid sequence | atggcctcaccgttgacccgctttctgtcgctgaacctgctgctgctgggtga gtcgattatcctggggagtggagaagct |
| 4 | mouse CD8α signal peptide amino acid sequence | maspltrflslnllllgesiilgsgea |
| 5 | mouse CD8 hinge region + transmembrane domain nucleic acid sequence | actactaccaagccagtgctgcgaactccctcacctgtgcaccctaccggg acatctcagccccagagaccagaagattgtcggccccgtggctcagtgaag gggaccggattggacttcgcctgtgatatttacatctgggcacccttggccg gaatctgcgtggcccttctgctgtccttgatcatcactctcatctgctaccaca ggagccga |
| 6 | mouse CD8 hinge region +transmembrane domain amino acid sequence | tttkpvlrtpspvhptgtsqpqrpedcrprgsvkgtgldfacdiyiwaplag icvalllsliitlicyhrsr |
| 7 | mouse CD28 intracellular domain nucleic acid sequence | aatagtagaaggaacagactccttcaaagtgactacatgaacatgactcccc ggaggcctgggctcactcgaaagccttaccagcccctacgcccctgccaga gactttgcagcgtaccgcccc |
| 8 | mouse CD28 intracellular domain amino acid sequence | nsrrnrllqsdymnmtprrpgltrkpyqpyapardfaayrp |
| 9 | Nucleic acid sequence of intracellular segment CD3ξ of mouse CD3 | agcaggagtgcagagactgctgccaacctgcaggaccccaaccagctcta caatgagctcaatctagggcgaagagaggaatatgacgtcttggagaagaa gcgggctcgggatccagagatgggaggcaaacagcagaggaggaggaa cccccaggaaggcgtatacaatgcactgcagaaagacaagatggcagaa gcctacagtgagatcggcacaaaaggcgagaggcggagaggcaagggg cacgatggcctttaccagggtctcagcactgccaccaaggacacctatgat gccctgcatatgcagacgcctggcc |

| SEQ ID NO. | Name | Sequence |
|---|---|---|
| 10 | amino acid sequence of intracellular segment CD3ξ of mouse CD3 | srsaetaanlqdpnqlynelnlgrreeydvlekkrardpemggkqqrrrn pqegvynalqkdkmaeayseigtkgerrrgkghdglyqglstatkdtyd alhmqtla |
| 11 | F2A nucleic acid sequence | gtgaaacagactttgaattttgaccttctgaagttggcaggagacgttgagtc caaccctgggccc |
| 12 | F2A amino acid sequence | vkqtlnfdllklagdvesnpgp |
| 13 | mouse IL7 nucleic acid sequence | atgttccatgtttcttttagatatatctttggaattcctccactgatccttgttctgc tgcctgtcacatcatctgagtgccacattaaagacaaagaaggtaaagcata tgagagtgtactgatgatcagcatcgatgaattggacaaaatgacaggaact gatagtaattgcccgaataatgaaccaaacttttttagaaaacatgtatgtgat gatacaaaggaagctgcttttctaaatcgtgctgctcgcaagttgaagcaattt cttaaaatgaatatcagtgaagaattcaatgtccacttactaacagtatcacaa ggcacacaaacactggtgaactgcacaagtaaggaagaaaaaaacgtaaa ggaacagaaaaagaatgatgcatgttttcctaaagagactactgagagaaat aaaaacttgttggaataaaattttgaagggcagtata |
| 14 | mouse CCL21a nucleic acid sequence | atggctcagatgatgactctgagcctccttagcctggtcctggctctctgcat cccctggacccaaggcagtgatggagggggtcaggactgctgccttaagt acagccagaagaaaattccctacagtattgtccgaggctataggaagcaag aaccaagtttaggctgtcccatcccggcaatcctgttctcaccccggaagca ctctaagcctgagctatgtgcaaaccctgaggaaggctgggtgcagaacct gatgcgccgcctggaccagcctccagccccaggaaacaaagcccggc tgcaggaagaaccgggggaacctctaagtctggaaagaaaggaaagggct ccaagggctgcaagagaactgaacagacacagccctcaagagga |
| 15 | mouse CCL21b nucleic acid sequence | atggctcagatgatgactctgagcctccttagcctggtcctggctctctgcat cccctggacccaaggcagtgatggaggggggacaggactgctgccttaagt acagccagaagaaaattccctacagtattgtccgaggctataggaagcaag aaccaagtttaggctgtcccatcccggcaatcctgttctcaccccggaagca ctctaagcctgagctatgtgcaaaccctgaggaaggctgggtgcagaacct gatgcgccgcctggaccagcctccagccccaggaaacaaagcccggc tgcaggaagaaccgggggaacctctaagtctggaaagaaaggaaagggct ccaagggctgcaagagaactgaacagacacagccctcaagagga |
| 16 | P2A nucleic acid sequence | gctactaacttcagcctgctgaagcaggctggagacgtggaggagaaccct ggacct |
| 17 | human IL7 nucleic acid sequence | atgttccatgtttcttttaggtatatctttggacttcctccccct- gatccttgttctgtt gccagtagcatcatctgattgtgatattgaaggtaaagatggcaaacaatatg agagtgttctaatggtcagcatcgatcaattattggcagcatgaaagaaatt ggtagcaattgcctgaataatgaatttaacttttttaaaagacatatctgtgatg ctaataaggaaggtatgttttattccgtgctgctcgcaagttgaggcaatttct taaaatgaatagcactggtgattttgatctccacttattaaaagtttcagaaggc acaacaatactgttgaactgcactggccaggttaaaggaagaaaaaccagct gccctgggtgaagcccaaccaacaaagagtttggaagaaaataaatctttaa aggaacagaaaaaactgaatgacttgtgtttcctaaagagactattacaaga gataaaaacttgttggaataaaattttgatgggcactaaagaacactga |
| 18 | human IL7 amino acid sequence | mfhvsfryifglpplilvllpvassdcdiegkdgkqyesvlmvsidqllds mkeigsnclnnefnffkrhicdankegmflfraarklrqflkmnstgdfdl hllkvsegttillnctgqvkgrkpaalgeaqptksleenkslkeqkklndlc flkrllqeiktcwnkilmgtkeh |
| 19 | human IL7R amino acid sequence | mtilgttfgmvfsllqvvsgesgyaqngdledaelddysfscysqlevng sqhsltcafedpdvnitnlefeicgalvevkclnfrklqeiyfietkkflligk snicvkvgeksltckkidlttivkpeapfdlsvvyregandfvvtfntshlq kkyvkvlmhdvayrqekdenkwthvnlsstkltllqrklqpaamyeikv rsipdhyfkgfwsewspsyyfrtpeinnssgemdpilltisilsffsvallvi lacvlwkkrikpivwpslpdhkktlehlckkprknlnvsfnpesfldcqi hrvddiqardevegflqdtfpqqleesekqrlggdvqspncpsedvvitp esfgrdssltclagnvsacdapilsssrsldcresgkngphvyqdllslgtt nstlpppfslqsgiltlnpvaqgqpiltslgsnqeeayvtmssfyqnq |
| 20 | human CCL21 nucleic acid sequence | atggctcagtcactggctctgagcctcctcatcctggttctggcctttggcatc cccaggacccaaggcagtgatggagggggctcaggactgttgcctcaagta cagccaaaggaagattccgccaaggttgtccgcagctaccggaagcagg aaccaagcttaggctgctccatcccagctatcctgttcttgccccgcaagcg ctctccaggcagagctatgtgcagacccaaaggagctctgggtgcagcagct gatgcagcatctggacaagacaccatccccacagaaaccagcccagggct |

| SEQ ID NO. | Name | Sequence |
|---|---|---|
| | | gcaggaaggacaggggggcctccaagactggcaagaaaggaaagggct<br>ccaaaggctgcaagaggactgagcggtcacagacccctaaagggccata<br>g |
| 21 | human CCL21 amino acid sequence | maqslalsllilvlafgiprtqgsdggaqdcclkysqrkipakvvrsyrkqe<br>pslgcsipailflprkrsqaelcadpkelwvqqlmqhldktpspqkpaqg<br>crkdrgasktgkkgkgskgckrtersqtpkgp |
| 22 | Claudin18.2 amino acid sequence | mavtacqglgfvvsligiagiiaatcmdqwstqdlynnpvtavfnyqgl<br>wrscvressgftecrgyftllglpamlqavralmivgivlgaigllvsifalk<br>cirigsmedsakanmtltsgimfivsglcaiagvsvfanmlvtnfwmsta<br>nmytgmggmvqtvqtrytfgaalfvgwvaggltliggvmmciacrgla<br>peetnykavsyhasghsvaykpggfkastgfgsntknkkiydggarted<br>evqsypskhdyv |
| 23 | Claudin18.1 amino acid sequence | mstttcqvvafllsilglagciaatgmdwstqdlydnpvtsvfqyeglw<br>rscvrqssgftecrpyftilglpamlqavralmivgivlgaigllvsifalkci<br>rigsmedsakanmtltsgimfivsglcaiagvsvfanmlvtnfwmstan<br>mytgmggmvqtvqtrytfgaalfvgwvaggltliggvmmciacrglap<br>eetnykavsyhasghsvaykpggfkastgfgsntknkkiydggartede<br>vqsypskhdyv |
| 24 | mouse 4-1BB intracellular domain nucleic acid sequence | aaatggatcaggaaaaaattccccacatattcaagcaaccatttaagaaga<br>ccactggagcagctcaagaggaagatgcttgtagctgccgatgtccacagg<br>aagaagaaggaggaggaggaggctatgagctg |
| 25 | mouse4-1BB intracellular domain amino acid sequence | kwirkkfphifkqpfkkttgaaqeedacscrcpqeeeggggyel |
| 26 | Hu8E5-28ZCAR amino acid sequence (human) | QVQLQESGPGLIKPSQTLSLTCTVSGGSISSGYNW<br>HWIRQPPGKGLEWIGYIHYTGSTNYNPALRSRVTI<br>SVDTSKNQFSLKLSSVTAADTAIYYCARIYNGNSF<br>PYWGQGTTVTVSSGGGGSGGGGSGGGGSDIVMT<br>QSPDSLAVSLGERATINCKSSQSLENSGNQKNYLT<br>WYQQKPGQPPKLLIYWASTRESGVPDRFSGSGSG<br>TDFTLTISSLQAEDVAVYYCQNAYSFPYTFGGGTK<br>LEIKRTTTPAPRPPTPAPTIASQPLSLRPEACRPAAG<br>GAVHTRGLDFACDFWVLVVVGGVLACYSLLVTV<br>AFIIFWVRSKRSRLLHSDYMNMTPRRPGPTRKHY<br>QPYAPPRDFAAYRSRVKFSRSADAPAYQQGQNQL<br>YNELNLGRREEYDVLDKRRGRDPEMGGKPQRRK<br>NPQEGLYNELQKDKMAEAYSEIGMKGERRRGKG<br>HDGLYQGLSTATKDTYDALHMQALPPR |
| 27 | Hu8E5-BBZCAR amino acid sequence (human) | QVQLQESGPGLIKPSQTLSLTCTVSGGSISSGYNW<br>HWIRQPPGKGLEWIGYIHYTGSTNYNPALRSRVTI<br>SVDTSKNQFSLKLSSVTAADTAIYYCARIYNGNSF<br>PYWGQGTTVTVSSGGGGSGGGGSGGGGSDIVMT<br>QSPDSLAVSLGERATINCKSSQSLFNSGNQKNYLT<br>WYQQKPGQPPKLLIYWASTRESGVPDRFSGSGSG<br>TDFTLTISSLQAEDVAVYYCQNAYSFPYTFGGGTK<br>LEIKRTTTPAPRPPTPAPTIASQPLSLRPEACRPAAG<br>GAVHTRGLDFACDIYIWAPLAGTCGVLLLSLVITL<br>YCKRGRKKLLYIFKQPFMRPVQTTQEEDGCSCRF<br>PEEEEGGCELRVKFSRSADAPAYQQGQNQLYNEL<br>NLGRREEYDVLDKRRGRDPEMGGKPQRRKNPQE<br>GLYNELQKDKMAEAYSEIGMKGERRRGKGHDGL<br>YQGLSTATKDTYDALHMQALPPR |
| 28 | human CD8α signal peptide amino acid sequence | malpvtalllplalllhaarp |
| 29 | human CD8 hinge region amino acid sequence | tttpaprpptpaptiasqplslrpeacrpaaggavhtrgldfacd |

| SEQ ID NO. | Name | Sequence |
|---|---|---|
| 30 | human CD28 transmembrane region amino acid sequence | fwvlvvvggvlacysllvtvafiifwv |
| 31 | humanCD28 intracellular domain amino acid sequence | rskrsrllhsdymnmtprrpgptrkhyqpyapprdfaayrs |
| 32 | human4-1BB intracellular domain amino acid sequence | krgrkkllyifkqpfmrpvqttqeedgescrfpeeeeggcel |
| 33 | amino acid sequence of intracellular segment CD3ξ of human CD3 | rvkfsrsadapayqqgqnqlynelnlgrreeydvldkrrgrdpemggkp qrrknpqeglynelqkdkmaeayseigmkgerrrgkhdglyqglstat kdtydalhmqalppr |
| 34 | mouse CCL19 nucleic acid sequence | atggcccccgtgtgaccccactcctggccttcagcctgctggttctctgga ccttcccagccccaactctgggggggtgctaatgatgcggaagactgctgcc tgtctgtgacccagcgccccatccctgggaacatcgtgaaagccttccgcta ccttcttaatgaagatggctgcagggtgcctgctgttgtgttcaccacactaa ggggctatcagctctgtgcacctccagaccagccctgggtggatcgcatca tccgaagactgaagaagtcttctgccaagaacaaaggcaacagcaccaga aggagccctgtgtct |
| 35 | 28BBZ amino acid sequence | QVQLQESGPGLIKPSQTLSLTCTVSGGSISSGYNW HWIRQPPGKGLEWIGYIHYTGSTNYNPALRSRVTI SVDTSKNQFSLKLSSVTAADTAIYYCARIYNGNSF PYWGQGTTVTVSSGGGGSGGGGSGGGGSDIVMT QSPDSLAVSLGERATINCKSSQSLFNSGNQKNYLT WYQQKPGQPPKLLIYWASTRESGVPDRFSGSGSG TDFTLTISSLQAEDVAVYYCQNAYSFPYTFGGGT KLEIKRTTTPAPRPPTPAPTIASQPLSLRPEACRPA AGGAVHTRGLDFACDFWVLVVVGGVLACYSLL VTVAFIIFWVRSKRSRLLHSDYMNMTPRRPGPTR KHYQPYAPPRDFAAYRSKRGRKKLLYIFKQPFMR PVQTTQEEDGCSCRFPEEEEGGCELRVKFSRSAD APAYQQGQNQLYNELNLGRREEYDVLDKRRGR DPEMGGKPQRRKNPQEGLYNELQKDKMAEAYS EIGMKGERRRGKHDGLYQGLSTATKDTYDALH MQALPPR |

All documents mentioned herein are cited as references in the present application, as if each document is individually cited as a reference. In addition, it should be understood that after reading the above teachings of the present invention, a skilled person can make various changes or modifications to the present invention, and these equivalent forms also fall within the scope defined by the appended claims of the present application.

The invention claimed is:

1. A genetically engineered T cell, wherein the cell expresses an exogenous receptor specifically binding to a target antigen, an-exogenous CCL21, a protein promoting the proliferation of the cell, which is an exogenous IL-7, and wherein the cell does not express an exogenous CCL19.

2. The cell of claim 1, wherein the exogenous IL-7 is a natural IL-7, the natural IL-7 has at least 90% sequence identity with the amino acid sequence of SEQ ID NO: 18; or has at least 90% sequence identity with the amino acid sequence encoded by the nucleotide sequence of SEQ ID NO: 13.

3. The cell of claim 2, wherein the exogenous IL-7 is constitutively expressed; or
the exogenous IL-7 is inducibly expressed.

4. The cell of claim 1, wherein the target antigen is a tumor antigen and/or a pathogen antigen; or
the target antigen is a solid tumor antigen.

5. The cell of claim 1, wherein the exogenous receptor is a chimeric receptor, which includes an antigen-binding domain specifically binding to a target antigen, a transmembrane domain and an intracellular domain.

6. The cell of claim 5, wherein the amino acid sequence of the antigen binding domain of the exogenous receptor has at least 90% sequence identity with the amino acid sequence of SEQ ID NO: 2.

7. The cell of claim 1, wherein the exogenous receptor, and/or exogenous IL-7, and/or exogenous CCL21 are expressed by using a viral vector.

8. An expression construct, comprising sequentially connected: an expression cassette 1 comprising a nucleic acid sequence encoding an exogenous receptor specifically binding to a target antigen, an expression cassette 2 comprising a nucleic acid sequence encoding an exogenous IL-7, and an expression cassette 3 comprising a nucleic acid sequence encoding an exogenous CCL21.

9. An expression vector, comprising the expression construct of claim 8.

10. A virus, comprising the expression vector of claim 9.

11. A method for improving the viability of T cells expressing a chimeric receptor in an individual, comprising expressing an exogenous CCL21 and an exogenous IL-7 in the T cells.

12. The method of claim 11, wherein the exogenous CCL21 is constitutively expressed; or
the exogenous CCL21 is inducibly expressed; or
exogenous IL-7 is constitutively expressed; or
the exogenous IL-7 is inducibly expressed.

13. A method for inhibiting tumors or pathogens, comprising administering a therapeutically sufficient amount of the cell of claim 1 to a subject in need thereof.

14. A pharmaceutical composition, comprising the cell of claim 1 and a pharmaceutically acceptable carrier or excipient.

15. A kit, comprising kit A and kit B, wherein the kit A comprises genetically engineered T cells, and the T cells express an exogenous receptor specifically binding to a target antigen; and the kit B comprises CCL21, and a protein that promotes the proliferation of the cells, which is IL-7.

16. The kit of claim 15, wherein the CCL21 is natural CCL21, the natural CCL21 has at least 90% sequence identity with the amino acid sequence of SEQ ID NO: 21 or has at least 90% sequence identity with the amino acid sequence encoded by the nucleotide sequence of SEQ ID NO: 14 or 15, and wherein the IL-7 is natural IL-7, the natural IL-7 has at least 90% sequence identity with the amino acid sequence of SEQ ID NO: 18 or has at least 90% sequence identity with the amino acid sequence encoded by the nucleotide sequence of SEQ ID NO: 13.

17. The kit of claim 15, wherein the kit A comprises T cells modified by chimeric receptors;
and wherein the chimeric receptor is a chimeric antigen receptor.

18. The cell of claim 1, wherein the exogenous CCL21 is natural CCL21, the natural CCL21 has at least 90% sequence identity with the amino acid sequence of SEQ ID NO: 21 or has at least 90% sequence identity with the amino acid sequence encoded by the nucleotide sequence of SEQ ID NO: 14 or 15.

19. The cell of claim 3, wherein the inducible expression is initiated by an immune cell inducible promoter.

20. The cell of claim 19, wherein the immune cell inducible promoter is a Nuclear Factor of Activated T cells (NFAT) promoter.

21. The cell of claim 4, wherein the target antigen is a tumor antigen; or the solid tumor antigen is Glypican-3, Epidermal Growth Factor Receptor or Claudin 18.2.

22. The cell of claim 21, wherein the solid tumor antigen is Claudin 18.2.

23. The cell of claim 1, wherein the exogenous receptor is selected from the group consisting of chimeric antigen receptor (CAR), modified T cell receptor (TCR), T Cell fusion protein (TFP), T cell antigen coupler (TAC) or a combination thereof.

24. The cell of claim 23, wherein the exogenous receptor is a chimeric antigen receptor.

25. The cell of claim 24, wherein the chimeric antigen receptor includes:
   (i) an antibody or a fragment thereof specifically binding to a target antigen, a transmembrane domain of CD28 or CD8, a costimulatory signal domain of CD28, and CD3ζ; or
   (ii) an antibody or a fragment thereof specifically binding to a target antigen, the transmembrane domain of CD28 or CD8, the costimulatory signal domain of 4-1BB, and CD3ζ; or
   (iii) an antibody or a fragment thereof specifically binding to the target antigen, the transmembrane domain of CD28 or CD8, the costimulatory signal domain of CD28, the costimulatory signal domain of 4-1BB and CD3ζ.

26. The cell of claim 6, wherein the amino acid sequence of the exogenous receptor has at least 90% sequence identity with the amino acid sequence of SEQ ID NO: 26, 27 or 35.

27. The cell of claim 7, wherein the viral vector is selected from a lentiviral vector, retroviral vector or adenovirus vector.

28. The expression construct of claim 8, wherein the expression cassettes are connected by tandem fragments, selected from F2A, PA2, T2A, and/or E2A.

29. The expression construct of claim 28, wherein said expression cassette 2 comprises the nucleic acid sequence of SEQ ID NO: 17 or said expression cassette 3 comprises the nucleic acid sequence of SEQ ID NO:20.

30. The method of claim 11, wherein the chimeric receptor is a chimeric antigen receptor.

31. The method of claim 11, wherein the exogenous IL-7 is natural IL-7, the natural IL-7 has at least 90% sequence identity with the amino acid sequence of SEQ ID NO: 18; or has at least 90% sequence identity with the amino acid sequence encoded by the nucleotide sequence of SEQ ID NO: 13; or the exogenous CCL21 is natural CCL21, the natural CCL21 has at least 90% sequence identity with the amino acid sequence of SEQ ID NO: 21; or has at least 90% sequence identity with the amino acid sequence encoded by the nucleotide sequence of SEQ ID NO: 14 or 15.

32. The method of claim 12, wherein the inducible expression is initiated by an immune cell inducible promoter.

33. The method of claim 32, wherein the immune cell inducible promoter is NFAT promoter.

34. The method of claim 13, wherein the method is used for inhibiting tumors.

35. The method of claim 13, wherein a chemotherapeutic drug is administered in combination.

36. The cell of claim 18, wherein the exogenous CCL21 is constitutively expressed, or the exogenous CCL21 is inducibly expressed.

37. The cell of claim 36, wherein the inducible expression is initiated by an immune cell inducible promoter.

38. The cell of claim 37, wherein the immune cell inducible promoter is an NFAT promoter.

* * * * *

SEQUENCE LISTING

<160> NUMBER OF SEQ ID NOS: 35

<210> SEQ ID NO 1
<211> LENGTH: 741
<212> TYPE: DNA
<213> ORGANISM: Artificial Sequence
<220> FEATURE:
<223> OTHER INFORMATION: Hu8E5-2I scFV Nucleic acid sequence

<400> SEQUENCE: 1

```
caggtgcagc tgcaggagag cggccccggc ctgatcaagc ccagccagac cctgagcctg      60
acctgcaccg tgagcggcgg cagcatcagc agcggctaca actggcactg gatccggcag     120
ccccccggca agggcctgga gtggatcggc tacatccact acaccggcag caccaactac     180
aaccccgccc tgcggagccg ggtgaccatc agcgtggaca ccagcaagaa ccagttcagc     240
```

```
ctgaagctga gcagcgtgac cgccgccgac accgccatct actactgcgc cggatctac    300 aacggcaaca gcttccccta ctggggccag ggcaccaccg tgaccgtgag cagcggtgga    360
ggcggttcag gcggaggtgg ttctggcggt ggcggatcgg acatcgtgat gacccagagc    420
cccgacagcc tggccgtgag cctgggcgag cgggccacca tcaactgcaa gagcagccag    480
agcctgttca acagcggcaa ccagaagaac tacctgacct ggtaccagca gaagcccggc    540 cagccccccca agctgctgat ctactgggcc agcacccggg agagcggcgt gcccgaccgg    600
ttcagcggca gcggcagcgg caccgacttc accctgacca tcagcagcct gcaggccgag    660
gacgtggccg tgtactactg ccagaacgcc tacagcttcc cctacacctt cggcggcggc    720
accaagctgg agatcaagcg g                                              741
```

<210> SEQ ID NO 2
<211> LENGTH: 247
<212> TYPE: PRT
<213> ORGANISM: Artificial Sequence
<220> FEATURE:
<223> OTHER INFORMATION: Hu8E5-2I scFV amino acid sequence

<400> SEQUENCE: 2

```
Gln Val Gln Leu Gln Glu Ser Gly Pro Gly Leu Ile Lys Pro Ser Gln
1               5                   10                  15

Thr Leu Ser Leu Thr Cys Thr Val Ser Gly Gly Ser Ile Ser Ser Gly
            20                  25                  30

Tyr Asn Trp His Trp Ile Arg Gln Pro Pro Gly Lys Gly Leu Glu Trp
        35                  40                  45

Ile Gly Tyr Ile His Tyr Thr Gly Ser Thr Asn Tyr Asn Pro Ala Leu
    50                  55                  60

Arg Ser Arg Val Thr Ile Ser Val Asp Thr Ser Lys Asn Gln Phe Ser
65                  70                  75                  80

Leu Lys Leu Ser Ser Val Thr Ala Ala Asp Thr Ala Ile Tyr Tyr Cys
                85                  90                  95

Ala Arg Ile Tyr Asn Gly Asn Ser Phe Pro Tyr Trp Gly Gln Gly Thr
            100                 105                 110

Thr Val Thr Val Ser Ser Gly Gly Gly Gly Ser Gly Gly Gly Gly Ser
        115                 120                 125

Gly Gly Gly Gly Ser Asp Ile Val Met Thr Gln Ser Pro Asp Ser Leu
    130                 135                 140

Ala Val Ser Leu Gly Glu Arg Ala Thr Ile Asn Cys Lys Ser Ser Gln
145                 150                 155                 160

Ser Leu Phe Asn Ser Gly Asn Gln Lys Asn Tyr Leu Thr Trp Tyr Gln
                165                 170                 175

Gln Lys Pro Gly Gln Pro Pro Lys Leu Leu Ile Tyr Trp Ala Ser Thr
            180                 185                 190

Arg Glu Ser Gly Val Pro Asp Arg Phe Ser Gly Ser Gly Ser Gly Thr
        195                 200                 205

Asp Phe Thr Leu Thr Ile Ser Ser Leu Gln Ala Glu Asp Val Ala Val
    210                 215                 220

Tyr Tyr Cys Gln Asn Ala Tyr Ser Phe Pro Tyr Thr Phe Gly Gly Gly
225                 230                 235                 240

Thr Lys Leu Glu Ile Lys Arg
            245
```

<210> SEQ ID NO 3

<211> LENGTH: 81
<212> TYPE: DNA
<213> ORGANISM: Artificial Sequence
<220> FEATURE:
<223> OTHER INFORMATION: mouse CD8 alpha signal peptide nucleic acid
      sequence

<400> SEQUENCE: 3

```
atggcctcac cgttgacccg ctttctgtcg ctgaacctgc tgctgctggg tgagtcgatt    60
atcctgggga gtggagaagc t                                              81
```

<210> SEQ ID NO 4
<211> LENGTH: 27
<212> TYPE: PRT
<213> ORGANISM: Artificial Sequence
<220> FEATURE:
<223> OTHER INFORMATION: mouse CD8 alpha signal peptide nucleic acid
      sequence

<400> SEQUENCE: 4

```
Met Ala Ser Pro Leu Thr Arg Phe Leu Ser Leu Asn Leu Leu Leu Leu
1               5                   10                  15

Gly Glu Ser Ile Ile Leu Gly Ser Gly Glu Ala
            20                  25
```

<210> SEQ ID NO 5
<211> LENGTH: 216
<212> TYPE: DNA
<213> ORGANISM: Artificial Sequence
<220> FEATURE:
<223> OTHER INFORMATION: mouse CD8 hinge region+transmembrane domain
      nucleic acid sequence

<400> SEQUENCE: 5

```
actactacca agccagtgct gcgaactccc tcacctgtgc accctaccgg gacatctcag    60
ccccagagac cagaagattg tcggccccgt ggctcagtga aggggaccgg attggacttc   120
gcctgtgata tttacatctg gcacccttg gccggaatct gcgtggccct tctgctgtcc   180
ttgatcatca ctctcatctg ctaccacagg agccga                            216
```

<210> SEQ ID NO 6
<211> LENGTH: 72
<212> TYPE: PRT
<213> ORGANISM: Artificial Sequence
<220> FEATURE:
<223> OTHER INFORMATION: mouse CD8 hinge region+transmembrane domain
      nucleic acid sequence

<400> SEQUENCE: 6

```
Thr Thr Thr Lys Pro Val Leu Arg Thr Pro Ser Pro Val His Pro Thr
1               5                   10                  15

Gly Thr Ser Gln Pro Gln Arg Pro Glu Asp Cys Arg Pro Arg Gly Ser
            20                  25                  30

Val Lys Gly Thr Gly Leu Asp Phe Ala Cys Asp Ile Tyr Ile Trp Ala
        35                  40                  45

Pro Leu Ala Gly Ile Cys Val Ala Leu Leu Leu Ser Leu Ile Ile Thr
    50                  55                  60

Leu Ile Cys Tyr His Arg Ser Arg
65                  70
```

<210> SEQ ID NO 7
<211> LENGTH: 123
<212> TYPE: DNA

```
<213> ORGANISM: Artificial Sequence
<220> FEATURE:
<223> OTHER INFORMATION: mouse CD28 intracellular domain nucleic acid
      sequence

<400> SEQUENCE: 7
aatagtagaa ggaacagact ccttcaaagt gactacatga acatgactcc ccggaggcct    60
gggctcactc gaaagcctta ccagccctac gcccctgcca gagactttgc agcgtaccgc   120
ccc                                                                  123

<210> SEQ ID NO 8
<211> LENGTH: 41
<212> TYPE: PRT
<213> ORGANISM: Artificial Sequence
<220> FEATURE:
<223> OTHER INFORMATION: mouse CD28 intracellular domain nucleic acid
      sequence

<400> SEQUENCE: 8

Asn Ser Arg Arg Asn Arg Leu Leu Gln Ser Asp Tyr Met Asn Met Thr
1               5                   10                  15

Pro Arg Arg Pro Gly Leu Thr Arg Lys Pro Tyr Gln Pro Tyr Ala Pro
            20                  25                  30

Ala Arg Asp Phe Ala Ala Tyr Arg Pro
        35                  40

<210> SEQ ID NO 9
<211> LENGTH: 321
<212> TYPE: DNA
<213> ORGANISM: Artificial Sequence
<220> FEATURE:
<223> OTHER INFORMATION: intracellular segment CD3xi nucleic acid
      sequence of mouse CD3

<400> SEQUENCE: 9
agcaggagtg cagagactgc tgccaacctg caggacccca accagctcta caatgagctc    60
aatctagggc gaagagagga atatgacgtc ttggagaaga gcgggctcg ggatccagag   120 atgggaggca acagcagag gaggaggaac ccccaggaag gcgtatacaa tgcactgcag   180
aaagacaaga tggcagaagc ctacagtgag atcggcacaa aaggcgagag cggagaggc   240 aaggggcacg atggcctta ccagggtctc agcactgcca ccaaggacac ctatgatgcc   300
ctgcatatgc agaccctggc c                                             321

<210> SEQ ID NO 10
<211> LENGTH: 107
<212> TYPE: PRT
<213> ORGANISM: Artificial Sequence
<220> FEATURE:
<223> OTHER INFORMATION: intracellular segment CD3xi amino acid sequence
      of mouse CD3

<400> SEQUENCE: 10

Ser Arg Ser Ala Glu Thr Ala Ala Asn Leu Gln Asp Pro Asn Gln Leu
1               5                   10                  15

Tyr Asn Glu Leu Asn Leu Gly Arg Arg Glu Glu Tyr Asp Val Leu Glu
            20                  25                  30

Lys Lys Arg Ala Arg Asp Pro Glu Met Gly Gly Lys Gln Gln Arg Arg
        35                  40                  45

Arg Asn Pro Gln Glu Gly Val Tyr Asn Ala Leu Gln Lys Asp Lys Met
    50                  55                  60
```

Ala Glu Ala Tyr Ser Glu Ile Gly Thr Lys Gly Glu Arg Arg Arg Gly
 65                  70                  75                  80

Lys Gly His Asp Gly Leu Tyr Gln Gly Leu Ser Thr Ala Thr Lys Asp
                 85                  90                  95

Thr Tyr Asp Ala Leu His Met Gln Thr Leu Ala
            100                 105

<210> SEQ ID NO 11
<211> LENGTH: 66
<212> TYPE: DNA
<213> ORGANISM: Artificial Sequence
<220> FEATURE:
<223> OTHER INFORMATION: F2A nucleic acid sequence

<400> SEQUENCE: 11
gtgaaacaga ctttgaattt tgaccttctg aagttggcag agacgttga gtccaaccct    60 gggccc                                                              66

<210> SEQ ID NO 12
<211> LENGTH: 22
<212> TYPE: PRT
<213> ORGANISM: Artificial Sequence
<220> FEATURE:
<223> OTHER INFORMATION: F2A amino acid sequence

<400> SEQUENCE: 12

Val Lys Gln Thr Leu Asn Phe Asp Leu Leu Lys Leu Ala Gly Asp Val
 1               5                  10                  15

Glu Ser Asn Pro Gly Pro
            20

<210> SEQ ID NO 13
<211> LENGTH: 462
<212> TYPE: DNA
<213> ORGANISM: Artificial Sequence
<220> FEATURE:
<223> OTHER INFORMATION: mouse IL7 nucleic acid sequence

<400> SEQUENCE: 13
atgttccatg tttcttttag atatatcttt ggaattcctc cactgatcct tgttctgctg    60
cctgtcacat catctgagtg ccacattaaa gacaaagaag gtaaagcata tgagagtgta   120
ctgatgatca gcatcgatga attggacaaa atgacaggaa ctgatagtaa ttgcccgaat   180
aatgaaccaa acttttttag aaaacatgta tgtgatgata caaaggaagc tgcttttcta   240
aatcgtgctg ctcgcaagtt gaagcaattt cttaaaatga atatcagtga agaattcaat   300
gtccacttac taacagtatc acaaggcaca caaacactgg tgaactgcac aagtaaggaa   360
gaaaaaaacg taaggaaca gaaaaagaat gatgcatgtt tcctaaagag actactgaga   420
gaaataaaaa cttgttggaa taaaattttg aagggcagta ta                     462

<210> SEQ ID NO 14
<211> LENGTH: 399
<212> TYPE: DNA
<213> ORGANISM: Artificial Sequence
<220> FEATURE:
<223> OTHER INFORMATION: mouse CCL21a nucleic acid sequence

<400> SEQUENCE: 14
atggctcaga tgatgactct gagcctcctt agcctggtcc tggctctctg catcccctgg    60
acccaaggca gtgatggagg gggtcaggac tgctgcctta agtacagcca agagaaaatt   120

```
ccctacagta ttgtccgagg ctataggaag caagaaccaa gtttaggctg tcccatcccg    180
gcaatcctgt tctcaccccg gaagcactct aagcctgagc tatgtgcaaa ccctgaggaa    240
ggctgggtgc agaacctgat gcgccgcctg accagcctc cagccccagg gaaacaaagc    300
cccggctgca ggaagaaccg gggaacctct aagtctggaa agaaaggaaa gggctccaag    360
ggctgcaaga gaactgaaca gacacagccc tcaagagga                           399
```

<210> SEQ ID NO 15
<211> LENGTH: 399
<212> TYPE: DNA
<213> ORGANISM: Artificial Sequence
<220> FEATURE:
<223> OTHER INFORMATION: mouse CCL21b nucleic acid sequence

<400> SEQUENCE: 15

```
atggctcaga tgatgactct gagcctcctt agcctggtcc tggctctctg catcccctgg    60
acccaaggca gtgatggagg gggacaggac tgctgcctta agtacagcca agagaaaatt    120
ccctacagta ttgtccgagg ctataggaag caagaaccaa gtttaggctg tcccatcccg    180
gcaatcctgt tcttaccccg gaagcactct aagcctgagc tatgtgcaaa ccctgaggaa    240
ggctgggtgc agaacctgat gcgccgcctg accagcctc cagccccagg gaaacaaagc    300
cccggctgca ggaagaaccg gggaacctct aagtctggaa agaaaggaaa gggctccaag    360
ggctgcaaga gaactgaaca gacacagccc tcaagagga                           399
```

<210> SEQ ID NO 16
<211> LENGTH: 57
<212> TYPE: DNA
<213> ORGANISM: Artificial Sequence
<220> FEATURE:
<223> OTHER INFORMATION: P2A nucleic acid sequence

<400> SEQUENCE: 16

```
gctactaact tcagcctgct gaagcaggct ggagacgtgg aggagaaccc tggacct      57
```

<210> SEQ ID NO 17
<211> LENGTH: 534
<212> TYPE: DNA
<213> ORGANISM: Artificial Sequence
<220> FEATURE:
<223> OTHER INFORMATION: human IL7 nucleic acid sequence

<400> SEQUENCE: 17

```
atgttccatg tttcttttag gtatatcttt ggacttcctc ccctgatcct tgttctgttg    60
ccagtagcat catctgattg tgatattgaa ggtaaagatg gcaaacaata tgagagtgtt    120
ctaatggtca gcatcgatca attattggac agcatgaaag aaattggtag caattgcctg    180
aataatgaat taacttttt taaaagacat atctgtgatg ctaataagga aggtatgttt    240
ttattccgtg ctgctcgcaa gttgaggcaa tttcttaaaa tgaatagcac tggtgatttt    300
gatctccact tattaaaagt ttcagaaggc acaacaatac tgttgaactg cactggccag    360
gttaaaggaa gaaaaccagc tgccctgggt gaagcccaac caacaaagag tttggaagaa    420
aataaatctt taaggaaaca gaaaaactg aatgacttgt gtttcctaaa agactatta    480 caagagataa aaacttgttg gaataaaatt ttgatgggca ctaaagaaca ctga         534
```

<210> SEQ ID NO 18
<211> LENGTH: 177
<212> TYPE: PRT
<213> ORGANISM: Artificial Sequence

```
<220> FEATURE:
<223> OTHER INFORMATION: human IL7 amino acid sequence

<400> SEQUENCE: 18

Met Phe His Val Ser Phe Arg Tyr Ile Phe Gly Leu Pro Pro Leu Ile
1               5                   10                  15

Leu Val Leu Leu Pro Val Ala Ser Ser Asp Cys Asp Ile Glu Gly Lys
            20                  25                  30

Asp Gly Lys Gln Tyr Glu Ser Val Leu Met Val Ser Ile Asp Gln Leu
        35                  40                  45

Leu Asp Ser Met Lys Glu Ile Gly Ser Asn Cys Leu Asn Asn Glu Phe
    50                  55                  60

Asn Phe Phe Lys Arg His Ile Cys Asp Ala Asn Lys Glu Gly Met Phe
65                  70                  75                  80

Leu Phe Arg Ala Ala Arg Lys Leu Arg Gln Phe Leu Lys Met Asn Ser
                85                  90                  95

Thr Gly Asp Phe Asp Leu His Leu Leu Lys Val Ser Glu Gly Thr Thr
            100                 105                 110

Ile Leu Leu Asn Cys Thr Gly Gln Val Lys Gly Arg Lys Pro Ala Ala
        115                 120                 125

Leu Gly Glu Ala Gln Pro Thr Lys Ser Leu Glu Glu Asn Lys Ser Leu
    130                 135                 140

Lys Glu Gln Lys Lys Leu Asn Asp Leu Cys Phe Leu Lys Arg Leu Leu
145                 150                 155                 160

Gln Glu Ile Lys Thr Cys Trp Asn Lys Ile Leu Met Gly Thr Lys Glu
                165                 170                 175

His

<210> SEQ ID NO 19
<211> LENGTH: 459
<212> TYPE: PRT
<213> ORGANISM: Artificial Sequence
<220> FEATURE:
<223> OTHER INFORMATION: human IL7R amino acid sequence

<400> SEQUENCE: 19

Met Thr Ile Leu Gly Thr Thr Phe Gly Met Val Phe Ser Leu Leu Gln
1               5                   10                  15

Val Val Ser Gly Glu Ser Gly Tyr Ala Gln Asn Gly Asp Leu Glu Asp
            20                  25                  30

Ala Glu Leu Asp Asp Tyr Ser Phe Ser Cys Tyr Ser Gln Leu Glu Val
        35                  40                  45

Asn Gly Ser Gln His Ser Leu Thr Cys Ala Phe Glu Asp Pro Asp Val
    50                  55                  60

Asn Ile Thr Asn Leu Glu Phe Glu Ile Cys Gly Ala Leu Val Glu Val
65                  70                  75                  80

Lys Cys Leu Asn Phe Arg Lys Leu Gln Glu Ile Tyr Phe Ile Glu Thr
                85                  90                  95

Lys Lys Phe Leu Leu Ile Gly Lys Ser Asn Ile Cys Val Lys Val Gly
            100                 105                 110

Glu Lys Ser Leu Thr Cys Lys Lys Ile Asp Leu Thr Thr Ile Val Lys
        115                 120                 125

Pro Glu Ala Pro Phe Asp Leu Ser Val Val Tyr Arg Glu Gly Ala Asn
    130                 135                 140

Asp Phe Val Val Thr Phe Asn Thr Ser His Leu Gln Lys Lys Tyr Val
145                 150                 155                 160
```

Lys Val Leu Met His Asp Val Ala Tyr Arg Gln Glu Lys Asp Glu Asn
            165                 170                 175

Lys Trp Thr His Val Asn Leu Ser Ser Thr Lys Leu Thr Leu Leu Gln
            180                 185                 190

Arg Lys Leu Gln Pro Ala Ala Met Tyr Glu Ile Lys Val Arg Ser Ile
            195                 200                 205

Pro Asp His Tyr Phe Lys Gly Phe Trp Ser Glu Trp Ser Pro Ser Tyr
    210                 215                 220

Tyr Phe Arg Thr Pro Glu Ile Asn Asn Ser Ser Gly Glu Met Asp Pro
225                 230                 235                 240

Ile Leu Leu Thr Ile Ser Ile Leu Ser Phe Phe Ser Val Ala Leu Leu
            245                 250                 255

Val Ile Leu Ala Cys Val Leu Trp Lys Lys Arg Ile Lys Pro Ile Val
            260                 265                 270

Trp Pro Ser Leu Pro Asp His Lys Lys Thr Leu Glu His Leu Cys Lys
            275                 280                 285

Lys Pro Arg Lys Asn Leu Asn Val Ser Phe Asn Pro Glu Ser Phe Leu
            290                 295                 300

Asp Cys Gln Ile His Arg Val Asp Asp Ile Gln Ala Arg Asp Glu Val
305                 310                 315                 320

Glu Gly Phe Leu Gln Asp Thr Phe Pro Gln Gln Leu Glu Glu Ser Glu
            325                 330                 335

Lys Gln Arg Leu Gly Gly Asp Val Gln Ser Pro Asn Cys Pro Ser Glu
            340                 345                 350

Asp Val Val Ile Thr Pro Glu Ser Phe Gly Arg Asp Ser Ser Leu Thr
            355                 360                 365

Cys Leu Ala Gly Asn Val Ser Ala Cys Asp Ala Pro Ile Leu Ser Ser
            370                 375                 380

Ser Arg Ser Leu Asp Cys Arg Glu Ser Gly Lys Asn Gly Pro His Val
385                 390                 395                 400

Tyr Gln Asp Leu Leu Leu Ser Leu Gly Thr Thr Asn Ser Thr Leu Pro
            405                 410                 415

Pro Pro Phe Ser Leu Gln Ser Gly Ile Leu Thr Leu Asn Pro Val Ala
            420                 425                 430

Gln Gly Gln Pro Ile Leu Thr Ser Leu Gly Ser Asn Gln Glu Glu Ala
            435                 440                 445

Tyr Val Thr Met Ser Ser Phe Tyr Gln Asn Gln
450                 455

<210> SEQ ID NO 20
<211> LENGTH: 405
<212> TYPE: DNA
<213> ORGANISM: Artificial Sequence
<220> FEATURE:
<223> OTHER INFORMATION: human CCL21 nucleic acid sequence

<400> SEQUENCE: 20
atggctcagt cactggctct gagcctcctt atcctggttc tggcctttgg catccccagg     60
acccaaggca gtgatggagg ggctcaggac tgttgcctca gtacagcca aaggaagatt     120 cccgccaagg ttgtccgcag ctaccggaag caggaaccaa gcttaggctg ctccatccca    180
gctatcctgt tcttgccccg caagcgctct caggcagagc tatgtgcaga cccaaaggag    240
ctctgggtgc agcagctgat gcagcatctg gacaagacac atccccaca gaaaccagcc    300 cagggctgca ggaaggacag gggggcctcc aagactggca agaaaggaaa gggctccaaa    360
ggctgcaaga ggactgagcg gtcacagacc cctaaagggc catag        405

<210> SEQ ID NO 21
<211> LENGTH: 134
<212> TYPE: PRT
<213> ORGANISM: Artificial Sequence
<220> FEATURE:
<223> OTHER INFORMATION: human CCL21 amino acid sequence

<400> SEQUENCE: 21

```
Met Ala Gln Ser Leu Ala Leu Ser Leu Leu Ile Leu Val Leu Ala Phe
1               5                   10                  15

Gly Ile Pro Arg Thr Gln Gly Ser Asp Gly Gly Ala Gln Asp Cys Cys
            20                  25                  30

Leu Lys Tyr Ser Gln Arg Lys Ile Pro Ala Lys Val Val Arg Ser Tyr
        35                  40                  45

Arg Lys Gln Glu Pro Ser Leu Gly Cys Ser Ile Pro Ala Ile Leu Phe
    50                  55                  60

Leu Pro Arg Lys Arg Ser Gln Ala Glu Leu Cys Ala Asp Pro Lys Glu
65                  70                  75                  80

Leu Trp Val Gln Gln Leu Met Gln His Leu Asp Lys Thr Pro Ser Pro
                85                  90                  95

Gln Lys Pro Ala Gln Gly Cys Arg Lys Asp Arg Gly Ala Ser Lys Thr
            100                 105                 110

Gly Lys Lys Gly Lys Gly Ser Lys Gly Cys Lys Arg Thr Glu Arg Ser
        115                 120                 125

Gln Thr Pro Lys Gly Pro
    130
```

<210> SEQ ID NO 22
<211> LENGTH: 261
<212> TYPE: PRT
<213> ORGANISM: Artificial Sequence
<220> FEATURE:
<223> OTHER INFORMATION: Claudin18.2 amino acid sequence

<400> SEQUENCE: 22

```
Met Ala Val Thr Ala Cys Gln Gly Leu Gly Phe Val Val Ser Leu Ile
1               5                   10                  15

Gly Ile Ala Gly Ile Ile Ala Ala Thr Cys Met Asp Gln Trp Ser Thr
            20                  25                  30

Gln Asp Leu Tyr Asn Asn Pro Val Thr Ala Val Phe Asn Tyr Gln Gly
        35                  40                  45

Leu Trp Arg Ser Cys Val Arg Glu Ser Ser Gly Phe Thr Glu Cys Arg
    50                  55                  60

Gly Tyr Phe Thr Leu Leu Gly Leu Pro Ala Met Leu Gln Ala Val Arg
65                  70                  75                  80

Ala Leu Met Ile Val Gly Ile Val Leu Gly Ala Ile Gly Leu Leu Val
                85                  90                  95

Ser Ile Phe Ala Leu Lys Cys Ile Arg Ile Gly Ser Met Glu Asp Ser
            100                 105                 110

Ala Lys Ala Asn Met Thr Leu Thr Ser Gly Ile Met Phe Ile Val Ser
        115                 120                 125

Gly Leu Cys Ala Ile Ala Gly Val Ser Val Phe Ala Asn Met Leu Val
    130                 135                 140

Thr Asn Phe Trp Met Ser Thr Ala Asn Met Tyr Thr Gly Met Gly Gly
145                 150                 155                 160
```

Met Val Gln Thr Val Gln Thr Arg Tyr Thr Phe Gly Ala Ala Leu Phe
                165                 170                 175

Val Gly Trp Val Ala Gly Gly Leu Thr Leu Ile Gly Val Met Met
            180                 185                 190

Cys Ile Ala Cys Arg Gly Leu Ala Pro Glu Glu Thr Asn Tyr Lys Ala
            195                 200                 205

Val Ser Tyr His Ala Ser Gly His Ser Val Ala Tyr Lys Pro Gly Gly
        210                 215                 220

Phe Lys Ala Ser Thr Gly Phe Gly Ser Asn Thr Lys Asn Lys Lys Ile
225                 230                 235                 240

Tyr Asp Gly Gly Ala Arg Thr Glu Asp Glu Val Gln Ser Tyr Pro Ser
                245                 250                 255

Lys His Asp Tyr Val
            260

<210> SEQ ID NO 23
<211> LENGTH: 261
<212> TYPE: PRT
<213> ORGANISM: Artificial Sequence
<220> FEATURE:
<223> OTHER INFORMATION: Claudin18.1 amino acid sequence

<400> SEQUENCE: 23

Met Ser Thr Thr Thr Cys Gln Val Val Ala Phe Leu Leu Ser Ile Leu
1               5                   10                  15

Gly Leu Ala Gly Cys Ile Ala Ala Thr Gly Met Asp Met Trp Ser Thr
            20                  25                  30

Gln Asp Leu Tyr Asp Asn Pro Val Thr Ser Val Phe Gln Tyr Glu Gly
        35                  40                  45

Leu Trp Arg Ser Cys Val Arg Gln Ser Ser Gly Phe Thr Glu Cys Arg
    50                  55                  60

Pro Tyr Phe Thr Ile Leu Gly Leu Pro Ala Met Leu Gln Ala Val Arg
65                  70                  75                  80

Ala Leu Met Ile Val Gly Ile Val Leu Gly Ala Ile Gly Leu Leu Val
                85                  90                  95

Ser Ile Phe Ala Leu Lys Cys Ile Arg Ile Gly Ser Met Glu Asp Ser
            100                 105                 110

Ala Lys Ala Asn Met Thr Leu Thr Ser Gly Ile Met Phe Ile Val Ser
        115                 120                 125

Gly Leu Cys Ala Ile Ala Gly Val Ser Val Phe Ala Asn Met Leu Val
    130                 135                 140

Thr Asn Phe Trp Met Ser Thr Ala Asn Met Tyr Thr Gly Met Gly Gly
145                 150                 155                 160

Met Val Gln Thr Val Gln Thr Arg Tyr Thr Phe Gly Ala Ala Leu Phe
                165                 170                 175

Val Gly Trp Val Ala Gly Gly Leu Thr Leu Ile Gly Val Met Met
            180                 185                 190

Cys Ile Ala Cys Arg Gly Leu Ala Pro Glu Glu Thr Asn Tyr Lys Ala
            195                 200                 205

Val Ser Tyr His Ala Ser Gly His Ser Val Ala Tyr Lys Pro Gly Gly
        210                 215                 220

Phe Lys Ala Ser Thr Gly Phe Gly Ser Asn Thr Lys Asn Lys Lys Ile
225                 230                 235                 240

Tyr Asp Gly Gly Ala Arg Thr Glu Asp Glu Val Gln Ser Tyr Pro Ser
                245                 250                 255

Lys His Asp Tyr Val
              260

<210> SEQ ID NO 24
<211> LENGTH: 135
<212> TYPE: DNA
<213> ORGANISM: Artificial Sequence
<220> FEATURE:
<223> OTHER INFORMATION: mouse4-1BB intracellular domain nucleic acid
      sequence

<400> SEQUENCE: 24
aaatggatca ggaaaaaatt ccccccacata ttcaagcaac catttaagaa gaccactgga     60
gcagctcaag aggaagatgc ttgtagctgc cgatgtccac aggaagaaga aggaggagga    120
ggaggctatg agctg                                                    135

<210> SEQ ID NO 25
<211> LENGTH: 45
<212> TYPE: PRT
<213> ORGANISM: Artificial Sequence
<220> FEATURE:
<223> OTHER INFORMATION: mouse4-1BB intracellular domain amino acid
      sequence

<400> SEQUENCE: 25

Lys Trp Ile Arg Lys Lys Phe Pro His Ile Phe Lys Gln Pro Phe Lys
1               5                   10                  15

Lys Thr Thr Gly Ala Ala Gln Glu Glu Asp Ala Cys Ser Cys Arg Cys
            20                  25                  30

Pro Gln Glu Glu Glu Gly Gly Gly Gly Gly Tyr Glu Leu
        35                  40                  45

<210> SEQ ID NO 26
<211> LENGTH: 473
<212> TYPE: PRT
<213> ORGANISM: Artificial Sequence
<220> FEATURE:
<223> OTHER INFORMATION: Hu8E5-28ZCAR amino acid sequence (human)

<400> SEQUENCE: 26

Gln Val Gln Leu Gln Glu Ser Gly Pro Gly Leu Ile Lys Pro Ser Gln
1               5                   10                  15

Thr Leu Ser Leu Thr Cys Thr Val Ser Gly Gly Ser Ile Ser Ser Gly
            20                  25                  30

Tyr Asn Trp His Trp Ile Arg Gln Pro Pro Gly Lys Gly Leu Glu Trp
            35                  40                  45

Ile Gly Tyr Ile His Tyr Thr Gly Ser Thr Asn Tyr Asn Pro Ala Leu
        50                  55                  60

Arg Ser Arg Val Thr Ile Ser Val Asp Thr Ser Lys Asn Gln Phe Ser
65                  70                  75                  80

Leu Lys Leu Ser Ser Val Thr Ala Ala Asp Thr Ala Ile Tyr Tyr Cys
                85                  90                  95

Ala Arg Ile Tyr Asn Gly Asn Ser Phe Pro Tyr Trp Gly Gln Gly Thr
            100                 105                 110

Thr Val Thr Val Ser Ser Gly Gly Gly Gly Ser Gly Gly Gly Gly Ser
        115                 120                 125

Gly Gly Gly Gly Ser Asp Ile Val Met Thr Gln Ser Pro Asp Ser Leu
    130                 135                 140

Ala Val Ser Leu Gly Glu Arg Ala Thr Ile Asn Cys Lys Ser Ser Gln

```
145                 150                 155                 160
    Ser Leu Phe Asn Ser Gly Asn Gln Lys Asn Tyr Leu Thr Trp Tyr Gln
                    165                 170                 175

Gln Lys Pro Gly Gln Pro Pro Lys Leu Leu Ile Tyr Trp Ala Ser Thr
                    180                 185                 190

Arg Glu Ser Gly Val Pro Asp Arg Phe Ser Gly Ser Gly Ser Gly Thr
                    195                 200                 205

Asp Phe Thr Leu Thr Ile Ser Ser Leu Gln Ala Glu Asp Val Ala Val
                    210                 215                 220

Tyr Tyr Cys Gln Asn Ala Tyr Ser Phe Pro Tyr Thr Phe Gly Gly Gly
    225                 230                 235                 240

Thr Lys Leu Glu Ile Lys Arg Thr Thr Thr Pro Ala Pro Arg Pro Pro
                    245                 250                 255

Thr Pro Ala Pro Thr Ile Ala Ser Gln Pro Leu Ser Leu Arg Pro Glu
                    260                 265                 270

Ala Cys Arg Pro Ala Ala Gly Gly Ala Val His Thr Arg Gly Leu Asp
                    275                 280                 285

Phe Ala Cys Asp Phe Trp Val Leu Val Val Val Gly Gly Val Leu Ala
    290                 295                 300

Cys Tyr Ser Leu Leu Val Thr Val Ala Phe Ile Ile Phe Trp Val Arg
    305                 310                 315                 320

Ser Lys Arg Ser Arg Leu Leu His Ser Asp Tyr Met Asn Met Thr Pro
                    325                 330                 335

Arg Arg Pro Gly Pro Thr Arg Lys His Tyr Gln Pro Tyr Ala Pro Pro
                    340                 345                 350

Arg Asp Phe Ala Ala Tyr Arg Ser Arg Val Lys Phe Ser Arg Ser Ala
                    355                 360                 365

Asp Ala Pro Ala Tyr Gln Gln Gly Gln Asn Gln Leu Tyr Asn Glu Leu
                    370                 375                 380

Asn Leu Gly Arg Arg Glu Glu Tyr Asp Val Leu Asp Lys Arg Arg Gly
    385                 390                 395                 400

Arg Asp Pro Glu Met Gly Gly Lys Pro Gln Arg Arg Lys Asn Pro Gln
                    405                 410                 415

Glu Gly Leu Tyr Asn Glu Leu Gln Lys Asp Lys Met Ala Glu Ala Tyr
                    420                 425                 430

Ser Glu Ile Gly Met Lys Gly Glu Arg Arg Arg Gly Lys Gly His Asp
    435                 440                 445

Gly Leu Tyr Gln Gly Leu Ser Thr Ala Thr Lys Asp Thr Tyr Asp Ala
                    450                 455                 460

Leu His Met Gln Ala Leu Pro Pro Arg
    465                 470

<210> SEQ ID NO 27
<211> LENGTH: 471
<212> TYPE: PRT
<213> ORGANISM: Artificial Sequence
<220> FEATURE:
<223> OTHER INFORMATION: Hu8E5-BBZCAR amino acid sequence (human)

<400> SEQUENCE: 27

Gln Val Gln Leu Gln Glu Ser Gly Pro Gly Leu Ile Lys Pro Ser Gln
1               5                   10                  15

Thr Leu Ser Leu Thr Cys Thr Val Ser Gly Gly Ser Ile Ser Ser Gly
                20                  25                  30

Tyr Asn Trp His Trp Ile Arg Gln Pro Pro Gly Lys Gly Leu Glu Trp
```

```
             35                  40                  45
Ile Gly Tyr Ile His Tyr Thr Gly Ser Thr Asn Tyr Asn Pro Ala Leu
         50                  55                  60

Arg Ser Arg Val Thr Ile Ser Val Asp Thr Ser Lys Asn Gln Phe Ser
 65                  70                  75                  80

Leu Lys Leu Ser Ser Val Thr Ala Ala Asp Thr Ala Ile Tyr Tyr Cys
                 85                  90                  95

Ala Arg Ile Tyr Asn Gly Asn Ser Phe Pro Tyr Trp Gly Gln Gly Thr
                100                 105                 110

Thr Val Thr Val Ser Ser Gly Gly Gly Ser Gly Gly Gly Gly Ser
         115                 120                 125

Gly Gly Gly Gly Ser Asp Ile Val Met Thr Gln Ser Pro Asp Ser Leu
        130                 135                 140

Ala Val Ser Leu Gly Glu Arg Ala Thr Ile Asn Cys Lys Ser Ser Gln
145                 150                 155                 160

Ser Leu Phe Asn Ser Gly Asn Gln Lys Asn Tyr Leu Thr Trp Tyr Gln
                165                 170                 175

Gln Lys Pro Gly Gln Pro Pro Lys Leu Leu Ile Tyr Trp Ala Ser Thr
                180                 185                 190

Arg Glu Ser Gly Val Pro Asp Arg Phe Ser Gly Ser Gly Ser Gly Thr
                195                 200                 205

Asp Phe Thr Leu Thr Ile Ser Ser Leu Gln Ala Glu Asp Val Ala Val
210                 215                 220

Tyr Tyr Cys Gln Asn Ala Tyr Ser Phe Pro Tyr Thr Phe Gly Gly Gly
225                 230                 235                 240

Thr Lys Leu Glu Ile Lys Arg Thr Thr Thr Pro Ala Pro Arg Pro Pro
                245                 250                 255

Thr Pro Ala Pro Thr Ile Ala Ser Gln Pro Leu Ser Leu Arg Pro Glu
                260                 265                 270

Ala Cys Arg Pro Ala Ala Gly Gly Ala Val His Thr Arg Gly Leu Asp
                275                 280                 285

Phe Ala Cys Asp Ile Tyr Ile Trp Ala Pro Leu Ala Gly Thr Cys Gly
                290                 295                 300

Val Leu Leu Leu Ser Leu Val Ile Thr Leu Tyr Cys Lys Arg Gly Arg
305                 310                 315                 320

Lys Lys Leu Leu Tyr Ile Phe Lys Gln Pro Phe Met Arg Pro Val Gln
                325                 330                 335

Thr Thr Gln Glu Glu Asp Gly Cys Ser Cys Arg Phe Pro Glu Glu Glu
                340                 345                 350

Glu Gly Gly Cys Glu Leu Arg Val Lys Phe Ser Arg Ser Ala Asp Ala
                355                 360                 365

Pro Ala Tyr Gln Gln Gly Gln Asn Gln Leu Tyr Asn Glu Leu Asn Leu
                370                 375                 380

Gly Arg Arg Glu Glu Tyr Asp Val Leu Asp Lys Arg Arg Gly Arg Asp
385                 390                 395                 400

Pro Glu Met Gly Gly Lys Pro Gln Arg Arg Lys Asn Pro Gln Glu Gly
                405                 410                 415

Leu Tyr Asn Glu Leu Gln Lys Asp Lys Met Ala Glu Ala Tyr Ser Glu
                420                 425                 430

Ile Gly Met Lys Gly Glu Arg Arg Arg Gly Lys Gly His Asp Gly Leu
                435                 440                 445

Tyr Gln Gly Leu Ser Thr Ala Thr Lys Asp Thr Tyr Asp Ala Leu His
                450                 455                 460
```

Met Gln Ala Leu Pro Pro Arg
465                 470

<210> SEQ ID NO 28
<211> LENGTH: 21
<212> TYPE: PRT
<213> ORGANISM: Artificial Sequence
<220> FEATURE:
<223> OTHER INFORMATION: human CD8 alpha signal peptide amino acid
      sequence

<400> SEQUENCE: 28

Met Ala Leu Pro Val Thr Ala Leu Leu Pro Leu Ala Leu Leu Leu
1               5                   10                  15

His Ala Ala Arg Pro
            20

<210> SEQ ID NO 29
<211> LENGTH: 45
<212> TYPE: PRT
<213> ORGANISM: Artificial Sequence
<220> FEATURE:
<223> OTHER INFORMATION: humanCD8 hinge region amino acid sequence

<400> SEQUENCE: 29

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
                20                  25                  30

Gly Ala Val His Thr Arg Gly Leu Asp Phe Ala Cys Asp
            35                  40                  45

<210> SEQ ID NO 30
<211> LENGTH: 27
<212> TYPE: PRT
<213> ORGANISM: Artificial Sequence
<220> FEATURE:
<223> OTHER INFORMATION: human CD28 Transmembrane amino acid sequence

<400> SEQUENCE: 30

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 31
<211> LENGTH: 41
<212> TYPE: PRT
<213> ORGANISM: Artificial Sequence
<220> FEATURE:
<223> OTHER INFORMATION: human CD28 intracellular domain amino acid
      sequence

<400> SEQUENCE: 31

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
                20                  25                  30

Pro Arg Asp Phe Ala Ala Tyr Arg Ser
            35                  40

<210> SEQ ID NO 32
<211> LENGTH: 42

<212> TYPE: PRT
<213> ORGANISM: Artificial Sequence
<220> FEATURE:
<223> OTHER INFORMATION: human 4-1BB intracellular domain amino acid
      sequence

<400> SEQUENCE: 32

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 33
<211> LENGTH: 113
<212> TYPE: PRT
<213> ORGANISM: Artificial Sequence
<220> FEATURE:
<223> OTHER INFORMATION: intracellular segment CD3 xi amino acid
      sequence of human CD3

<400> SEQUENCE: 33

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg

<210> SEQ ID NO 34
<211> LENGTH: 324
<212> TYPE: DNA
<213> ORGANISM: Artificial Sequence
<220> FEATURE:
<223> OTHER INFORMATION: mouse CCL19 nucleic acid sequence

<400> SEQUENCE: 34 atggccccc gtgtgacccc actcctggcc ttcagcctgc tggttctctg gaccttccca      60
gccccaactc tggggggtgc taatgatgcg aagactgct gcctgtctgt gacccagcgc     120
cccatccctg gaacatcgt gaaagccttc cgctacttc ttaatgaaga tggctgcagg      180
gtgcctgctg ttgtgttcac cacactaagg ggctatcagc tctgtgcacc tccagaccag   240
ccctgggtgg atcgcatcat ccgaagactg aagaagtctt ctgccaagaa caaaggcaac   300
agcaccagaa ggagccctgt gtct                                           324

<210> SEQ ID NO 35
<211> LENGTH: 515
<212> TYPE: PRT
<213> ORGANISM: Artificial Sequence
<220> FEATURE:

<223> OTHER INFORMATION: 28BBZ amino acid sequence

<400> SEQUENCE: 35

Gln Val Gln Leu Gln Glu Ser Gly Pro Gly Leu Ile Lys Pro Ser Gln
1               5                   10                  15

Thr Leu Ser Leu Thr Cys Thr Val Ser Gly Gly Ser Ile Ser Ser Gly
            20                  25                  30

Tyr Asn Trp His Trp Ile Arg Gln Pro Pro Gly Lys Gly Leu Glu Trp
        35                  40                  45

Ile Gly Tyr Ile His Tyr Thr Gly Ser Thr Asn Tyr Asn Pro Ala Leu
    50                  55                  60

Arg Ser Arg Val Thr Ile Ser Val Asp Thr Ser Lys Asn Gln Phe Ser
65                  70                  75                  80

Leu Lys Leu Ser Ser Val Thr Ala Ala Asp Thr Ala Ile Tyr Tyr Cys
                85                  90                  95

Ala Arg Ile Tyr Asn Gly Asn Ser Phe Pro Tyr Trp Gly Gln Gly Thr
            100                 105                 110

Thr Val Thr Val Ser Ser Gly Gly Gly Gly Ser Gly Gly Gly Gly Ser
            115                 120                 125

Gly Gly Gly Gly Ser Asp Ile Val Met Thr Gln Ser Pro Asp Ser Leu
130                 135                 140

Ala Val Ser Leu Gly Glu Arg Ala Thr Ile Asn Cys Lys Ser Ser Gln
145                 150                 155                 160

Ser Leu Phe Asn Ser Gly Asn Gln Lys Asn Tyr Leu Thr Trp Tyr Gln
                165                 170                 175

Gln Lys Pro Gly Gln Pro Pro Lys Leu Leu Ile Tyr Trp Ala Ser Thr
            180                 185                 190

Arg Glu Ser Gly Val Pro Asp Arg Phe Ser Gly Ser Gly Ser Gly Thr
        195                 200                 205

Asp Phe Thr Leu Thr Ile Ser Ser Leu Gln Ala Glu Asp Val Ala Val
            210                 215                 220

Tyr Tyr Cys Gln Asn Ala Tyr Ser Phe Pro Tyr Thr Phe Gly Gly Gly
225                 230                 235                 240

Thr Lys Leu Glu Ile Lys Arg Thr Thr Thr Pro Ala Pro Arg Pro Pro
                245                 250                 255

Thr Pro Ala Pro Thr Ile Ala Ser Gln Pro Leu Ser Leu Arg Pro Glu
            260                 265                 270

Ala Cys Arg Pro Ala Ala Gly Gly Ala Val His Thr Arg Gly Leu Asp
        275                 280                 285

Phe Ala Cys Asp Phe Trp Val Leu Val Val Val Gly Gly Val Leu Ala
    290                 295                 300

Cys Tyr Ser Leu Leu Val Thr Val Ala Phe Ile Ile Phe Trp Val Arg
305                 310                 315                 320

Ser Lys Arg Ser Arg Leu Leu His Ser Asp Tyr Met Asn Met Thr Pro
                325                 330                 335

Arg Arg Pro Gly Pro Thr Arg Lys His Tyr Gln Pro Tyr Ala Pro Pro
            340                 345                 350

Arg Asp Phe Ala Ala Tyr Arg Ser Lys Arg Gly Arg Lys Lys Leu Leu
        355                 360                 365

Tyr Ile Phe Lys Gln Pro Phe Met Arg Pro Val Gln Thr Thr Gln Glu
    370                 375                 380

Glu Asp Gly Cys Ser Cys Arg Phe Pro Glu Glu Glu Glu Gly Gly Cys
385                 390                 395                 400

```
Glu Leu Arg Val Lys Phe Ser Arg Ser Ala Asp Ala Pro Ala Tyr Gln
            405                 410                 415
Gln Gly Gln Asn Gln Leu Tyr Asn Glu Leu Asn Leu Gly Arg Arg Glu
            420                 425                 430
Glu Tyr Asp Val Leu Asp Lys Arg Arg Gly Arg Asp Pro Glu Met Gly
            435                 440                 445
Gly Lys Pro Gln Arg Arg Lys Asn Pro Gln Glu Gly Leu Tyr Asn Glu
        450                 455                 460
Leu Gln Lys Asp Lys Met Ala Glu Ala Tyr Ser Glu Ile Gly Met Lys
465                 470                 475                 480
Gly Glu Arg Arg Arg Gly Lys Gly His Asp Gly Leu Tyr Gln Gly Leu
                485                 490                 495
Ser Thr Ala Thr Lys Asp Thr Tyr Asp Ala Leu His Met Gln Ala Leu
            500                 505                 510
Pro Pro Arg
        515
```